US012412508B2

(12) United States Patent
Zhao et al.

(10) Patent No.: US 12,412,508 B2
(45) Date of Patent: Sep. 9, 2025

(54) PIXEL CIRCUIT, PIXEL DRIVING METHOD AND DISPLAY DEVICE

(71) Applicant: BOE TECHNOLOGY GROUP CO., LTD., Beijing (CN)

(72) Inventors: Jiao Zhao, Beijing (CN); Yuzhen Guo, Beijing (CN); Haoliang Zheng, Beijing (CN); Li Xiao, Beijing (CN); Chenyang Zhang, Beijing (CN); Xiaorong Cui, Beijing (CN); Minghua Xuan, Beijing (CN); Wanzhi Chen, Beijing (CN); Yan Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/275,555

(22) PCT Filed: Sep. 1, 2022

(86) PCT No.: PCT/CN2022/116457
§ 371 (c)(1),
(2) Date: Aug. 2, 2023

(87) PCT Pub. No.: WO2024/045116
PCT Pub. Date: Mar. 7, 2024

(65) Prior Publication Data
US 2025/0014503 A1 Jan. 9, 2025

(51) Int. Cl.
*G09G 3/32* (2016.01)

(52) U.S. Cl.
CPC ....... *G09G 3/32* (2013.01); *G09G 2300/0465* (2013.01); *G09G 2300/0819* (2013.01);
(Continued)

(58) Field of Classification Search
CPC ............ G09G 3/32; G09G 2300/0465; G09G 2300/0819; G09G 2300/0852; G09G 2300/0861; G09G 2310/08
See application file for complete search history.

(56) References Cited

U.S. PATENT DOCUMENTS

2015/0170563 A1 6/2015 Bang
2017/0039934 A1 2/2017 Ma
(Continued)

FOREIGN PATENT DOCUMENTS

CN 101800030 B 6/2012
CN 202871258 U 4/2013
(Continued)

*Primary Examiner* — Sujit Shah
(74) *Attorney, Agent, or Firm* — MUNCY, GEISSLER, OLDS & LOWE, P.C.

(57) ABSTRACT

A pixel circuit, a pixel driving method and a display device are provided. The pixel circuit includes a driving circuit, a light emitting element and a light emitting gating control circuit; the driving circuit is electrically connected to a first electrode of the light emitting element, and is configured to drive the light emitting element; the light emitting gating control circuit is configured to form a current path between the second electrode of the light emitting element and the first voltage terminal under the control of the first control signal provided by the first control terminal according to the first light emitting control voltage provided by the first light emitting control voltage terminal and the light emitting data voltage provided by the light emitting data voltage terminal, to control the driving circuit to control the light emitting element to emit light.

18 Claims, 29 Drawing Sheets

(52) U.S. Cl.
CPC ............... *G09G 2300/0852* (2013.01); *G09G 2300/0861* (2013.01); *G09G 2310/08* (2013.01)

(56) References Cited

U.S. PATENT DOCUMENTS

| | | | | |
|---|---|---|---|---|
| 2019/0384445 | A1* | 12/2019 | Huang | G06F 3/0443 |
| 2021/0193013 | A1 | 6/2021 | Xu et al. | |
| 2021/0201760 | A1* | 7/2021 | Wang | G09G 3/3233 |
| 2021/0241688 | A1* | 8/2021 | Yin | G09G 3/3233 |
| 2021/0343229 | A1 | 11/2021 | Yang et al. | |
| 2022/0343835 | A1 | 10/2022 | Cong et al. | |
| 2023/0073465 | A1 | 3/2023 | Liu | |

FOREIGN PATENT DOCUMENTS

| | | | |
|---|---|---|---|
| CN | 204348301 | U | 5/2015 |
| CN | 104732926 | A | 6/2015 |
| CN | 105657905 | A | 6/2016 |
| CN | 110415641 | A | 11/2019 |
| CN | 110910816 | A | 3/2020 |
| CN | 111369935 | A | 7/2020 |
| CN | 111445842 | A | 7/2020 |
| CN | 111477166 | A | 7/2020 |
| CN | 112908249 | A | 6/2021 |
| CN | 113270071 | A | 8/2021 |
| CN | 113436570 | A | 9/2021 |
| CN | 113611248 | A | 11/2021 |
| CN | 113889039 | A | 1/2022 |
| CN | 113990247 | A | 1/2022 |
| CN | 114038403 | A | 2/2022 |
| CN | 114283739 | A | 4/2022 |

* cited by examiner

PIXEL CIRCUIT, PIXEL DRIVING METHOD AND DISPLAY DEVICE

CROSS-REFERENCE TO RELATED APPLICATION

The present disclosure is the U.S. national phase of PCT Application No. PCT/CN2022/116457 filed on Sep. 1, 2022, which are incorporated herein by reference in their entireties.

TECHNICAL FIELD

The present disclosure relates to the field of display technology, in particular to a pixel circuit, a pixel driving method and a display device.

BACKGROUND

Miniature light emitting diode (Micro-LED) has the characteristics of high resolution, low power consumption, high brightness, high contrast, high color saturation, fast response, thin thickness, and long life, and has become an iterator for future displays. At present, TV level Micro-LED products have been exhibited in the market. In the future, small and medium-sized products for short-distance display will gradually expand, that is, the demand for increasing Pixels Per Inch (PPI, pixel density) will continue to increase, and high PPI design requires a pixel circuit with a simple structure, but the internal compensation circuit currently has a more complicated structure.

Moreover, when Micro-LED display products perform low-gray-scale display, the brightness uniformity of LED chips driven by low current density is relatively poor, so the pixel driving circuit needs to include two modules; one is the compensation module with the threshold compensation function of the driving transistor, and the other is the dimming module with the pulse width modulation function. However, the structure of the internal compensation circuit having the two modules is complicated, which is not conducive to realizing a narrow frame.

SUMMARY

In a first aspect, the present disclosure provides in some embodiments a pixel circuit, including a driving circuit, a light emitting element and a light emitting gating control circuit; wherein the driving circuit is electrically connected to a first electrode of the light emitting element, and is configured to drive the light emitting element; the light emitting gating control circuit is electrically connected to a second electrode of the light emitting element, a first control terminal, a first light emitting control voltage terminal, and a light emitting data voltage terminal, and is configured to form a current path between the second electrode of the light emitting element and the first voltage terminal under the control of a first control signal provided by the first control terminal according to a first light emitting control voltage provided by the first light emitting control voltage terminal and a light emitting data voltage provided by the light emitting data voltage terminal, to control the driving circuit to control the light emitting element to emit light; or the driving circuit is electrically connected to the light emitting element through the light emitting gating control circuit; the light emitting gating control circuit is electrically connected to the driving circuit, the first control terminal, the first control voltage terminal and the light emitting data voltage terminal respectively, and is configured to form a current path between the driving circuit and the light emitting element under the control the first control signal according to the first light emitting control voltage and the light emitting data voltage, to control the driving circuit to control the light emitting element to emit light.

Optionally, the light emitting gating control circuit is electrically connected to a second light emitting control voltage terminal; the light emitting gating control circuit is also configured to from the current path under the control of a second light emitting control voltage provided by the second light emitting control voltage terminal; the light emitting gating control circuit includes a first light emitting control circuit, a second light emitting control circuit, a first gating control circuit and a second gating control circuit; the first light emitting control circuit is electrically connected to a first light emitting control terminal, the second electrode of the light emitting element, and the first voltage terminal, and is configured to control to connect the second electrode of the light emitting element and the first voltage terminal under the control of a potential of the first light emitting control terminal; the second light emitting control circuit is electrically connected to a second light emitting control terminal, the second electrode of the light emitting element, and the first voltage terminal, and is configured to control to connect the second electrode of the light emitting element and the first voltage terminal under the control of a potential of the second light emitting control terminal; the first gating control circuit is electrically connected to the first control terminal, the first light emitting control voltage terminal and the first light emitting control terminal respectively, and is configured to write the first light emitting control voltage provided by the first light emitting control voltage terminal into the first light emitting control terminal under the control of the first control signal provided by the first control terminal; the second gating control circuit is electrically connected to the first control terminal, a second light emitting control voltage terminal, a second control terminal, the light emitting data voltage terminal and the second light emitting control terminal, and is configured to write a second light emitting control voltage provided by the second light emitting control voltage terminal into the second control terminal under the control of the first control signal provided by the first control terminal, and write a light emitting data voltage provided by the light emitting data voltage terminal into the second light emitting control terminal under the control of a potential of the second control terminal.

Optionally, the pixel circuit further includes a first energy storage circuit and a second energy storage circuit; a first terminal of the first energy storage circuit is electrically connected to the first light emitting control terminal, a second terminal of the first energy storage circuit is electrically connected to a first initial voltage terminal, and the first energy storage circuit is configured to store electrical energy; a first terminal of the second energy storage circuit is electrically connected to the second control terminal, a second terminal of the second energy storage circuit is electrically connected to a second initial voltage terminal, and the second energy storage circuit is configured to store electrical energy.

Optionally, the light emitting gating control circuit is further electrically connected to the light emitting control signal terminal, and is further configured to form the current path according to the light emitting control signal provided by the light emitting control signal terminal; the light emitting gating control circuit includes a third light emitting control circuit, a writing-in control circuit, a first control circuit and a third energy storage circuit; the writing-in control circuit is electrically connected to the first control terminal, the first light emitting control voltage terminal and a writing-in node respectively, and is configured to control to connect the first light emitting control voltage terminal and the writing-in node under the control of the first control signal provided by the first control terminal; the first control circuit is electrically connected to a control terminal of the third light emitting control circuit, the writing-in node, the light emitting data voltage terminal, and the light emitting control signal terminal, is configured to control to write the light emitting data voltage or the light emitting control signal provided by the light emitting control signal terminal into the control terminal of the third light emitting control circuit under the control of a potential of the writing-in node; the third light emitting control circuit is electrically connected to the second electrode of the light emitting element and the first voltage terminal, and the third light emitting control circuit is configured to form the current path under the control of the potential of the control terminal of the third light emitting control circuit; a first terminal of the third energy storage circuit is electrically connected to the writing-in node, a second terminal of the third energy storage circuit is electrically connected to an initial voltage terminal, and the third energy storage circuit is configured to store electric energy.

Optionally, the light emitting gating control circuit includes a fourth light emitting control circuit, a fifth light emitting control circuit, a third gating control circuit and a fourth energy storage circuit; the third gating control circuit is electrically connected to the first control terminal, the first light emitting control voltage terminal and a control terminal of the fourth light emitting control circuit respectively, and is configured to control the first light emitting control voltage terminal to write the first light emitting control voltage to a control terminal of the fourth light emitting control circuit under the control of the first control terminal provided by the first control terminal; the fourth light emitting control circuit is also electrically connected to the second electrode of the light emitting element and the first voltage terminal, is configured to form the current path under the control of a potential of the control terminal of the fourth light emitting control circuit; a control terminal of the fifth light emitting control circuit is electrically connected to the light emitting data voltage terminal, and the fifth light emitting control circuit is also electrically connected to the second electrode of the light emitting element and the first voltage terminal respectively, is configured to form the current path under the control of a potential of a control terminal of the fifth light emitting control circuit; a first terminal of the fourth energy storage circuit is electrically connected to the control terminal of the fourth light emitting control circuit, a second terminal of the fourth energy storage circuit is electrically connected to an initial voltage terminal, and the fourth energy storage circuit is configured to store electrical energy.

Optionally, the light emitting gating control circuit includes a sixth light emitting control circuit, a seventh light emitting control circuit, a fourth gating control circuit, a fifth gating control circuit, and a fifth energy storage circuit; the fourth gating control circuit is electrically connected to the first control terminal, the first light emitting control voltage terminal and a control terminal of the sixth light emitting control circuit, and is configured to control to connect the first light emitting control voltage terminal and the control terminal of the sixth light emitting control circuit under the control of the first control signal; the fifth gating control circuit is electrically connected to the control terminal of the sixth light emitting control circuit, the light emitting data voltage terminal, and a control terminal of the seventh light emitting control circuit, is configured to control to connect the light emitting data voltage terminal and the control terminal of the seventh light emitting control circuit under the control of a potential of a control terminal of the sixth light emitting control circuit; the sixth light emitting control circuit is electrically connected to the second electrode of the light emitting element and the first voltage terminal, and is configured to form the current path under the control of the potential of the control terminal of the sixth light emitting control circuit; the seventh light emitting control circuit is electrically connected to the second electrode of the light emitting element and the first voltage terminal respectively, and is configured to form the current path under the control of the potential of the control terminal of the seventh light emitting control circuit; a first terminal of the fifth energy storage circuit is electrically connected to the control terminal of the sixth light emitting control circuit, a second terminal of the fifth energy storage circuit is electrically connected to an initial voltage terminal, and the fifth energy storage circuit is configured to store electrical energy.

Optionally, the first light emitting control circuit includes a first transistor, and the second light emitting control circuit includes a second transistor; a control electrode of the first transistor is electrically connected to the first light emitting control terminal, a first electrode of the first transistor is electrically connected to the second electrode of the light emitting element, and a second electrode of the first transistor is electrically connected to the first voltage terminal; a control electrode of the second transistor is electrically connected to the second light emitting control terminal, a first electrode of the second transistor is electrically connected to the second electrode of the light emitting element, and a second electrode of the second transistor is electrically connected to the first voltage terminal.

Optionally, the driving circuit includes a driving transistor; a width-to length ratio of the first transistor is greater than a width-to length ratio of the driving transistor, and a width-to length ratio of the second transistor is greater than the width-to length ratio of the driving transistor.

Optionally, the first gating control circuit comprises a third transistor; a control electrode of the third transistor is electrically connected to the first control terminal, a first electrode of the third transistor is electrically connected to the first light emitting control voltage terminal, and a second electrode of the third transistor is electrically connected to the first light emitting control terminal; the second gating control circuit includes a fourth transistor and a fifth transistor; a control electrode of the fourth transistor is electrically connected to the first control terminal, a first electrode of the fourth transistor is electrically connected to the second light emitting control voltage terminal, and a second electrode of the fourth transistor is electrically connected to the second control terminal; a control electrode of the fifth transistor is electrically connected to the second control terminal, a first electrode of the fifth transistor is electrically connected to the light emitting data voltage terminal, and a second electrode of the fifth transistor is electrically connected to the second light emitting control terminal.

Optionally, both the third transistor and the fourth transistor are n-type transistors, or both the third transistor and the fourth transistor are p-type transistors.

Optionally, the first light emitting control voltage terminal and the second light emitting control voltage terminal are a same voltage terminal; the first transistor is an n-type transistor, and the fifth transistor is a p-type transistor; or, the first transistor is a p-type transistor, and the fifth transistor is an n-type transistor.

Optionally, the writing-in control circuit includes a sixth transistor, the first control circuit includes a seventh transistor and an eighth transistor, and the third light emitting control circuit includes a ninth transistor; a control electrode of the sixth transistor is electrically connected to the first control terminal, a first electrode of the sixth transistor is electrically connected to the first light emitting control voltage terminal, and a second electrode of the sixth transistor is electrically connected to the writing-in node; a control electrode of the seventh transistor is electrically connected to the writing-in node, a first electrode of the seventh transistor is electrically connected to the light emitting data voltage terminal, and a second electrode of the seventh transistor is electrically connected to a control electrode of the ninth transistor; a control electrode of the eighth transistor is electrically connected to the writing-in node, a first electrode of the eighth transistor is electrically connected to the light emitting control signal terminal, and a second electrode of the eighth transistor is electrically connected to the control electrode of the ninth transistor; a first electrode of the ninth transistor is electrically connected to the second electrode of the light emitting element, and a second electrode of the ninth transistor is electrically connected to the first voltage terminal.

Optionally, the sixth transistor is an n-type transistor, and the sixth transistor is an oxide transistor.

Optionally, the seventh transistor is a p-type transistor, and the eighth transistor is an n-type transistor; or, the seventh transistor is an n-type transistor, and the eighth transistor is a p-type transistor.

Optionally, the sixth transistor is a p-type transistor, the seventh transistor is a p-type transistor, and the eighth transistor is an n-type transistor; or, the sixth transistor is an n-type transistor, the seventh transistor is a p-type transistor, and the eighth transistor is an n-type transistor.

Optionally, the third gating control circuit includes a tenth transistor, the fourth light emitting control circuit includes an eleventh transistor, the fifth light emitting control circuit includes a twelfth transistor; a control electrode of the tenth transistor is electrically connected to the first control terminal, a first electrode of the tenth transistor is electrically connected to the first light emitting control voltage terminal, and a second electrode of the tenth transistor is electrically connected to a control electrode of the eleventh transistor; a first electrode of the eleventh transistor is electrically connected to the second electrode of the light emitting element, and a second electrode of the eleventh transistor is electrically connected to the first voltage terminal; a control electrode of the twelfth transistor is electrically connected to the light emitting data voltage terminal, a first electrode of the twelfth transistor is electrically connected to the second electrode of the light emitting element, and a second electrode of the twelfth transistor is electrically connected to the first voltage terminal.

Optionally, the tenth transistor is an n-type transistor, and the tenth transistor is an oxide transistor.

Optionally, the tenth transistor, the eleventh transistor and the twelfth transistor are all n-type transistors; or, the tenth transistor is an n-type transistor, the eleventh transistor is an n-type transistor, and the twelfth transistor is a p-type transistor; or, the tenth transistor and the twelfth transistor are p-type transistors, and the eleventh transistor is an n-type transistor; or, the tenth transistor, the eleventh transistor, and the twelfth transistor are all p-type transistors; or, the tenth transistor is an n-type transistor, and both the eleventh transistor and the twelfth transistor are p-type transistors.

Optionally, the sixth light emitting control circuit comprises a thirteenth transistor; the seventh light emitting control circuit comprises a fourteenth transistor; the fourth gating control circuit comprises a fifteenth transistor, the fifth gating control circuit includes a sixteenth transistor; a control electrode of the fifteenth transistor is electrically connected to the first control terminal, a first electrode of the fifteenth transistor is electrically connected to the first light emitting control voltage terminal, and a second electrode of the fifteenth transistor is electrically connected to a control electrode of the thirteenth transistor; a control electrode of the sixteenth transistor is electrically connected to the control electrode of the thirteenth transistor, a first electrode of the sixteenth transistor is electrically connected to the light emitting data voltage terminal, and a second electrode of the sixteenth transistor is electrically connected to a control electrode of the fourteenth transistor; a first electrode of the thirteenth transistor is electrically connected to the second electrode of the light emitting element, and a second electrode of the thirteenth transistor is electrically connected to the first voltage terminal; a first electrode of the fourteenth transistor is electrically connected to the second electrode of the light emitting element, and a second electrode of the fourteenth transistor is electrically connected to the first voltage terminal.

Optionally, the thirteenth transistor, the fourteenth transistor and the fifteenth transistor are all n-type transistors, and the sixteenth transistor is a p-type transistor; or, the thirteenth transistor and the fourteenth transistor are n-type transistors, and the fifteenth transistor and the sixteenth transistor are p-type transistors; or, the thirteenth transistor is an n-type transistor, and the fourteenth transistor, the fifteenth transistor, and the sixteenth transistor are all p-type transistors; or, the thirteenth transistor, the fourteenth transistor and the fifteenth transistor are all n-type transistors, and the sixteenth transistor is a p-type transistor.

Optionally, the pixel circuit further includes a data writing-in circuit and a compensation on-off circuit; the first terminal of the driving circuit is electrically connected to the second voltage terminal; the driving circuit is configured to generate a driving current under the control of a potential of the control terminal of the driving circuit; the data writing-in circuit is electrically connected to the first scanning line, the data line and the control terminal of the driving circuit, and is configured to write the data voltage provided by the data line into the control terminal of the driving circuit under the control of the first scanning signal provided by the first scanning line; the compensation on-off circuit is electrically connected to a second scanning line, an external compensation line and the second terminal of the driving circuit respectively, and is configured to control to connect the external compensation line and the second terminal of the driving circuit under the control of a second scanning signal provided by the second scanning line.

Optionally, the pixel circuit further comprises a sixth energy storage circuit; a first terminal of the sixth energy storage circuit is electrically connected to the control terminal of the driving circuit, a second terminal of the sixth energy storage circuit is electrically connected to the second terminal of the driving circuit, and the sixth energy storage circuit is configured to store electrical energy; or, the first terminal of the sixth energy storage circuit is electrically connected to the control terminal of the driving circuit, the second terminal of the sixth energy storage circuit is electrically connected to the first terminal of the driving circuit, and the sixth energy storage circuit is configured to store electrical energy.

Optionally, the data writing-in circuit comprises a seventeenth transistor, the compensation on-off circuit comprises an eighteenth transistor, and the driving circuit comprises a driving transistor; a control electrode of the seventeenth transistor is electrically connected to the first scanning line, a first electrode of the seventeenth transistor is electrically connected to the data line, and a second electrode of the seventeenth transistor is electrically connected to a gate electrode of the driving transistor; a control electrode of the eighteenth transistor is electrically connected to the second scanning line, a first electrode of the eighteenth transistor is electrically connected to the external compensation line, and a second electrode of the eighteenth transistor is electrically connected to a second electrode of the driving transistor; a first electrode of the driving transistor is electrically connected to the second voltage terminal; the second electrode of the driving transistor is electrically connected to the first electrode of the light emitting element.

Optionally, the seventeenth transistor, the eighteenth transistor and the driving transistor are all n-type transistors; or, the seventeenth transistor and the driving transistor are p-type transistors, and the eighteenth transistor is an n-type transistor or a p-type transistor.

Optionally, the sixth energy storage circuit comprises a storage capacitor; the driving circuit comprises a driving transistor; a first terminal of the storage capacitor is electrically connected to the control electrode of the driving transistor, and a second terminal of the storage capacitor is electrically connected to the second electrode of the driving transistor; or, the first terminal of the storage capacitor is electrically connected to the control electrode of the driving transistor, and the second terminal of the storage capacitor is electrically connected to the first electrode of the driving transistor.

Optionally, the pixel circuit further includes a data writing-in circuit, a compensation on-off circuit and a sixth energy storage circuit; the first terminal of the driving circuit is connected to the second voltage terminal; the driving circuit is configured to generate a driving current under the control of a potential of the control terminal of the driving circuit; the data writing-in circuit is electrically connected to the first scanning line, the data line and the control terminal of the driving circuit, and is configured to write the data voltage provided by the data line into the control terminal of the driving circuit under the control of the first scanning signal provided by the first scanning line; the compensation on-off circuit is electrically connected to a second scanning line, an external compensation line and the control terminal of the driving circuit, and is configured to control to connect the external compensation line and the control terminal of the driving circuit under the control of the second scanning signal provided by the second scanning line; a first terminal of the sixth energy storage circuit is electrically connected to the control terminal of the driving circuit, and a second terminal of the sixth energy storage circuit is electrically connected to the first terminal of the driving circuit, the sixth energy storage circuit is configured to store electric energy.

Optionally, the data writing-in circuit comprises a seventeenth transistor, the compensation on-off circuit comprises an eighteenth transistor, and the driving circuit comprises a driving transistor; a control electrode of the seventeenth transistor is electrically connected to the first scanning line, a first electrode of the seventeenth transistor is electrically connected to the data line, and a second electrode of the seventeenth transistor is electrically connected to the gate electrode of the driving transistor; a control electrode of the eighteenth transistor is electrically connected to the second scanning line, a first electrode of the eighteenth transistor is electrically connected to the external compensation line, and a second electrode of the eighteenth transistor is electrically connected to the control electrode of the driving transistor; a first electrode of the driving transistor is electrically connected to the second voltage terminal; a second electrode of the driving transistor is electrically connected to the first electrode of the light emitting element.

Optionally, the seventeenth transistor, the eighteenth transistor and the driving transistor are all p-type transistors.

In a second aspect, an embodiment of the present disclosure provides a pixel driving method, applied to the pixel circuit, wherein the pixel driving method comprises; forming, by the light emitting gating control circuit, the current path between the second electrode of the light emitting element and the first voltage terminal according to the first light emitting control voltage and the light emitting data voltage under the control of the first control signal, so as to control the driving circuit to control the light emitting element to emit light; or, forming, by the light emitting gating control circuit, the current path between the driving circuit and the light emitting element according to the first light emitting control voltage and the light emitting data voltage under the control of the first control signal, so as to control the driving circuit to control the light emitting element to emit light.

Optionally, the light emitting gating control circuit is further electrically connected to the second light emitting control voltage terminal; the light emitting gating control circuit comprises a first light emitting control circuit, a second light emitting control circuit, a first gating control circuit and a second gating control circuit; the pixel driving method includes; writing, by the first gating control circuit, the first light emitting control voltage into the first light emitting control terminal under the control of the first control signal; writing, by the second gating control circuit, the second light emitting control voltage into the second control terminal under the control of the first control signal, and writing the light emitting data voltage into the second light emitting control terminal under the control of the potential of the second control terminal; controlling, by the first light emitting control circuit, to connect the second electrode of the light emitting element and the first voltage terminal under the control of the potential of the first light emitting control terminal; controlling, by the second light emitting control circuit, to connect the second electrode of the light emitting element and the first voltage terminal under the control of the potential of the second light emitting control terminal.

Optionally, the light emitting gating control circuit is also electrically connected to the light emitting control signal terminal; the light emitting gating control circuit comprises a third light emitting control circuit, a writing-in control circuit and a first control circuit; the pixel driving method includes: controlling, by the writing-in control circuit, to connect the first light emitting control voltage terminal and the writing-in node under the control of the first control signal; controlling, by the first control circuit, to write the light emitting data voltage or the light emitting control signal into the control terminal of the third light emitting control circuit under the control of a potential of the writing-in node; forming, by the third light emitting control circuit, the current path under the control of a potential of a control terminal of the third light emitting control circuit.

Optionally, the light emitting gating control circuit comprises a fourth light emitting control circuit, a fifth light emitting control circuit and a third gating control circuit; the pixel driving method comprises: controlling, by the third gating control circuit, the first light emitting control voltage terminal to write the first light emitting control voltage to a control terminal of the fourth light emitting control circuit under the control of the first control signal; forming, by the fourth light emitting control circuit, the current path under the control of a potential of the control terminal of the fourth light emitting control circuit; forming, by the fifth light emitting control circuit, the current path under the control of a potential of a control terminal of the fifth light emitting control circuit.

Optionally, the light emitting gating control circuit includes a sixth light emitting control circuit, a seventh light emitting control circuit, a fourth gating control circuit, and a fifth gating control circuit; the pixel driving method includes: controlling, by the fourth gating control circuit, to connect the first light emitting control voltage terminal and a control terminal of the sixth light emitting control circuit under the control of the first control signal; controlling, by the fifth gating control circuit, to connect the light emitting data voltage terminal and a control terminal of the seventh light emitting control circuit under the control of a potential of the control terminal of the sixth light emitting control circuit; forming, by the sixth light emitting control circuit, the current path under the control of the potential of the control terminal of the sixth light emitting control circuit; forming, by the seventh light emitting control circuit, the current path under the control of a potential of a control terminal of the seventh light emitting control circuit.

In a third aspect, an embodiment of the present disclosure provides a display device including the pixel circuit substrate.

DETAILED DESCRIPTION

The following will clearly and completely describe the technical solutions in the embodiments of the present disclosure with reference to the accompanying drawings in the embodiments of the present disclosure. Apparently, the described embodiments are only some of the embodiments of the present disclosure, not all of them. Based on the embodiments in the present disclosure, all other embodiments obtained by persons of ordinary skill in the art without creative work belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a triode, the control electrode can be a base, the first electrode can be a collector, and the second electrode can be an emitter; or, the control electrode can be a base, the first electrode may be an emitter, and the second electrode may be a collector.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
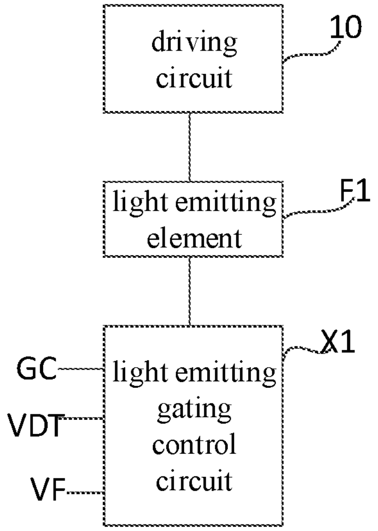
FIG. 1 is a structural diagram of a pixel circuit according to at least one embodiment of the present disclosure.

As shown in FIG. 1, the pixel circuit according to at least one embodiment of the present disclosure includes a driving circuit 10, a light emitting element F1 and a light emitting gating control circuit X1;

The driving circuit 10 is electrically connected to a first electrode of the light emitting element F1, and is configured to drive the light emitting element F1;

The light emitting gating control circuit X1 is electrically connected to a second electrode of the light emitting element F1, a first control terminal GC, a first light emitting control voltage terminal VDT, and a light emitting data voltage terminal VF, and is configured to form a current path between the second electrode of the light emitting element F1 and the first voltage terminal V1 under the control of the first control signal provided by the first control terminal GC according to the first light emitting control voltage provided by the first light emitting control voltage terminal VDT and the light emitting data voltage HF provided by the light emitting data voltage terminal VF, to control the driving circuit 10 to control the light emitting element to emit light.

The pixel circuit according to at least one embodiment of the present disclosure can realize the dimming function through a simple structure, and the embodiment of the present disclosure can provide a pixel circuit with a pulse width modulation function to achieve low grayscale external compensation, which is conducive to realizing high PPI.

In at least one embodiment of the present disclosure, HF may be a high-frequency pulse width modulation (PWM) signal, Optionally, the first voltage terminal may be a low voltage terminal, but not limited thereto.

Figure 2:
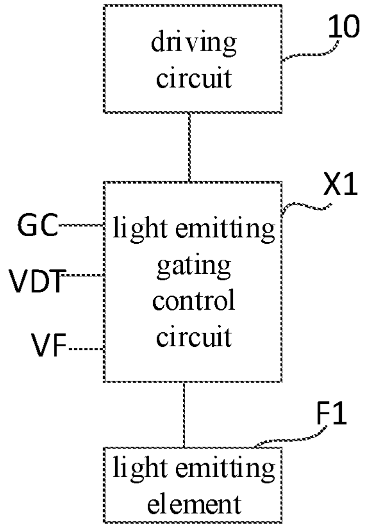
FIG. 2 is a structural diagram of a pixel circuit according to at least one embodiment of the present disclosure.

As shown in FIG. 2, the pixel circuit according to at least one embodiment of the present disclosure includes a driving circuit 10, a light emitting element F1 and a light emitting gating control circuit X1;

The driving circuit 10 is electrically connected to the light emitting element F1 through the light emitting gating control circuit X1;

The light emitting gating control circuit X1 is electrically connected to the driving circuit 10, the first control terminal GC, the first control voltage terminal VDT and the light emitting data voltage terminal VF respectively, and is configured to form a current path between the driving circuit 10 and the light emitting element F1 under the control the first control signal according to the first light emitting control voltage and the light emitting data voltage HF, to control the driving circuit 10 to control the light emitting element F1 to emit light.

The pixel circuit according to at least one embodiment of the present disclosure can realize the dimming function through a simple structure, and the embodiment of the present disclosure can provided a pixel circuit with a pulse width modulation function to achieve low grayscale external compensation, which is conducive to realizing high PPI.

Optionally, the light emitting gating control circuit may also be electrically connected to the second light emitting control voltage terminal; the light emitting gating control circuit is also configured to from the current path under the control of the second light emitting control voltage provided by the second light emitting control voltage terminal;

The light emitting gating control circuit includes a first light emitting control circuit, a second light emitting control circuit, a first gating control circuit and a second gating control circuit;

The first light emitting control circuit is electrically connected to the first light emitting control terminal, the second electrode of the light emitting element, and the first voltage terminal, and is configured to control to connect the second electrode of the light emitting element and the first voltage terminal under the control of the potential of the second light emitting control terminal;

The second light emitting control circuit is electrically connected to the second light emitting control terminal, the second electrode of the light emitting element, and the first voltage terminal, and is configured to control to connect the second electrode of the light emitting element and the first voltage terminal under the control of the potential of the second light emitting control terminal;

The first gating control circuit is electrically connected to the first control terminal, the first light emitting control voltage terminal and the first light emitting control terminal respectively, and is configured to write the first light emitting control voltage provided by the first light emitting control voltage terminal into the first light emitting control terminal under the control of the first control signal provided by the first control terminal;

The second gating control circuit is electrically connected to the first control terminal, the second light emitting control voltage terminal, the second control terminal, the light emitting data voltage terminal and the second light emitting control terminal, and is configured to write the second light emitting control voltage provided by the second light emitting control voltage terminal into the second control terminal under the control of the first control signal provided by the first control terminal, and write the light emitting data voltage provided by the light emitting data voltage terminal into the second light emitting control terminal under the control of a potential of the second control terminal.

Figure 3:
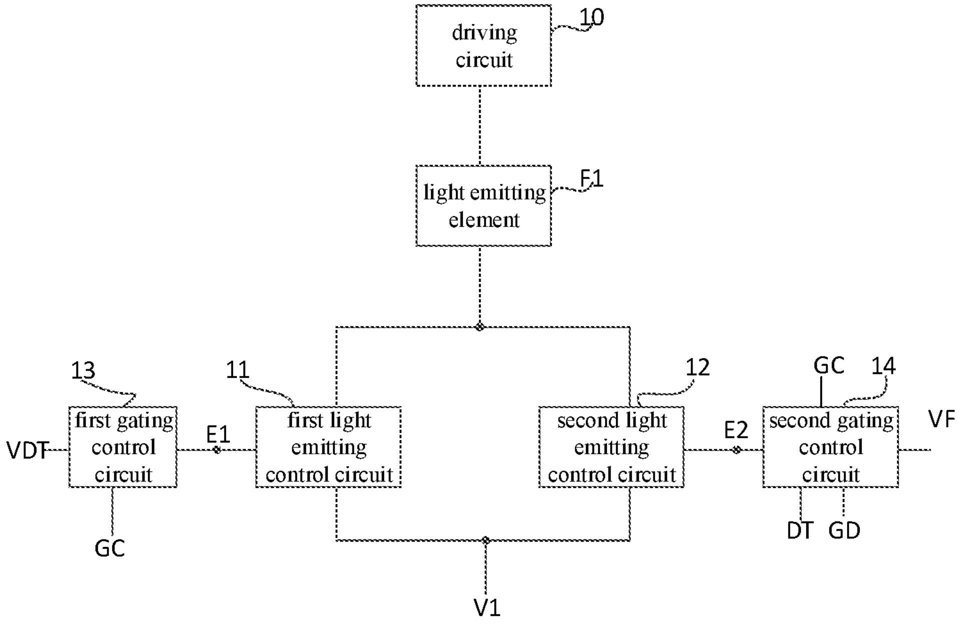
FIG. 3 is a structural diagram of a pixel circuit according to at least one embodiment of the present disclosure.

As shown in FIG. 3, the pixel circuit according to the embodiment of the present disclosure includes a driving circuit 10, a light emitting element F1, a first light emitting control circuit 11, a second light emitting control circuit 12, a first gating control circuit 13 and a second gating control circuit 14;

The driving circuit 10 is electrically connected to the first electrode of the light emitting element F1, and is configured to drive the light emitting element F1;

The first light emitting control circuit 11 is electrically connected to the first light emitting control terminal E1, the second electrode of the light emitting element F1, and the first voltage terminal V1, respectively, is configured to control to connect the second electrode of the light emitting element F1 and the first voltage terminal V1 under the control of the potential of the first light emitting control terminal E1;

The second light emitting control circuit 12 is electrically connected to the second light emitting control terminal E2, the second electrode of the light emitting element F1 and the first voltage terminal V1 respectively, is configured to control to connect the second electrode of the light emitting element F1 and the first voltage terminal V1 under the control of the potential of the second light emitting control terminal E2;

The first gating control circuit 13 is electrically connected to the first control terminal GC, the first light emitting control voltage terminal VDT and the first light emitting control terminal E1 respectively, and is configured to write the first light emitting control voltage provided by the first light emitting control voltage terminal VDT into the first light emitting control terminal E1 under the control of the first control signal provided by the first light emitting control terminal E1;

The second gating control circuit 14 is electrically connected to the first control terminal GC, the second light emitting control voltage terminal DT, the second control terminal GD, the light emitting data voltage terminal VF and the second light emitting control terminal E2 respectively, is configured to write the second light emitting control voltage provided by the second light emitting control voltage terminal DT into the second control terminal GD under the control of the first control signal provided by the first control terminal GC, control to write the light emitting data voltage HF provided by the light emitting data voltage terminal VF into the second light emitting control terminal E2 under the control of the potential of the second control terminal GD.

In at least one embodiment of the present disclosure, the first voltage terminal may be a low voltage terminal, but not limited thereto.

In at least one embodiment of the present disclosure, the light emitting element may be miniature light emitting diode (Micro LED) or miniature light emitting diode (mini LED), but not limited thereto.

When the pixel circuit shown in FIG. 3 of the present disclosure is working, the display cycle includes a first time period and a second time period set successively;

In the first time period, under the control of the first control signal, the first gating control circuit 13 writes the first light emitting control voltage provided by VDT into the first light emitting control terminal E1; the second gating control circuit 14 writes the second light emitting control voltage provided by DT into the second control terminal GD under the control of the first control signal; the second gating control circuit 14 writes the light emitting data voltage into the second light emitting control terminal E2 under the control of the potential of the second control terminal GD;

In the second time period, when the first light emitting control circuit 11 controls the connection between the second electrode of the light emitting element F1 and the first voltage terminal V1 under the control of the potential of the first light emitting control terminal E1, the driving circuit 10 drives the light emitting element F1 to emit light, and performs Pulse Amplitude Modulation (PAM) dimming work;

In the second time period, when the first light emitting control circuit 11 controls to disconnect the second electrode of the light emitting element F1 and the first voltage terminal V1 under the control of the potential of the first light emitting control terminal E1, the second light emitting control circuit 12 controls to connect or disconnect the second electrode of the light emitting element F1 and the first voltage terminal V1 under the control of the potential of the light emitting data voltage HF, so as to perform PWM dimming work, wherein HF is a PWM signal.

The pixel circuit according to the embodiment of the present disclosure can realize the dimming function through a simple structure, and the embodiment of the present disclosure can provided a pixel circuit with a pulse width modulation function to achieve low grayscale external compensation, which is conducive to realizing high PPI.

In at least one embodiment of the present disclosure, HF may be a high-frequency PWM signal. When the pixel circuit shown in FIG. 1 is in operation, in the second time period, when the first light emitting control circuit 11 control to disconnect the second electrode of the light emitting element F1 and the first voltage terminal V1 under the control of the potential of the first light emitting control terminal E1, the second light emitting control circuit 12 controls to connect or disconnect the second electrode of the light emitting element F1 and the first voltage terminal V1 under the control of the potential of the light emitting data voltage HF, to perform PWM dimming work, to control the short-time high-frequency light emitting of the light emitting element F1, to achieve the low grayscale.

In at least one embodiment of the present disclosure, the pixel circuit may further include a first energy storage circuit and a second energy storage circuit;

A first terminal of the first energy storage circuit is electrically connected to the first light emitting control terminal, a second terminal of the first energy storage circuit is electrically connected to the first initial voltage terminal, and the first energy storage circuit is configured to store electrical energy;

A first terminal of the second energy storage circuit is electrically connected to the second control terminal, a second terminal of the second energy storage circuit is electrically connected to the second initial voltage terminal, and the second energy storage circuit is configured to store electrical energy.

Figure 4:
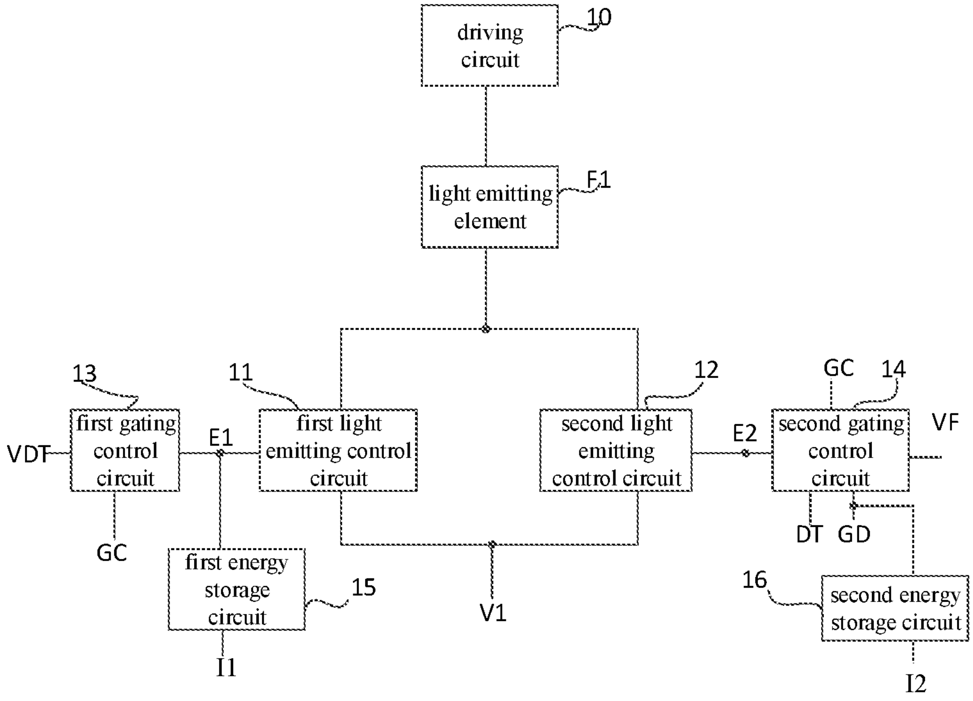
FIG. 4 is a structural diagram of a pixel circuit according to at least one embodiment of the present disclosure.

As shown in FIG. 4, based on the embodiment of the pixel circuit shown in FIG. 3, the pixel circuit according to at least one embodiment of the present disclosure further includes a first energy storage circuit 15 and a second energy storage circuit 16;

The first terminal of the first energy storage circuit 15 is electrically connected to the first light emitting control terminal E1, the second terminal of the first energy storage circuit 15 is electrically connected to the first initial voltage terminal I1, and the first energy storage circuit 15 is configured to store electric energy; the first initial voltage terminal I1 is configured to provide a first initial voltage;

The first terminal of the second energy storage circuit 16 is electrically connected to the second control terminal GD, the second terminal of the second energy storage circuit 16 is electrically connected to the second initial voltage terminal 12, and the second energy storage circuit 16 is configured to store electric energy; the second initial voltage terminal 12 is configured to provide a second initial voltage.

In at least one embodiment of the present disclosure, the first initial voltage terminal and the second initial voltage terminal may be the same initial voltage terminal, but not limited thereto.

When the pixel circuit shown in FIG. 4 is working, in the second time period, the first energy storage circuit 15 maintains the potential of the first light emitting control terminal E1, and the second energy storage circuit 16 maintains the potential of the second control terminal GD.

In at least one embodiment of the present disclosure, the light emitting gating control circuit is further electrically connected to the light emitting control signal terminal, and is further configured to form the current path according to the light emitting control signal provided by the light emitting control signal terminal;

The light emitting gating control circuit includes a third light emitting control circuit, a writing-in control circuit, a first control circuit and a third energy storage circuit;

The writing-in control circuit is electrically connected to the first control terminal, the first light emitting control voltage terminal and the writing-in node respectively, and is configured to control to connect the first light emitting control voltage terminal and the writing-in node under the control of the first control signal provided by the first control terminal;

The first control circuit is electrically connected to the control terminal of the third light emitting control circuit, the writing-in node, the light emitting data voltage terminal, and the light emitting control signal terminal, is configured to control to write the light emitting data voltage or the light emitting control signal provided by the light emitting control signal terminal into the control terminal of the third light emitting control circuit under the control of the potential of the writing-in node;

The third light emitting control circuit is electrically connected to the second electrode of the light emitting element and the first voltage terminal, and the third light emitting control circuit is configured to form the current path under the control of the potential of the control terminal thereof;

A first terminal of the third energy storage circuit is electrically connected to the writing-in node, a second terminal of the third energy storage circuit is electrically connected to an initial voltage terminal, and the third energy storage circuit is used for storing electric energy.

In specific implementation, the light emitting gating control circuit may include a third light emitting control circuit, a writing-in control circuit and a first control circuit; The writing-in control circuit writes the first light emitting control voltage provided by the first light emitting control voltage terminal into the writing-in node under the control of the first control signal, the first control circuit writes the light emitting data voltage or light emitting control signal into the control terminal of the third light emitting control circuit under the control of the potential of the writing-in node, and the third light emitting control circuit forms the current path under the control of the potential of its control terminal, and the third energy storage circuit is configured to maintain the potential of the writing-in node.

Figure 5:
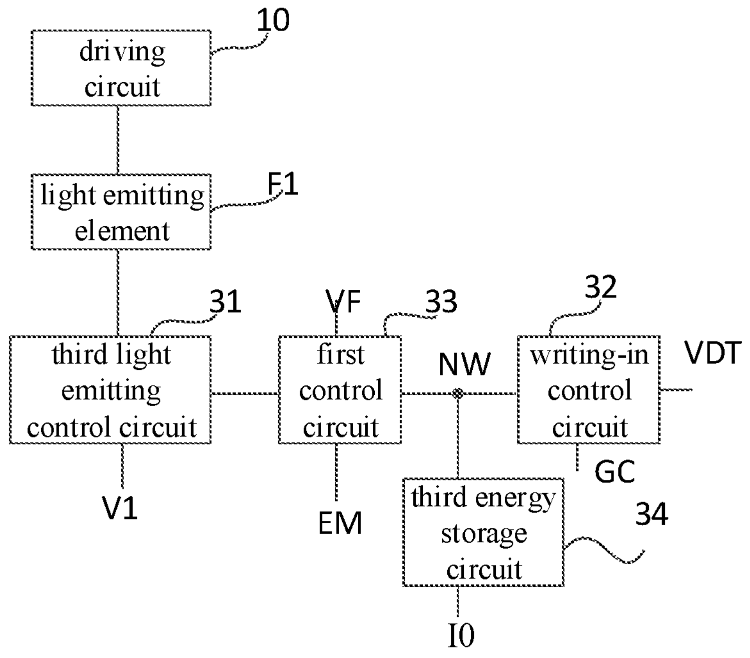
FIG. 5 is a structural diagram of a pixel circuit according to at least one embodiment of the present disclosure.

As shown in FIG. 5, on the basis of the embodiment of the pixel circuit shown in FIG. 1, the light emitting gating control circuit includes the third light emitting control circuit 31, the writing-in control circuit 32, the first control circuit 33 and the third energy storage circuit 34;

The writing-in control circuit 32 is electrically connected to the first control terminal GC, the first light emitting control voltage terminal VDT and the writing-in node NW respectively, and is configured to control to connect the first light emitting control voltage terminal VDT and the writing-in node NW under the control of the first control signal provided by the first control terminal GC;

The first control circuit 33 is electrically connected to the control terminal of the third light emitting control circuit 31, the writing-in node NW, the light emitting data voltage terminal VF, and the light emitting control signal terminal EM, and is configured to write the light emitting data voltage HF provided by the light emitting data voltage terminal VF or the light emitting control signal provided by the light emitting control signal terminal EM into the control terminal of the third light emitting control circuit 31 under the control of the potential of the writing-in node NW;

The third light emitting control circuit 31 is electrically connected to the second electrode of the light emitting element F1 and the first voltage terminal V1 respectively, and the third light emitting control circuit 31 is configured to form the current path under the control of the potential of the control terminal of the third light emitting control circuit 31;

The first terminal of the third energy storage circuit 34 is electrically connected to the writing-in node NW, the second terminal of the third energy storage circuit 34 is electrically connected to the initial voltage terminal 10, and the third energy storage circuit is used for storing electrical energy.

When at least one embodiment of the pixel circuit shown in FIG. 5 of the present disclosure is in operation, the first display period may include the first writing-in phase and the first light emitting phase set successively, and the second display period may include the second writing-in phase and a second light emitting phase set successively;

In the first writing-in phase, under the control of the first control signal, the writing-in control circuit 32 controls the connection between the first light emitting control voltage terminal VDT and the writing-in node NW, and the first control circuit 33 writes the light emitting control signal provided by the light emitting control signal terminal EM into the control terminal of the third light emitting control circuit 31 under the writing-in node NW;

In the first light emitting phase, the third energy storage circuit 34 maintains the potential of the writing-in node NW; the first control circuit 33 controls to write the light emitting control signal provided by the light emitting control signal terminal EM into the control terminal of the third light emitting control circuit 31 under the control of the writing-in node NW; the third light emitting control circuit 31 forms the current path under the control of the light emitting control signal provided by the EM, and the driving circuit 10 drives the light emitting element F1 to emit light during the whole time of the first light emitting phase, to perform the PAM dimming;

In the second writing-in phase, under the control of the first control signal, the writing-in control circuit 32 controls the connection between the first light emitting control voltage terminal VDT and the writing-in node NW, and the first control circuit 33 writes the light emitting data voltage HF into the control terminal of the third light emitting control circuit 31 under the control of the writing-in node NW;

In the second light emitting phase, the third energy storage circuit 34 maintains the potential of the writing-in node NW; the first control circuit 33 writes the light emitting data voltage HF into the control terminal of the third light emitting control circuit 31 under the control of the writing-in node NW; the third light emitting control circuit 31 forms the current path under the control of the light emitting data voltage HF, and the light emitting data voltage HF can be a high-frequency PWM signal for PWM dimming.

Optionally, the light emitting gating control circuit includes a fourth light emitting control circuit, a fifth light emitting control circuit, a third gating control circuit and a fourth energy storage circuit;

The third gating control circuit is electrically connected to the first control terminal, the first light emitting control voltage terminal and a control terminal of the fourth light emitting control circuit respectively, and is configured to control the first light emitting control voltage terminal to write the first light emitting control voltage to the control terminal of the fourth light emitting control circuit under the control of the first control terminal provided by the first control terminal;

The fourth light emitting control circuit is also electrically connected to the second electrode of the light emitting element and the first voltage terminal, is configured to form the current path under the control of the potential of the control terminal of the fourth light emitting control circuit;

A control terminal of the fifth light emitting control circuit is electrically connected to the light emitting data voltage terminal, and the fifth light emitting control circuit is also electrically connected to the second electrode of the light emitting element and the first voltage terminal respectively, is configured to form the current path under the control of the potential of the control terminal of the fifth light emitting control circuit;

The first terminal of the fourth energy storage circuit is electrically connected to the control terminal of the fourth light emitting control circuit, the second terminal of the fourth energy storage circuit is electrically connected to the initial voltage terminal, and the fourth energy storage circuit is configured to store electrical energy.

During specific implementation, the light emitting gating circuit may include a fourth light emitting control circuit, a fifth light emitting control circuit, and a third gating control circuit, and the third gating control circuit writes the first light emitting control voltage into the control terminal of the fourth light emitting control circuit, and the fourth light emitting control terminal circuit forms the current path under the control of the potential of the control terminal thereof; the fifth light emitting control circuit forms the current path under the control of the light emitting data voltage; the fourth energy storage circuit maintains the potential of the control terminal of the fourth light emitting control circuit.

Figure 6:
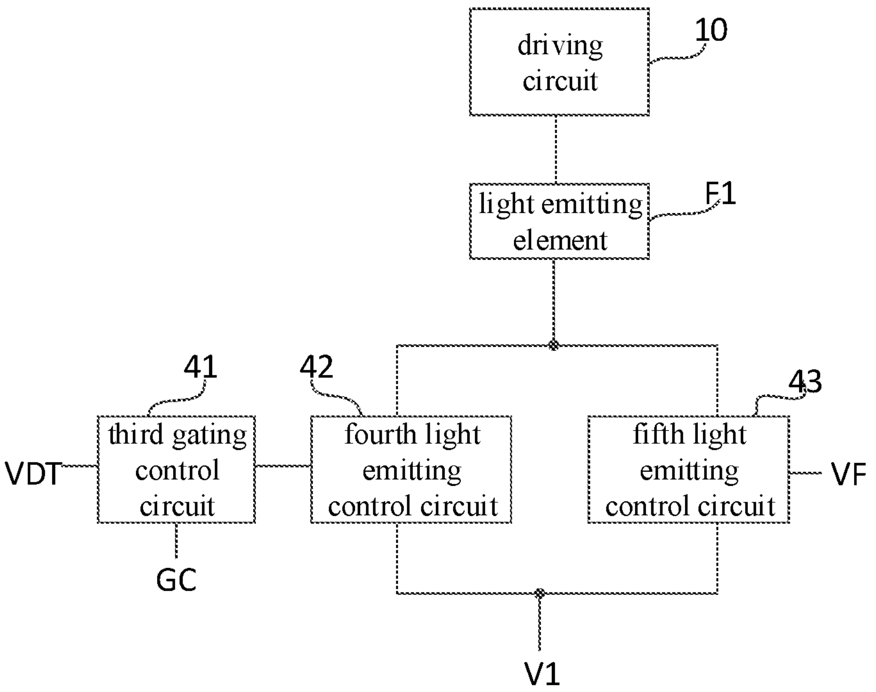
FIG. 6 is a structural diagram of a pixel circuit according to at least one embodiment of the present disclosure.

As shown in FIG. 6, on the basis of the embodiment of the pixel circuit shown in FIG. 1, the light emitting gating control circuit includes the fourth light emitting control circuit 41, the fifth light emitting control circuit 42, the third gating control circuit 43 and the fourth energy storage circuit 44;

The third gating control circuit 43 is electrically connected to the first control terminal GC, the first light emitting control voltage terminal VDT and the control terminal of the fourth light emitting control circuit 41 respectively, is configured to control the first light emitting control voltage terminal VDT to write the first light emitting control voltage to the control terminal of the fourth light emitting control circuit 41 under the control of the first control signal provided by the first control terminal GC;

The fourth light emitting control circuit 41 is also electrically connected to the second electrode of the light emitting element F1 and the first voltage terminal V1, is configured to form the current path under the control of the potential of the control terminal of the fourth light emitting control circuit 41;

The control terminal of the fifth light emitting control circuit 42 is electrically connected to the light emitting data voltage terminal VF, and the fifth light emitting control circuit 42 is also electrically connected to the second electrode of the light emitting element F1 and the first voltage terminal V1 respectively, is configured to form the current path under the control of the potential of the control terminal of the fifth light emitting control circuit 42; the light emitting data voltage terminal VF is used for providing the light emitting data voltage HF;

The first terminal of the fourth energy storage circuit 44 is electrically connected to the control terminal of the fourth light emitting control circuit 41, the second terminal of the fourth energy storage circuit 44 is electrically connected to the initial voltage terminal 10, and the fourth energy storage circuit 44 is used for storing electric energy.

When at least one embodiment of the pixel circuit shown in FIG. 6 of the present disclosure is in operation, the first display period includes the first writing-in phase and the first light emitting phase set successively, and the second display period includes the second writing-in phase and a second light emitting phase set successively;

In the first writing-in phase, the third gating control circuit 43 controls the first light emitting control voltage terminal VDT to write a first first light emitting control voltage to the control terminal of the fourth light emitting control circuit 41 under the control of the first control signal;

In the first light emitting phase, the fourth energy storage circuit 44 maintains the potential of the control terminal of the fourth light emitting control circuit 41; the fourth light emitting control circuit 41 forms the current path under the control of the potential of the control terminal thereof. During all the time of the first light emitting phase, the driving circuit 10 drives the light emitting element F1 to perform PAM dimming;

In the second writing-in phase, the third gating control circuit 43 controls the first light emitting control voltage terminal VDT to write a second first light emitting control voltage into the control terminal of the fourth light emitting control circuit 41 under the control of the first control signal.;

In the second light emitting phase, the fourth energy storage circuit 44 maintains the potential of the control terminal of the fourth light emitting control circuit 41; the fifth light emitting control circuit 42 forms the current path under the control of the light emitting data voltage HF, to perform PWM dimming; the light emitting data voltage HF is a high-frequency PWM signal.

Optionally, the light emitting gating control circuit includes a sixth light emitting control circuit, a seventh light emitting control circuit, a fourth gating control circuit, a fifth gating control circuit, and a fifth energy storage circuit;

The fourth gating control circuit is electrically connected to the first control terminal, the first light emitting control voltage terminal and the control terminal of the sixth light emitting control circuit, and is configured to control to connect the first light emitting control voltage terminal and the control terminal of the sixth light emitting control circuit under the control of the first control signal;

The fifth gating control circuit is electrically connected to the control terminal of the sixth light emitting control circuit, the light emitting data voltage terminal, and the control terminal of the seventh light emitting control circuit, is configured to control to connect the light emitting data voltage terminal and the control terminal of the seventh light emitting control circuit under the control of the potential of the control terminal of the sixth light emitting control circuit;

The sixth light emitting control circuit is electrically connected to the second electrode of the light emitting element and the first voltage terminal, and is configured to form the current path under the control of the potential of the control terminal of the sixth light emitting control circuit;

The seventh light emitting control circuit is electrically connected to the second electrode of the light emitting element and the first voltage terminal respectively, and is configured to form the current path under the control of the potential of the control terminal of the seventh light emitting control circuit;

The first terminal of the fifth energy storage circuit is electrically connected to the control terminal of the sixth light emitting control circuit, the second terminal of the fifth energy storage circuit is electrically connected to the initial voltage terminal, and the fifth energy storage circuit is configured to store electrical energy.

In specific implementation, the light emitting gating control circuit may include a sixth light emitting control circuit, a seventh light emitting control circuit, a fourth gating control circuit, a fifth gating control circuit and a fifth energy storage circuit, and the fourth gating control circuit controls to connect the first light emitting control voltage terminal and the control terminal of the sixth light emitting control circuit under the control of the first control signal; the fifth gating control circuit controls to connect the light emitting data voltage terminal and the control terminal of the seventh light emitting control circuit under the control of the potential of the control terminal of the sixth light emitting control circuit; the sixth light emitting control circuit forms the current path under the control of the potential of the control terminal thereof; the seventh light emitting control circuit forms the current path under the control of the potential of the control terminal thereof; the fifth energy storage circuit maintains the potential of the sixth light emitting control circuit.

Figure 7:
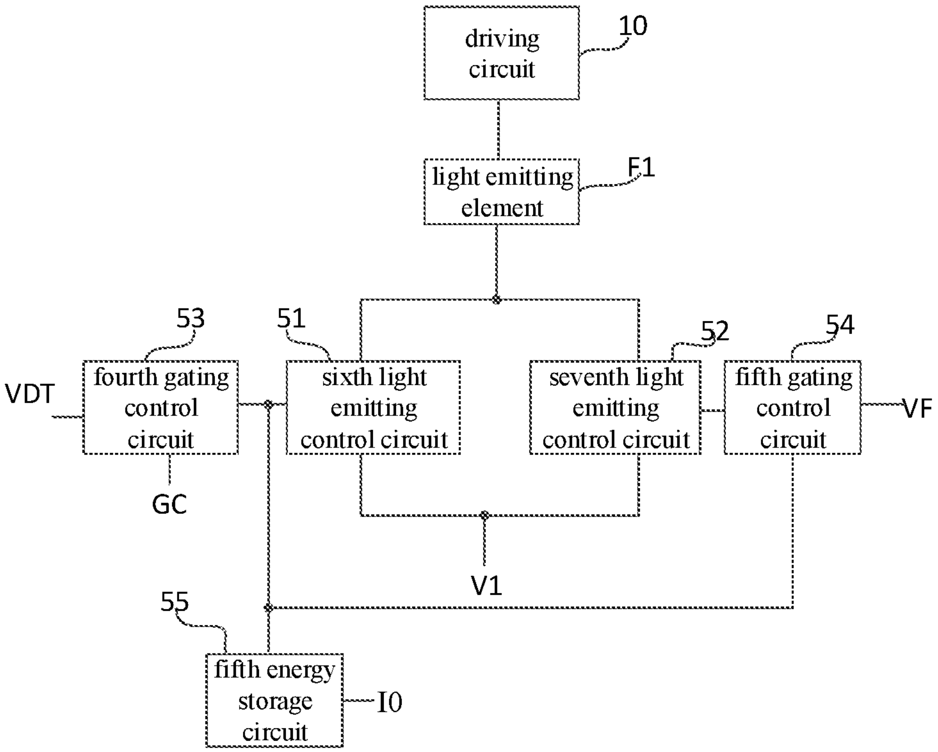
FIG. 7 is a structural diagram of a pixel circuit according to at least one embodiment of the present disclosure.

As shown in FIG. 7, on the basis of the embodiment of the pixel circuit shown in FIG. 1, the light emitting gating control circuit includes the sixth light emitting control circuit 51, the seventh light emitting control circuit 52, the fourth gating control circuit 53, the fifth gating control circuit 54 and the fifth energy storage circuit 55;

The fourth gating control circuit 53 is electrically connected to the first control terminal GC, the first light emitting control voltage terminal VDT, and the control terminal of the sixth light emitting control circuit 51 respectively, is configured to control the connection between the first light emitting control voltage terminal VDT and the control terminal of the sixth light emitting control circuit 51 under the control of the first control signal provided by the first control terminal GC;

The fifth gating control circuit 54 is electrically connected to the control terminal of the sixth light emitting control circuit 51, the light emitting data voltage terminal VF and the control terminal of the seventh light emitting control circuit 52, control to connect the light emitting data voltage terminal VF and the control terminal of the seventh light emitting control circuit 52 under the control of the potential of the control terminal of the sixth light emitting control circuit 51;

The sixth light emitting control circuit 51 is electrically connected to the second electrode of the light emitting element F1 and the first voltage terminal V1 respectively, and is configured to form said current path under the control of the potential of the control terminal of the sixth light emitting control circuit 51;

The seventh light emitting control circuit 52 is electrically connected to the second electrode of the light emitting element F1 and the first voltage terminal V1 respectively, and is configured to form the current path under the control of the potential of the control terminal of the seventh light emitting control circuit 52;

The first terminal of the fifth energy storage circuit 55 is electrically connected to the control terminal of the sixth light emitting control circuit 51, the second terminal of the fifth energy storage circuit 55 is electrically connected to the initial voltage terminal 10, and the fifth energy storage circuit 55 is used for storing electric energy.

When at least one embodiment of the pixel circuit shown in FIG. 7 of the present disclosure is in operation, the display cycle may include a writing-in phase and a light emitting phase that are set successively;

In the writing-in phase, the fourth gating control circuit 53 controls the connection between the first light emitting control voltage terminal VDT and the control terminal of the sixth light emitting control circuit 51 under the control of the first control signal, so as to apply the first light emitting control voltage provided by VDT to the sixth light emitting control circuit 51;

In the light emitting phase, the fifth energy storage circuit 55 maintains the potential of the control terminal of the sixth light emitting control circuit 51;

When in the writing-in phase, VDT provides the first first light emitting control voltage, in the light emitting phase, the sixth light emitting control circuit 51 forms the current path under the control of the potential of its control terminal to perform PAM dimming;

In the writing-in phase, when VDT provides the second first light emitting control voltage, the fifth gating control circuit 54 controls to connect the light emitting data voltage terminal VF and the control terminal of the seventh light emitting control circuit 52 under the control of the potential of the control terminal of the sixth light emitting control circuit 51; in the light emitting phase, the fifth energy storage circuit 55 maintains the potential of the control terminal of the sixth light emitting control circuit 51, and the fifth gating control circuit 54 controls to connect the light emitting data voltage terminal VF and the control terminal of the seventh light emitting control circuit 52 under the control of the potential of the control terminal of the sixth light emitting control circuit 51, and the seventh light emitting control circuit 52 forms the current path under the control of the light emitting data voltage HF to perform PWM dimming, and HF may be a high-frequency PWM signal.

Optionally, the first light emitting control circuit includes a first transistor, and the second light emitting control circuit includes a second transistor;

A control electrode of the first transistor is electrically connected to the first light emitting control terminal, a first electrode of the first transistor is electrically connected to the second electrode of the light emitting element, and a second electrode of the first transistor is electrically connected to the first voltage terminal;

A control electrode of the second transistor is electrically connected to the second light emitting control terminal, a first electrode of the second transistor is electrically connected to the second electrode of the light emitting element, and a second electrode of the second transistor is electrically connected to the first voltage terminal.

In at least one embodiment of the present disclosure, the driving circuit includes a driving transistor; a width-to length ratio of the first transistor is greater than that of the driving transistor, and a width-to length ratio of the second transistor is greater than that of the driving transistor.

In specific implementation, the width-to-length ratio of the driving transistor is specifically determined according to the magnitude of the driving current it generates, the first transistor and the second transistor are switching transistors for light emitting control, the width-to-length ratio of the first transistor and the width-to-length ratio of the second transistor need to satisfy that the maximum current that can be provided under a small drain-source voltage Vds is greater than the driving current generated by the driving transistor, so the width-to-length ratio of the first transistor is set to be greater than the width-to-length ratio of the driving transistor, and the width-to-length ratio of the second transistor is set to be greater than the width-to-length ratio of the driving transistor.

Optionally, the first gating control circuit includes a third transistor;

A control electrode of the third transistor is electrically connected to the first control terminal, a first electrode of the third transistor is electrically connected to the first light emitting control voltage terminal, and a second electrode of the third transistor is electrically connected to the first light emitting control terminal.

Optionally, the second gating control circuit includes a fourth transistor and a fifth transistor;

A control electrode of the fourth transistor is electrically connected to the first control terminal, a first electrode of the fourth transistor is electrically connected to the second light emitting control voltage terminal, and a second electrode of the fourth transistor is electrically connected to the second control terminal;

A control electrode of the fifth transistor is electrically connected to the second control terminal, a first electrode of the fifth transistor is electrically connected to the light emitting data voltage terminal, and a second electrode of the fifth transistor is electrically connected to the second light emitting control terminal.

In at least one embodiment of the present disclosure, both the third transistor and the fourth transistor are n-type transistors, or both the third transistor and the fourth transistor are p-type transistors.

In at least one embodiment of the present disclosure, the first light emitting control voltage terminal and the second light emitting control voltage terminal are the same voltage terminal;

The first transistor is an n-type transistor, and the fifth transistor is a p-type transistor; or, the first transistor is a p-type transistor, and the fifth transistor is an n-type transistor.

In specific implementation, the first transistor and the second transistor can be set as transistors of opposite types. At this time, the first light emitting control voltage terminal and the second light emitting control voltage terminal can be the same voltage terminal, which can reduce the number of voltage terminals.

Optionally, the first energy storage circuit includes a first capacitor, and the second energy storage circuit includes a second capacitor;

A first terminal of the first capacitor is electrically connected to the first light emitting control terminal, and a second terminal of the first capacitor is electrically connected to the first initial voltage terminal;

A first terminal of the second capacitor is electrically connected to the second control terminal, and a second terminal of the second capacitor is electrically connected to the second initial voltage terminal.

Figure 8:
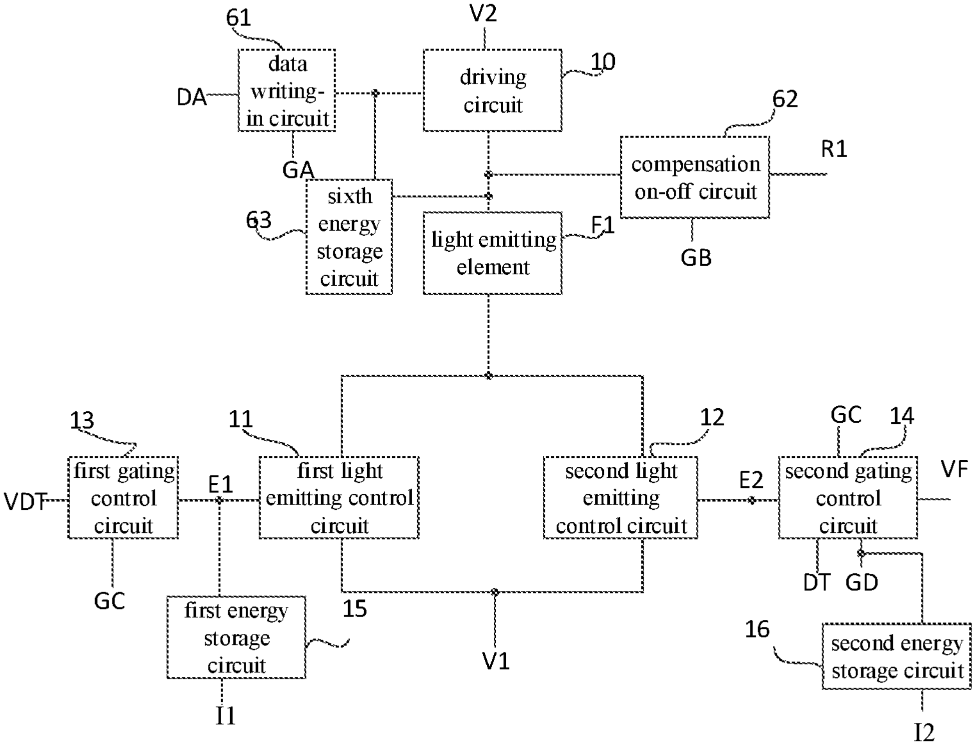
FIG. 8 is a structural diagram of a pixel circuit according to at least one embodiment of the present disclosure.

As shown in FIG. 8, on the basis of at least one embodiment of the pixel circuit shown in FIG. 4, the pixel circuit further includes a data writing-in circuit 61, a compensation on-off circuit 62 and a sixth energy storage circuit 63; the first terminal of the driving circuit 10 is electrically connected to the second voltage terminal V2; the driving circuit 10 is configured to generate a driving current under the control of the potential of its control terminal;

The data writing-in circuit 61 is electrically connected to the first scanning line GA, the data line DA and the control terminal of the driving circuit 10, and is configured to write the data voltage Vdata provided by the data line DA into the control terminal of the driving circuit 10 under the control of the first scanning signal provided by the first scanning line GA;

The compensation on-off circuit 62 is electrically connected to the second scanning line GB, an external compensation line R1 and the second terminal of the driving circuit 10 respectively, and is configured to control to connect the external compensation line R1 and the second terminal of the driving circuit 10 under the control of the second scanning signal provided by the second scanning line GB;

The first terminal of the sixth energy storage circuit 63 is electrically connected to the control terminal of the driving circuit 10, and the second terminal of the sixth energy storage circuit 63 is electrically connected to the second terminal of the driving circuit 10, so the sixth energy storage circuit 63 is used for storing electric energy.

When at least one embodiment of the pixel circuit shown in FIG. 8 of the present disclosure is working, in the first time period, the data writing-in circuit 61 writes the data voltage Vdata provided by the data line DA into the control terminal of the driving circuit 10 under the control of the first scanning signal; the compensation on-off circuit 62 controls to connect the external compensation line R1 and the second terminal of the driving circuit 10 under the control of the second scanning signal, realize the reading of the threshold voltage Vth of the driving transistor in the driving circuit 10, and complete the compensation function (the actual compensation for the data voltage can be performed in the blank time period between adjacent frames, but not limited thereto).

The embodiments of the present disclosure can provide a pixel circuit with threshold voltage compensation and PWM dimming functions in a simple structure, which is beneficial to realize high PPI.

In at least one embodiment of the present disclosure, the second voltage terminal may be a high voltage terminal, but not limited thereto.

Optionally, the data writing-in circuit includes a seventeenth transistor, the compensation on-off circuit includes an eighteenth transistor, the driving circuit includes a driving transistor; the sixth energy storage circuit includes a storage capacitor;

A control electrode of the seventeenth transistor is electrically connected to the first scanning line, a first electrode of the seventeenth transistor is electrically connected to the data line, and a second electrode of the seventeenth transistor is electrically connected to the a gate electrode of the driving transistor;

A control electrode of the eighteenth transistor is electrically connected to the second scanning line, a first electrode of the eighteenth transistor is electrically connected to the external compensation line, and a second electrode of the eighteenth transistor is electrically connected to the second electrode of the driving transistor;

The first electrode of the driving transistor is electrically connected to the second voltage terminal; the second electrode of the driving transistor is electrically connected to the first electrode of the light emitting element;

A first terminal of the storage capacitor is electrically connected to the control electrode of the driving transistor, and a second terminal of the storage capacitor is electrically connected to the second electrode of the driving transistor.

Optionally, the seventeenth transistor, the eighteenth transistor, and the driving transistor are all n-type transistors; or, the seventeenth transistor and the driving transistor are p-type transistors, and the eighteenth transistor is n-type transistor or p-type transistor.

The pixel circuit according to at least one embodiment of the present disclosure may further include a data writing-in circuit, a compensation on-off circuit, and a sixth energy storage circuit; the first terminal of the driving circuit is electrically connected to the second voltage terminal; the driving circuit is configured to generate a driving current under the control of the potential of its control terminal;

The data writing-in circuit is electrically connected to the first scanning line, the data line and the control terminal of the driving circuit, and is configured to write the data voltage provided by the data line into the control terminal of the driving circuit under the control of the first scanning signal provided by the first scanning line;

The compensation on-off circuit is electrically connected to the second scanning line, the external compensation line and the control terminal of the driving circuit, and is configured to control to connect the external compensation line and the control terminal of the driving circuit under the control of the second scanning signal provided by the second scanning line;

A first terminal of the sixth energy storage circuit is electrically connected to the control terminal of the driving circuit, a second terminal of the sixth energy storage circuit is electrically connected to the first terminal of the driving circuit, and the sixth energy storage circuit is configured to store electrical energy.

Optionally, the data writing-in circuit includes a seventeenth transistor, the compensation on-off circuit includes an eighteenth transistor, and the driving circuit includes a driving transistor;

A control electrode of the seventeenth transistor is electrically connected to the first scanning line, a first electrode of the seventeenth transistor is electrically connected to the data line, and a second electrode of the seventeenth transistor is electrically connected to the gate electrode of the driving transistor;

A control electrode of the eighteenth transistor is electrically connected to the second scanning line, a first electrode of the eighteenth transistor is electrically connected to the external compensation line, and a second electrode of the eighteenth transistor is electrically connected to the control electrode of the driving transistor;

The first electrode of the driving transistor is electrically connected to the second voltage terminal; the second electrode of the driving transistor is electrically connected to the first electrode of the light emitting element.

Optionally, the seventeenth transistor, the eighteenth transistor and the driving transistor are all p-type transistors.

Figure 9:
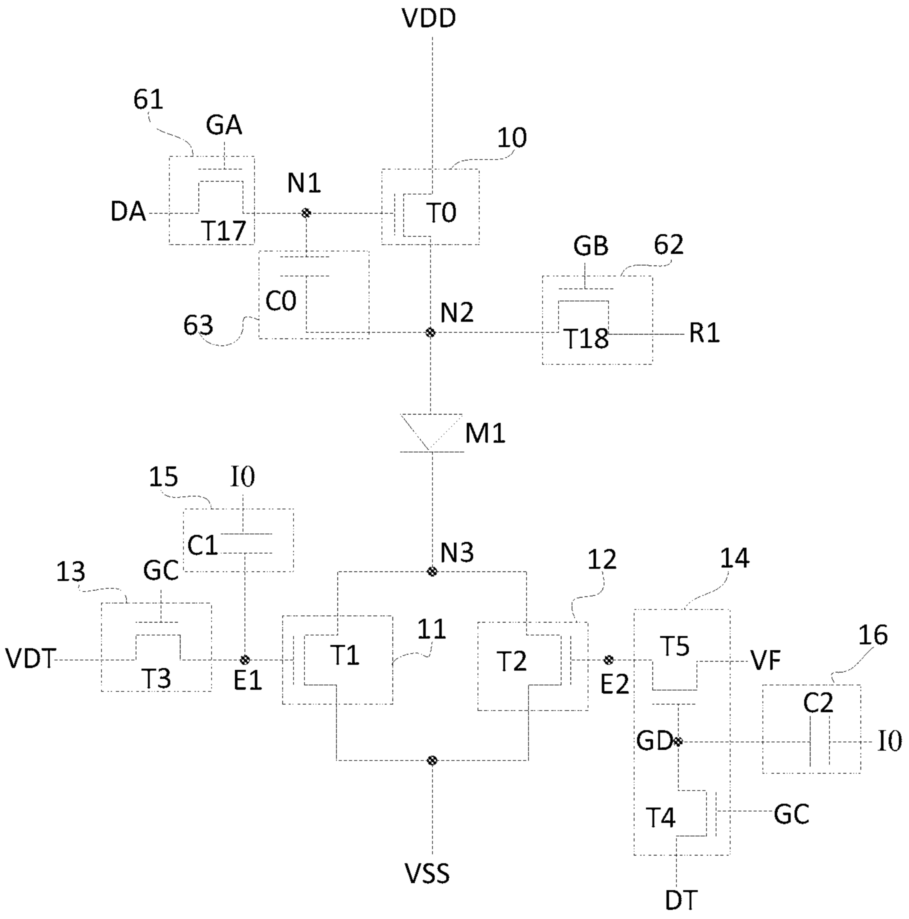
FIG. 9 is a circuit diagram of a pixel circuit according to at least one embodiment of the present disclosure.

As shown in FIG. 9, on the basis of at least one embodiment of the pixel circuit shown in FIG. 8, the first light emitting control circuit 11 includes a first transistor T1, and the second light emitting control circuit 12 includes a second transistor T2; the driving circuit 10 includes a driving transistor T0; the light emitting element is a micro light emitting diode M1;

The gate electrode of the first transistor T1 is electrically connected to the first light emitting control terminal E1, the drain electrode of the first transistor T1 is electrically connected to the cathode of the micro light emitting diode M1, and the source electrode of the first transistor T1 is electrically connected to the low voltage terminal VSS;

The gate electrode of the second transistor T2 is electrically connected to the second light emitting control terminal E2, the drain electrode of the second transistor T2 is electrically connected to the cathode of the micro light emitting diode M1, and the source electrode of the second transistor T2 is electrically connected to the low voltage terminal VSS;

The first gating control circuit 13 includes a third transistor T3;

The gate electrode of the third transistor T3 is electrically connected to the first control terminal GC, the drain electrode of the third transistor T3 is electrically connected to the first light emitting control voltage terminal VDT, and the source electrode of the third transistor T3 is electrically connected to the first light emitting control terminal E1;

The second gating control circuit 14 includes a fourth transistor T4 and a fifth transistor T5;

The gate electrode of the fourth transistor T4 is electrically connected to the first control terminal GC, the drain electrode of the fourth transistor T4 is electrically connected to the second light emitting control voltage terminal DT, and the source electrode of the fourth transistor T4 is electrically connected to the second control terminal GD;

The gate electrode of the fifth transistor T5 is electrically connected to the second control terminal GD, the drain electrode of the fifth transistor T5 is electrically connected to the light emitting data voltage terminal VF, and the source electrode of the fifth transistor T5 is electrically connected to the second light emitting control terminal E2; the light emitting data voltage terminal VF is configured to provide light emitting data voltage HF;

The first energy storage circuit 15 includes a first capacitor C1, and the second energy storage circuit 16 includes a second capacitor C2;

The first terminal of the first capacitor C1 is electrically connected to the first light emitting control terminal E1, and the second terminal of the first capacitor C1 is electrically connected to the initial voltage terminal 10; the initial voltage terminal I0 is configured to provide an initial voltage Vinit;

The first terminal of the second capacitor C2 is electrically connected to the second control terminal GD, and the second terminal of the second capacitor C2 is electrically connected to the initial voltage terminal I0;

The data writing-in circuit 61 includes a seventeenth transistor T17, the compensation on-off circuit 62 includes an eighteenth transistor T18; the sixth energy storage circuit 63 includes a storage capacitor C0;

The gate electrode of the seventeenth transistor T17 is electrically connected to the first scanning line GA, the drain electrode of the seventeenth transistor T17 is electrically connected to the data line DA, and the source electrode of the seventeenth transistor T17 electrically connected to the gate electrode of the driving transistor T0;

The gate electrode of the eighteenth transistor T18 is electrically connected to the second scanning line GB, the drain electrode of the eighteenth transistor T18 is electrically connected to the external compensation line R1, and the source electrode of the eighteenth transistor T18 is electrically connected to the source electrode of the driving transistor T0;

The drain electrode of the driving transistor T0 is electrically connected to the high voltage terminal VDD; the source electrode of the driving transistor T0 is electrically connected to the anode of M1;

A first terminal of the storage capacitor C0 is electrically connected to the gate electrode of the driving transistor T0, and a second terminal of the storage capacitor C0 is electrically connected to the source electrode of the driving transistor T0.

In at least one embodiment of the pixel circuit shown in FIG. 9, all transistors are n-type thin film transistors, but not limited thereto.

In at least one embodiment shown in FIG. 9, the first node N1 is electrically connected to the gate electrode of the driving transistor T0, the second node N2 is electrically connected to the source electrode of the driving transistor T0, and the third node N3 is electrically connected to the cathode of M1.

Figure 10:
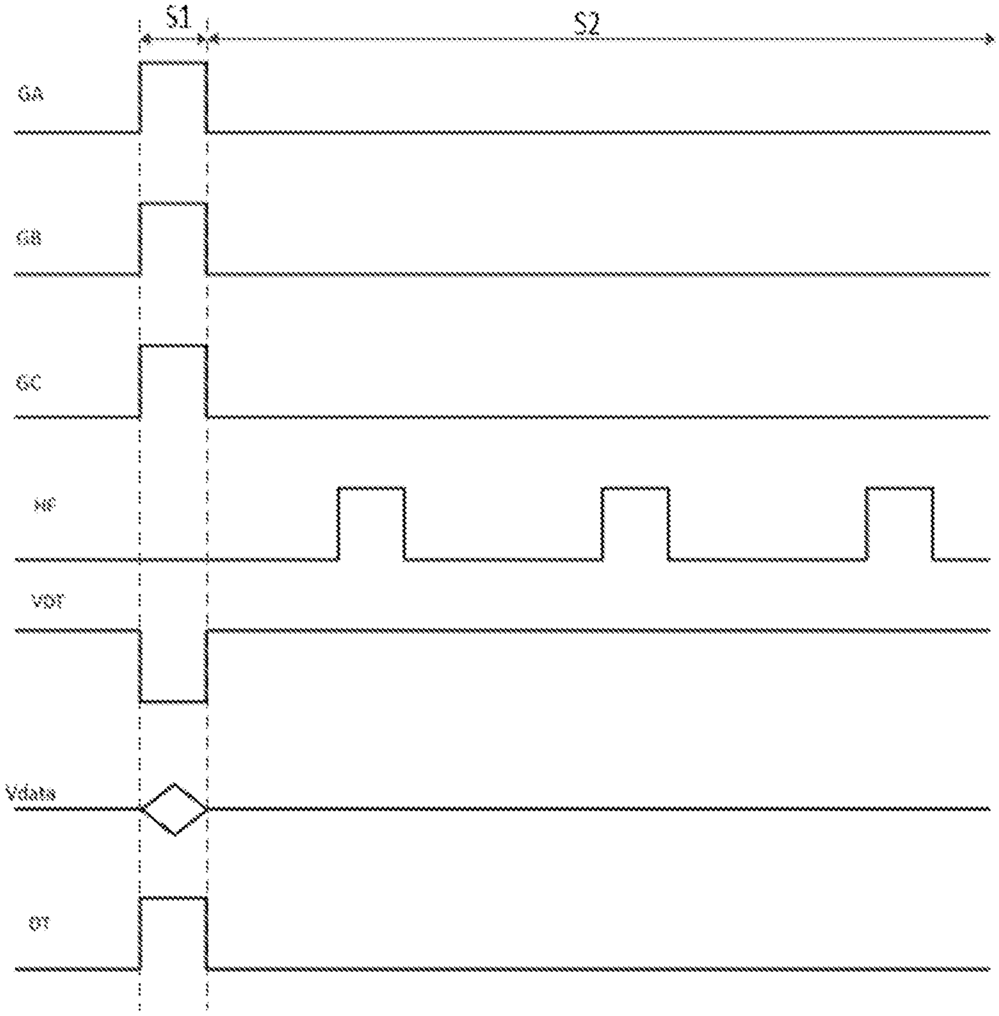
FIG. 10 is a working timing diagram of the pixel circuit shown in FIG. 9 according to at least one embodiment of the present disclosure.

As shown in FIG. 10, when at least one embodiment of the pixel circuit shown in FIG. 9 of the present disclosure is working, the display cycle includes a first time period S1 and a second time period S2 set successively;

In the first time period S1, GA, GB and GC all provide high-voltage signals, VDT provides low-voltage signals, and DT provides high-voltage signals, T6, T7, T3 and T4 are all turned on, and the data line DA writes the data voltage Vdata into the gate electrode of T0, T7 is turned on, and the potential of N2 is read, which is used for external IC to compensate the threshold voltage Vth of T0; the potential of E1 is the low voltage, the potential of GD is the high voltage, T5 is turned on, and HF is written into E2;

In the second time period S2, T1 is turned off, and T2 is turned on or off under the control of HF to realize the PWM dimming mode; when T2 is turned on, T0 drives M1 to emit light, and when T2 is turned off, T0 does not drive M1;

As shown in FIG. 10, in the second time period S2, the light emitting data voltage HF is a PWM signal, and the pulse widths of HF are different, correspondingly displaying different gray scales.

In FIG. 10, when the potential of the first scanning signal provided by the GA is a high voltage, the potential of the first scanning signal may be greater than or equal to 7V and less than or equal to 10V; when the potential of the first scanning signal is a low voltage, the potential of the first scanning signal may be greater than or equal to −10V and less than or equal to −7V;

When the potential of the second scanning signal provided by GB is a high voltage, the potential of the second scanning signal can be greater than or equal to 7V and less than or equal to 10V; when the potential of the second scanning signal is the low voltage, the potential of the second scanning signal can be greater than or equal to −10V and less than or equal to −7V;

When the potential of the first control signal provided by the first control terminal GC is a high voltage, the potential of the first control signal may be greater than or equal to 7V and less than or equal to 10V; when the potential of the first control signal is a low voltage, the potential of the first control signal may be greater than or equal to −10V and less than or equal to −7V;

When the light emitting data voltage HF is a high voltage, the voltage value of the light emitting data voltage HF may be greater than or equal to 7V and less than or equal to 10V, and when the light emitting data voltage HF is a low voltage, the voltage value of the light emitting data voltage HF may be greater than or equal to −10V and less than or equal to −7V;

When the first light emitting control voltage provided by the first light emitting control voltage terminal VDT is a high voltage, the voltage value of the first light emitting control voltage may be greater than or equal to 7V and less than or equal to 10V; when the first light emitting control voltage is a low voltage, the voltage value of the first light emitting control voltage may be greater than or equal to −10V and less than or equal to −7V;

When the second light emitting control voltage provided by the second light emitting control voltage terminal DT is a high voltage, the voltage value of the second light emitting control voltage may be greater than or equal to 7V and less than or equal to 10V; when the second light emitting control voltage is a low voltage, the voltage value of the second light emitting control voltage may be greater than or equal to −10V and less than or equal to −7V;

The voltage value of the data voltage Vdata provided by the data line DA may be greater than or equal to 0V and less than or equal to 6V;

But not limited to this.

At least one embodiment of the pixel circuit shown in FIG. 9 of the present disclosure is working. When VDT provides a high voltage signal in the first time period S1, T1 is continuously turned on in the second time period S2, so that T0 drives M1 to emit light.

In at least one embodiment of the pixel circuit shown in FIG. 9, T0 is a current output transistor, the width-to-length ratio of T0 is specifically determined according to the magnitude of the driving current it needs to generate, and T1 and T2 are switching transistors for light emitting control, the width-to-length ratio of T1 and the width-to-length ratio of T2 need to meet the maximum current that can be provided under a small drain-source voltage Vds to be greater than the driving current generated by T0, and the width-to-length ratio of T1 can be set to be greater than that of T0 A, the width-to-length ratio of T2 can to be set to be greater than that of T0.

Figure 11:
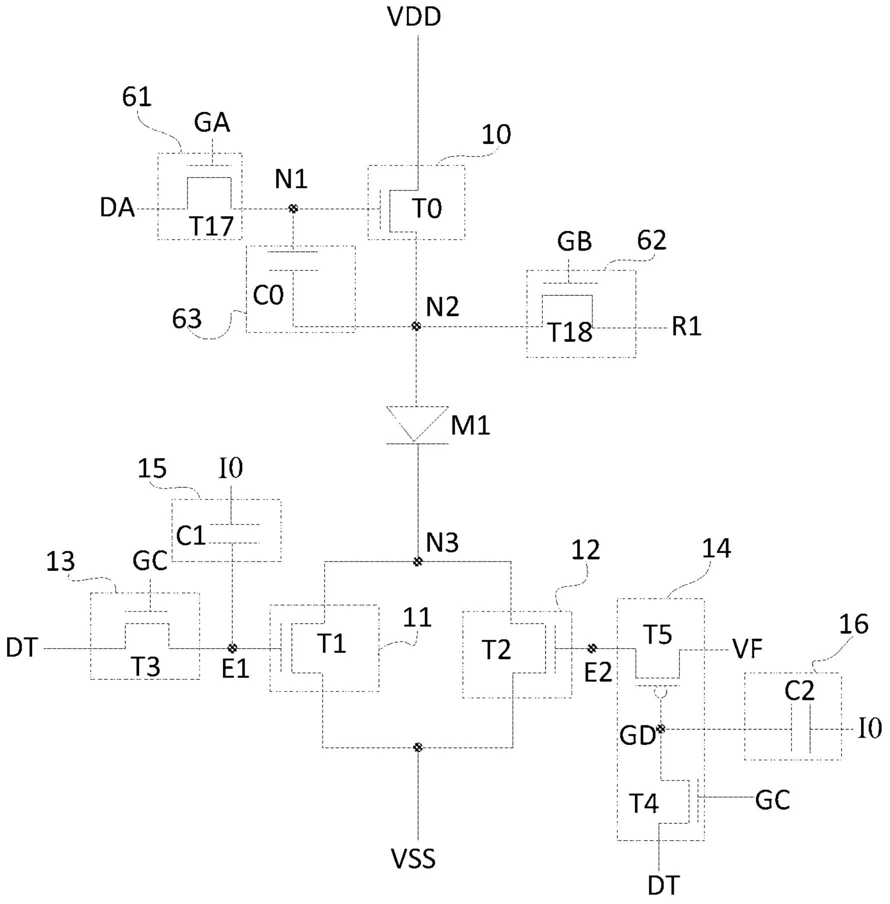
FIG. 11 is a circuit diagram of a pixel circuit according to at least one embodiment of the present disclosure.

The difference between at least one embodiment of the pixel circuit shown in FIG. 11 and at least one embodiment of the pixel circuit shown in FIG. 8 is that; the fifth transistor T5 is a p-type transistor;

The drain electrode of the third transistor T3 is electrically connected to the second light emitting control voltage terminal DT.

In at least one embodiment shown in FIG. 11, the first light emitting control voltage terminal and the second light emitting control voltage terminal DT are the same voltage terminal, so as to reduce the number of voltage terminals and facilitate the realization of frame removal.

Figure 12:
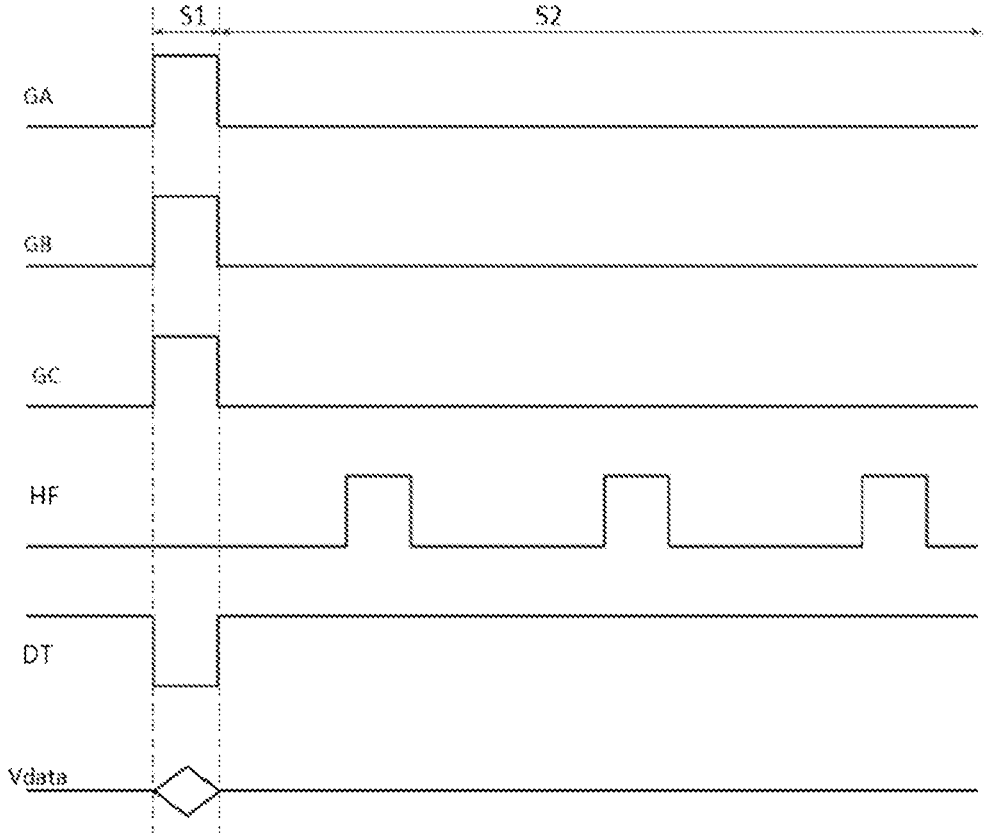
FIG. 12 is a working timing diagram of the pixel circuit shown in FIG. 11 according to at least one embodiment of the present disclosure.

As shown in FIG. 12, when at least one embodiment of the pixel circuit shown in FIG. 11 of the present disclosure is working, the display cycle includes a first time period S1 and a second time period S2 set successively;

In the first time period S1, GA, GB, and GC all provide high-voltage signals, DT provides low-voltage signals, T6, T7, T3, and T4 are all turned on, the data line DA writes the data voltage Vdata into the gate electrode of T0, and T7 is turned on, the potential of N2 is read, which is used for external IC to compensate the threshold voltage Vth of T0;

the potential of E1 is the low voltage, the potential of GD is the high voltage, T5 is turned on, and HF is written into E2;

In the second time period S2, T1 is turned off, and T2 is turned on or off under the control of HF to realize the PWM dimming mode; when T2 is turned on, T0 drives M1 to emit light, and when T2 is turned off, T0 does not drive M1;

As shown in FIG. 12, in the second time period S2, the light emitting data voltage HF is a PWM signal.

At least one embodiment of the pixel circuit shown in FIG. 11 is in operation, when DT provides a high voltage signal in the first time period S1, T1 is turned on in the second time period S2, and T0 drives M1 to emit light.

In FIG. 12, when the potential of the first scanning signal provided by the GA is a high voltage, the potential of the first scanning signal can be greater than or equal to 7V and less than or equal to 10V; when the potential of the first scanning signal is a low voltage, the potential of the first scanning signal can be greater than or equal to −10V and less than or equal to −7V;

When the potential of the second scanning signal provided by GB is a high voltage, the potential of the second scanning signal can be greater than or equal to 7V and less than or equal to 10V; when the potential of the second scanning signal is low voltage, the potential of the second scanning signal can be greater than or equal to −10V and less than or equal to −7V;

When the potential of the first control signal provided by the first control terminal GC is a high voltage, the potential of the first control signal may be greater than or equal to 7V and less than or equal to 10V; when the potential of the first control signal is a low voltage, the potential of the first control signal may be greater than or equal to −10V and less than or equal to −7V;

When the light emitting data voltage HF is a high voltage, the voltage value of the light emitting data voltage HF may be greater than or equal to 7V and less than or equal to 10V, and when the light emitting data voltage HF is a low voltage, the voltage value of the light emitting data voltage HF may be greater than or equal to −10V and less than or equal to −7V;

When the first light emitting control voltage provided by the first light emitting control voltage terminal VDT is a high voltage, the voltage value of the first light emitting control voltage may be greater than or equal to 7V and less than or equal to 10V; when the first light emitting control voltage is a low voltage, the voltage value of the first light emitting control voltage may be greater than or equal to −10V and less than or equal to −7V;

When the second light emitting control voltage provided by the second light emitting control voltage terminal DT is a high voltage, the voltage value of the second light emitting control voltage may be greater than or equal to 7V and less than or equal to 10V; when the second light emitting control voltage is a low voltage, the voltage value of the second light emitting control voltage may be greater than or equal to −10V and less than or equal to −7V;

The voltage value of the data voltage Vdata provided by the data line DA may be greater than or equal to 0V and less than or equal to 6V;

But not limited to this.

Figure 13:
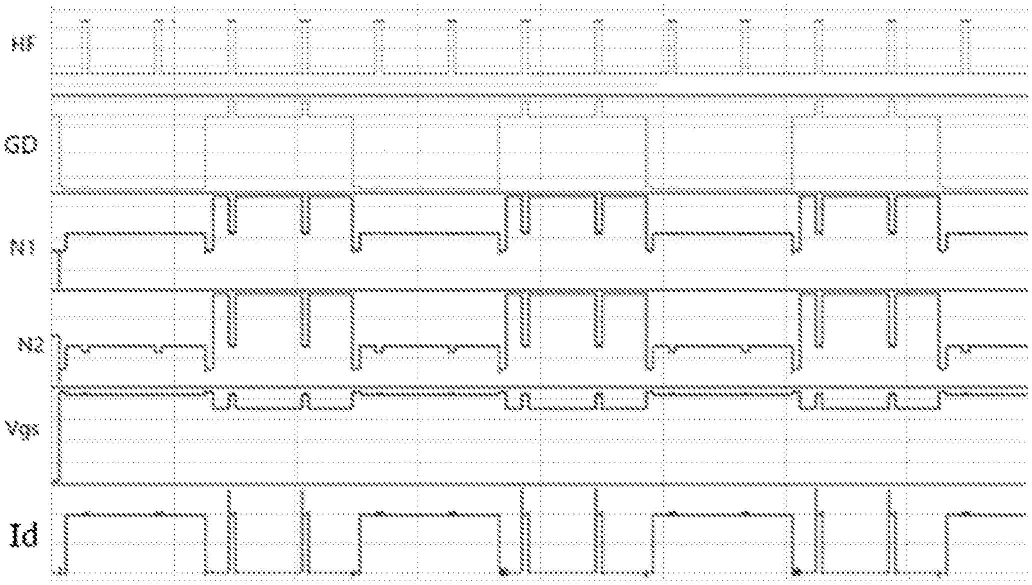
FIG. 13 is a working timing diagram of a simulation of the pixel circuit shown in FIG. 9.

FIG. 13 is a working timing diagram of a simulation the pixel circuit shown in FIG. 9.

In FIG. 13, Vgs is the gate-source voltage of T0, and Id is the driving current.

Figure 14:
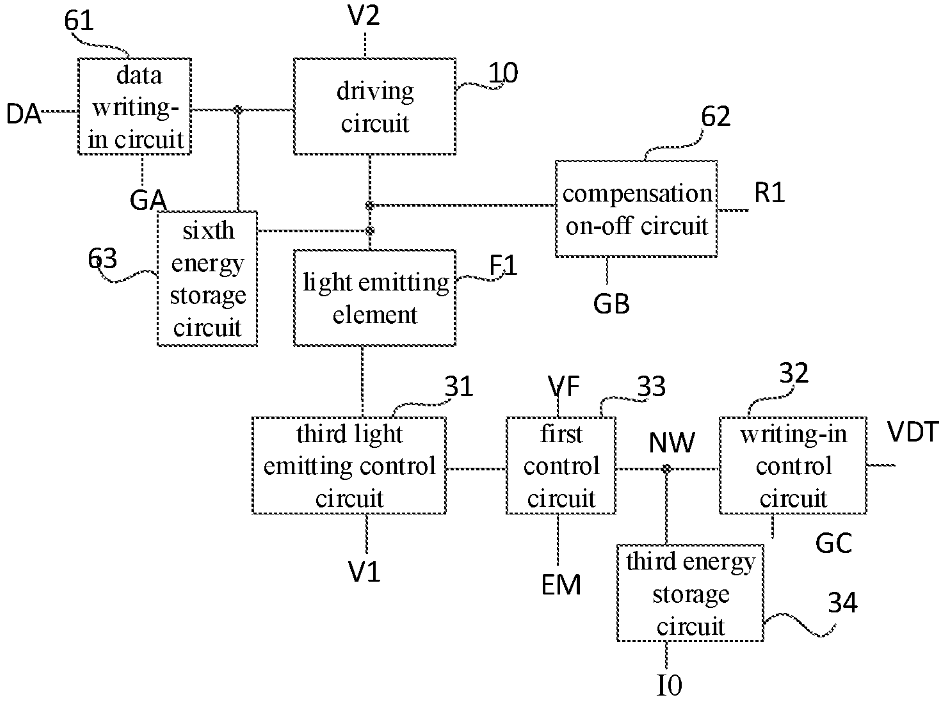
FIG. 14 is a structural diagram of a pixel circuit according to at least one embodiment of the present disclosure.

As shown in FIG. 14, on the basis of at least one embodiment of the pixel circuit shown in FIG. 5, the pixel circuit further includes a data writing-in circuit 61, the compensation on-off circuit 62 and the sixth energy storage circuits 63; the first terminal of the driving circuit 10 is electrically connected to the second voltage terminal V2; the driving circuit 10 is configured to generate a driving current under the control of the potential of its control terminal;

The data writing-in circuit 61 is electrically connected to the first scanning line GA, the data line DA and the control terminal of the driving circuit 10, and is configured to write the data voltage Vdata provided by the data line DA into the control terminal of the driving circuit 10 under the control of the first scanning signal provided by the first scanning line GA;

The compensation on-off circuit 62 is electrically connected to the second scanning line GB, the external compensation line R1 and the second terminal of the driving circuit 10 respectively, and is configured to control to connect the external compensation line R1 and the second terminal of the driving circuit 10 under the control of the second scanning signal provided by the second scanning line GB;

The first terminal of the sixth energy storage circuit 63 is electrically connected to the control terminal of the driving circuit 10, and the second terminal of the sixth energy storage circuit 63 is electrically connected to the second terminal of the driving circuit 10, so the sixth energy storage circuit 63 is used for storing electric energy.

Figure 15:
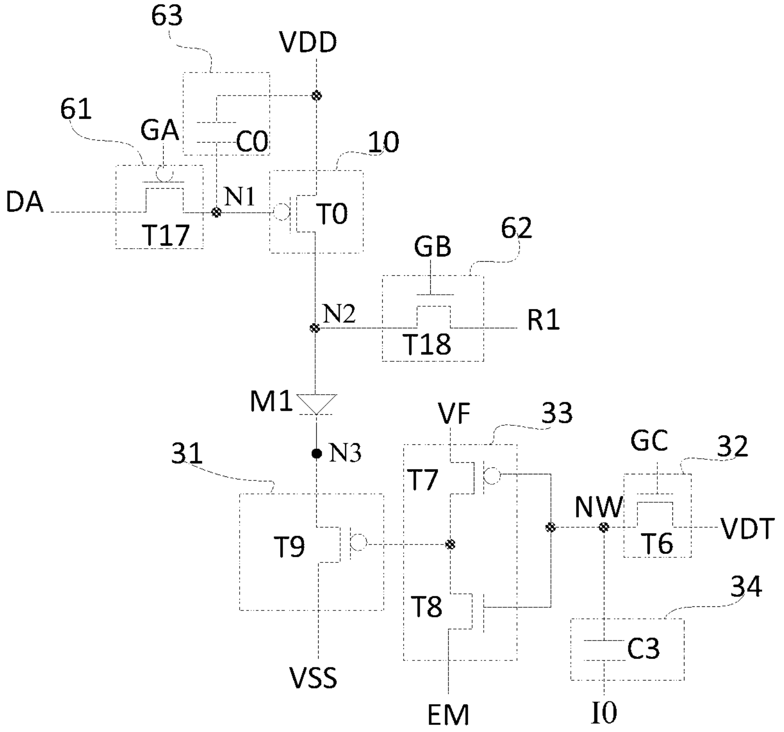
FIG. 15 is a circuit diagram of a pixel circuit according to at least one embodiment of the present disclosure.

As shown in FIG. 15, on the basis of at least one embodiment of the pixel circuit shown in FIG. 14, the light emitting element is a micro light emitting diode M1; the driving circuit 10 includes a driving transistor T0;

The writing-in control circuit 32 includes a sixth transistor T6, the first control circuit 33 includes a seventh transistor T7 and an eighth transistor T8, and the third light emitting control circuit 31 includes a ninth transistor T9;

The gate electrode of the sixth transistor T6 is electrically connected to the first control terminal GC, the drain electrode of the sixth transistor T6 is electrically connected to the first light emitting control voltage terminal VDT, and the source electrode of the sixth transistor T6 is electrically connected to the writing-in node NW;

The gate electrode of the seventh transistor T7 is electrically connected to the writing-in node NW, the drain electrode of the seventh transistor T7 is electrically connected to the light emitting data voltage terminal VF, and the source electrode of the seventh transistor T7 is electrically connected to the gate electrode of the ninth transistor T9; the light emitting data voltage terminal VF is configured to provide the light emitting data voltage HF;

The gate electrode of the eighth transistor T8 is electrically connected to the writing-in node NW, the drain electrode of the eighth transistor T8 is electrically connected to the light emitting control signal terminal EM, and the source electrode of the eighth transistor T8 is electrically connected to the gate electrode of the ninth transistor T9;

The drain electrode of the ninth transistor T9 is electrically connected to the cathode of M1, and the source electrode of the ninth transistor M9 is electrically connected to the low voltage terminal VSS;

The third energy storage circuit 34 includes a third capacitor C3;

The first terminal of C3 is electrically connected to the writing-in node NW, and the second terminal of C3 is electrically connected to the initial voltage terminal 10, and the initial voltage terminal 10 is configured to provide the initial voltage Vinit;

The data writing-in circuit 61 includes a seventeenth transistor T17, the compensation on-off circuit 62 includes an eighteenth transistor T18; the sixth energy storage circuit 63 includes a storage capacitor C0;

The gate electrode of the seventeenth transistor T17 is electrically connected to the first scanning line GA, the drain electrode of the seventeenth transistor T17 is electrically connected to the data line DA, and the source electrode of the seventeenth transistor T17 is electrically connected to the gate electrode of the driving transistor T0;

The gate electrode of the eighteenth transistor T18 is electrically connected to the second scanning line GB, the drain electrode of the eighteenth transistor T18 is electrically connected to the external compensation line R1, and the source electrode of the eighteenth transistor T18 is electrically connected to the source electrode of the driving transistor T0;

The drain electrode of the driving transistor T0 is electrically connected to the high voltage terminal VDD; the source electrode of the driving transistor T0 is electrically connected to the anode of M1;

The first terminal of the storage capacitor C0 is electrically connected to the gate electrode of the driving transistor T0, and the second terminal of the storage capacitor C0 is electrically connected to the high voltage terminal VDD.

In at least one embodiment of the pixel circuit shown in FIGS. 15, T17, T0, T7 and T9 are all p-type transistors, T18, T6 and T8 are all n-type transistors, and T17, T0, T7 and T9 are all low-temperature polysilicon thin film transistors, T18, T6 and T8 are all oxide thin film transistors, but not limited thereto.

In at least one embodiment shown in FIG. 15, the first node N1 is electrically connected to the gate electrode of the driving transistor T0, the second node N2 is electrically connected to the source electrode of the driving transistor T0, and the third node N3 is electrically connected to the cathode of M1.

At least one embodiment of the pixel circuit shown in FIG. 15 of the present disclosure is a pixel circuit based on external compensation that can realize combined driving of PAM and PWM. It adopts an integrated process of LTPS (low temperature polysilicon) and oxide to form oxide thin film transistors and low-temperature polysilicon thin film transistors on the same backplane, which can achieve higher PPI (pixel density).

When at least one embodiment of the pixel circuit shown in FIG. 15 of the present disclosure is working, the PAM dimming method is used during high gray scales display, and the PWM dimming mode is used during the low gray scales display, so as to realize uniform display under full gray scales.

In at least one embodiment of the pixel circuit shown in FIG. 15 of the present disclosure, T6 is an n-type transistor, T6 is an oxide thin film transistor, and the leakage current of the oxide thin film transistor is two orders of magnitude smaller than that of the low temperature polysilicon thin film transistor., thus, the requirement for the capacitance value of C3 is reduced, which is beneficial to realize a higher PPI.

In actual operation, T6 may also be a p-type transistor.

Figure 16:
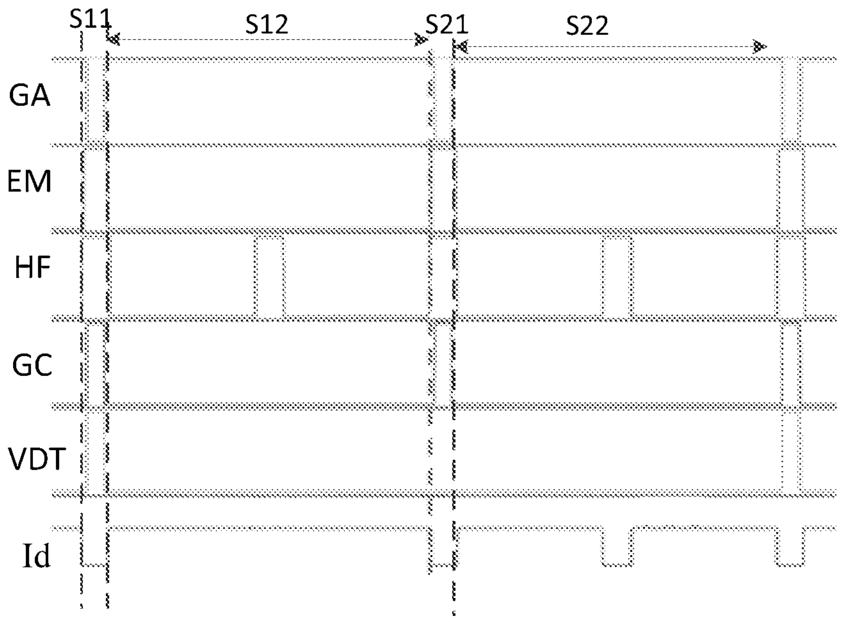
FIG. 16 is a working timing diagram of the pixel circuit shown in FIG. 15 according to at least one embodiment of the present disclosure.

As shown in FIG. 16, when at least one embodiment of the pixel circuit shown in FIG. 15 of the present disclosure is working, the first display period includes the first writing-in phase S11 and the first light emitting phase S12 set successively, and the second display period includes the second writing-in phase S21 and the second light emitting phase S22 set successively;

In the first writing-in phase S11, GA provides a low-voltage signal, GB provides a high-voltage signal, GC provides a high-voltage signal, VDT provides a high-voltage signal to NW, T7 is turned off, T8 is turned on, and EM is written into the gate electrode of T9; EM provides a high voltage signal, T9 is turned off; T17 is turned on, the data line DA writes the data voltage Vdata into the gate electrode of T0, T18 is turned on, and the potential of N2 is read, which is used for the compensation of the threshold voltage Vth of T0 by the external IC;

In the first light emitting phase S12, C3 maintains the potential of NW, T7 is turned off, T8 is turned on, EM is written into the gate electrode of T9, EM provides a low voltage signal, T9 is turned on, and forms a current path between the cathode of M1 and VSS, T0 drives M1 to emit light for PAM dimming;

In the second writing-in phase S21, GA provides a low-voltage signal, GB provides a high-voltage signal, GC provides a high-voltage signal, VDT provides a low-voltage signal to NW, T7 is turned on, T8 is turned off, and HF is written into the gate electrode of T9; HF provides a high voltage signal, T9 is turned off; T17 is turned on, the data line DA writes the data voltage Vdata into the gate electrode of T0, T18 is turned on, and the potential of N2 is read, which is used for the compensation of the threshold voltage Vth of T0 by an external IC;

In the second light emitting phase S13, C3 maintains the potential of NW, T7 is turned on, T8 is turned off, and HF is written into the gate electrode of T9; HF is a high-frequency PWM signal. When the potential of HF is high voltage, T9 is turned on, and T0 drives M1 to emit light; when the potential of HF is the low voltage, T9 is turned off to realize PWM dimming; when the on pulse widths of HF are different, the display gray scales are different.

In FIG. 16, the driving current is labeled Id.

During operation of at least one embodiment of the pixel circuit shown in FIG. 15 of the present disclosure, the HF gating phase and the EM gating phase are independently separated, which is convenient for control.

In at least one embodiment of the pixel circuit shown in FIG. 15 of the present disclosure, the type of each transistor is not limited to the types listed above, and each transistor can be an n-type transistor or a p-type transistor.

Figure 17:
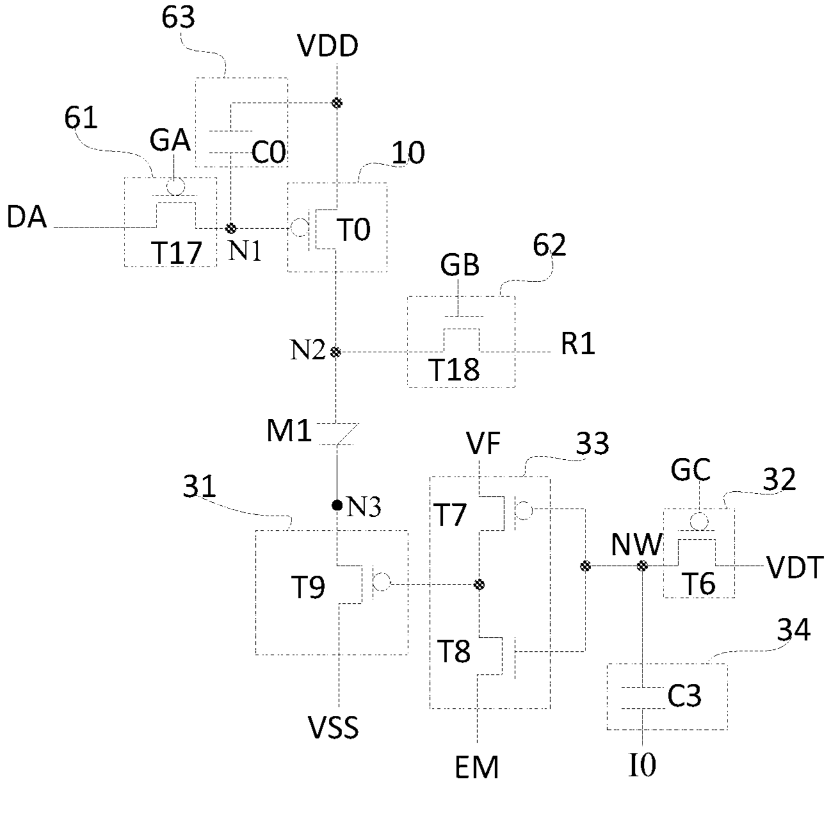
FIG. 17 is a circuit diagram of a pixel circuit according to at least one embodiment of the present disclosure.

The difference between at least one embodiment of the pixel circuit shown in FIG. 17 of the present disclosure and at least one embodiment of the pixel circuit shown in FIG. 15 of the present disclosure is that; T6 is a p-type transistor, and T6 is a low temperature polysilicon thin film transistor.

Figure 18:
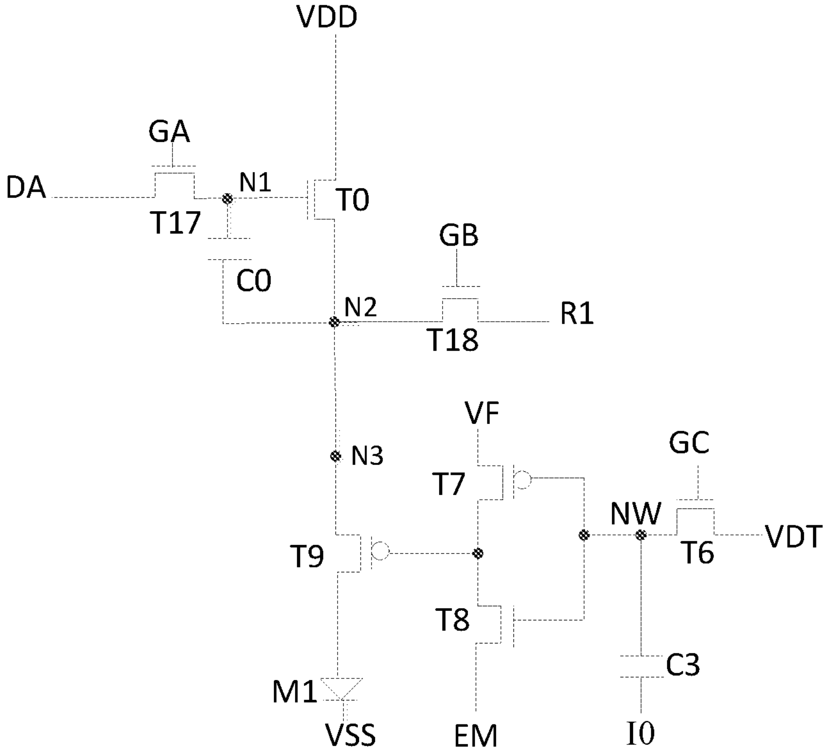
FIG. 18 is a structural diagram of a pixel circuit according to at least one embodiment of the present disclosure.

The difference between at least one embodiment of the pixel circuit shown in FIG. 18 of the present disclosure and at least one embodiment of the pixel circuit shown in FIG. 15 of the present disclosure is that:

T0 and T17 are n-type transistors;

The second terminal of C0 is electrically connected to the source electrode of T0;

M1 is arranged between T9 and the low voltage terminal VSS.

Figure 19:
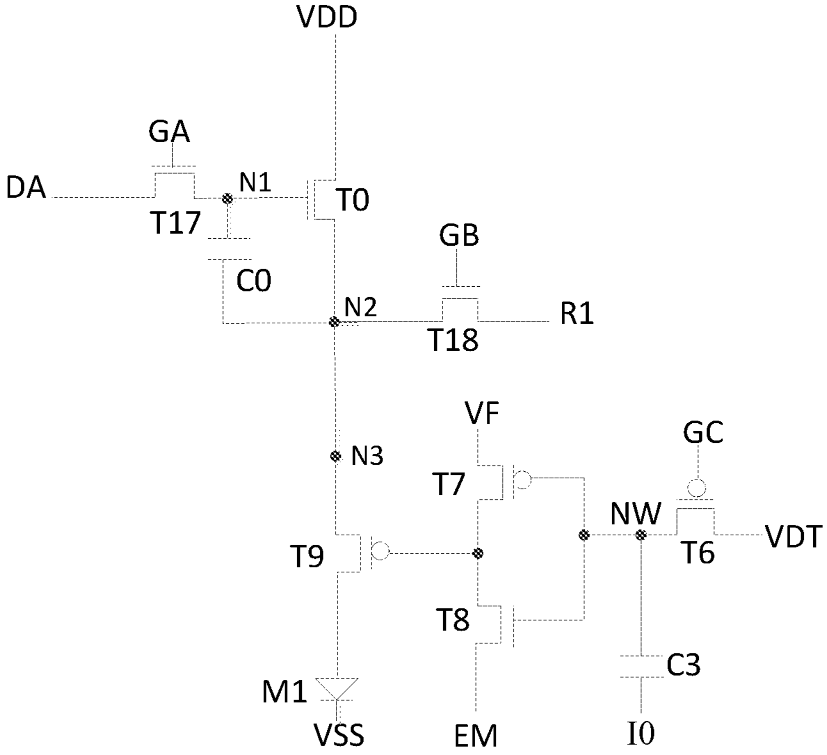
FIG. 19 is a circuit diagram of a pixel circuit according to at least one embodiment of the present disclosure.

The difference between at least one embodiment of the pixel circuit shown in FIG. 19 of the present disclosure and at least one embodiment of the pixel circuit shown in FIG. 18 of the present disclosure is that T6 is a p-type transistor.

Figure 20:
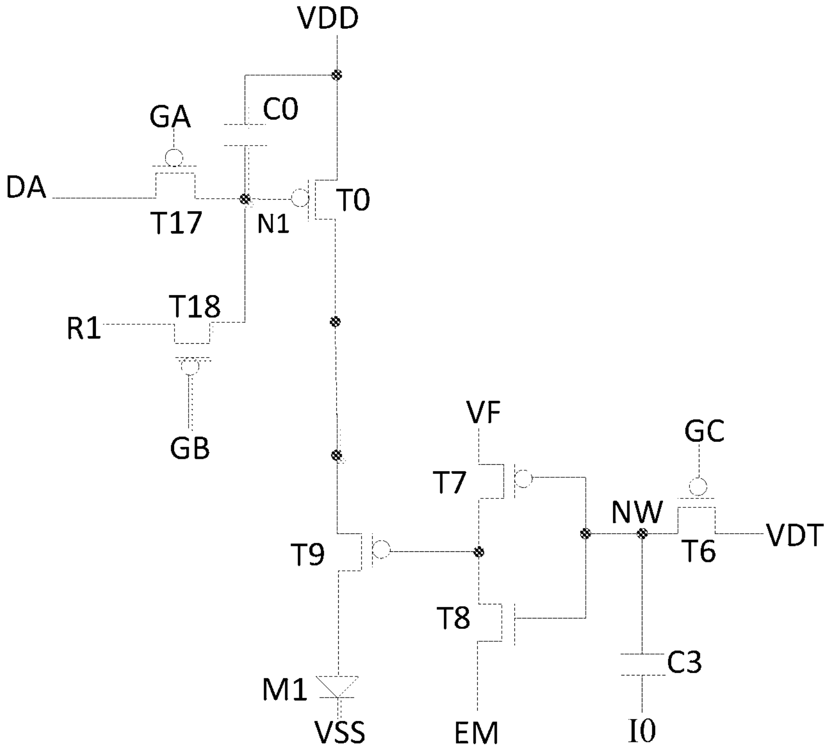
FIG. 20 is a structural diagram of a pixel circuit according to at least one embodiment of the present disclosure.

The difference between at least one embodiment of the pixel circuit shown in FIG. 20 of the present disclosure and at least one embodiment of the pixel circuit shown in FIG. 19 of the present disclosure is that: T0, T17 and T18 are p-type transistors;

The second terminal of C0 is electrically connected to VDD;

The source electrode of T18 is electrically connected to the gate electrode of T0.

Figure 21:
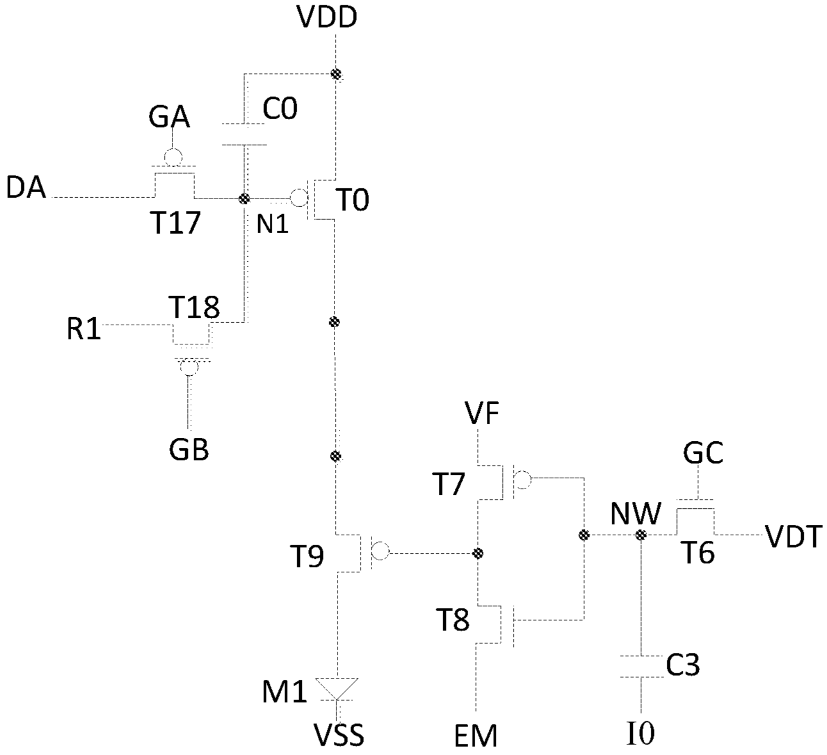
FIG. 21 is a circuit diagram of a pixel circuit according to at least one embodiment of the present disclosure.

The difference between at least one embodiment of the pixel circuit shown in FIG. 21 of the present disclosure and at least one embodiment of the pixel circuit shown in FIG. 20 of the present disclosure is that T6 is an n-type transistor.

Figure 22:
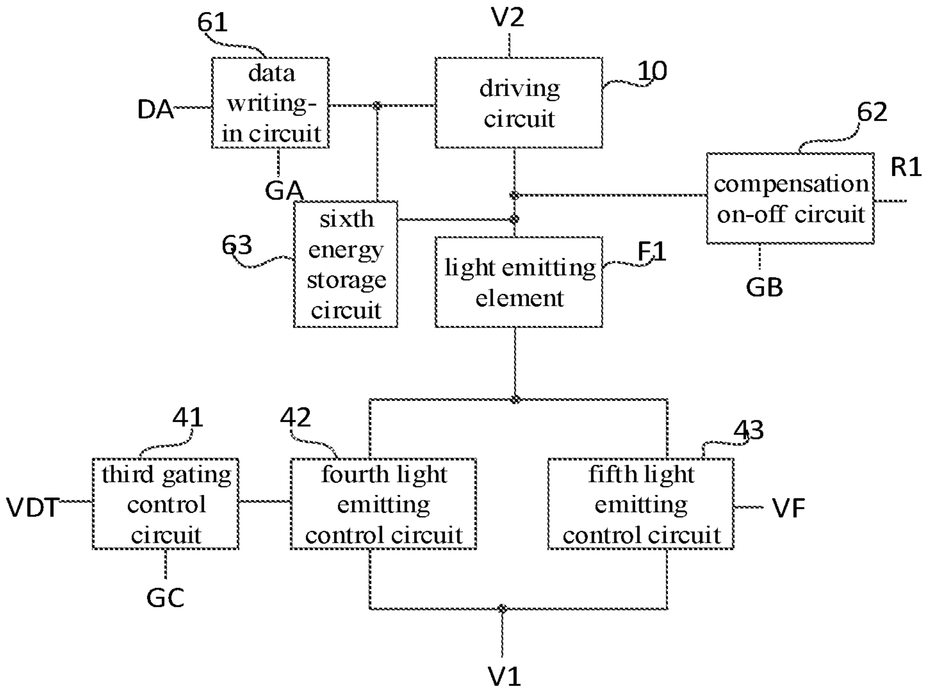
FIG. 22 is a structural diagram of a pixel circuit according to at least one embodiment of the present disclosure.

As shown in FIG. 22, on the basis of at least one embodiment of the pixel circuit shown in FIG. 6, the pixel circuit further includes the data writing-in circuit 61, the compensation on-off circuit 62 and the sixth energy storage circuits 63; the first terminal of the driving circuit 10 is electrically connected to the second voltage terminal V2; the driving circuit 10 is configured to generate a driving current under the control of the potential of its control terminal;

The data writing-in circuit 61 is electrically connected to the first scanning line GA, the data line DA and the control terminal of the driving circuit 10, and is configured to write the data voltage Vdata provided by the data line DA into the control terminal of the driving circuit 10 under the control of the first scanning signal provided by the first scanning line GA;

The compensation on-off circuit 62 is electrically connected to the second scanning line GB, the external compensation line R1 and the second terminal of the driving circuit 10 respectively, and is configured to control to connect the external compensation line R1 and the second terminal of the driving circuit 10 under the control of the second scanning signal provided by the second scanning line GB;

The first terminal of the sixth energy storage circuit 63 is electrically connected to the control terminal of the driving circuit 10, and the second terminal of the sixth energy storage circuit 63 is electrically connected to the second terminal of the driving circuit 10, so the sixth energy storage circuit 63 is used for storing electric energy.

Figure 23:
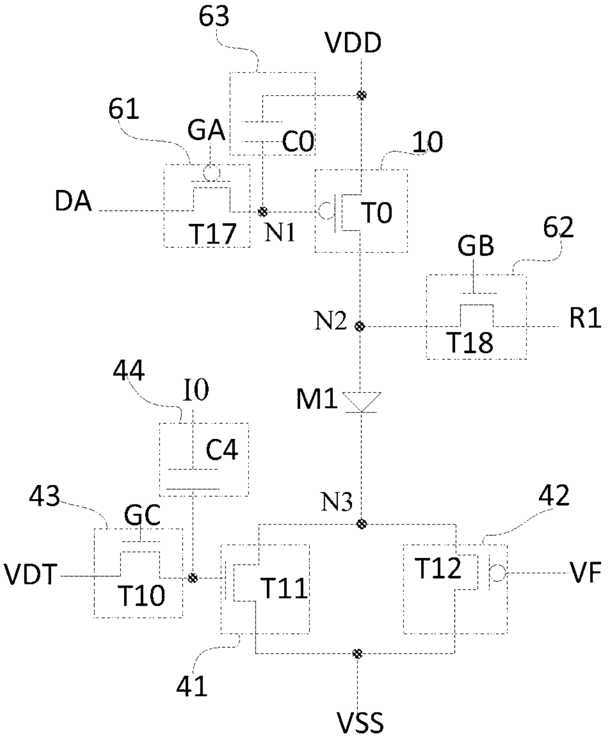
FIG. 23 is a circuit diagram of a pixel circuit according to at least one embodiment of the present disclosure.

As shown in FIG. 23, on the basis of at least one embodiment of the pixel circuit shown in FIG. 22, in the pixel circuit according to at least one embodiment of the present disclosure, the third gating control circuit 43 includes a tenth transistor T10, the fourth light emitting control circuit 41 includes an eleventh transistor T11, the fifth light emitting control circuit 42 includes a twelfth transistor T12; the fourth energy storage circuit 44 includes a fourth capacitor C4; the light emitting element is a miniature light emitting diode M1; the driving circuit 10 includes a driving transistor T0;

The gate electrode of the tenth transistor T10 is electrically connected to the first control terminal GC, the drain electrode of the tenth transistor T10 is electrically connected to the first light emitting control voltage terminal VDT, and the source electrode of the tenth transistor T10 is electrically connected to the gate electrode of the eleventh transistor T11;

The drain electrode of the eleventh transistor T11 is electrically connected to the cathode of M1, and the source electrode of the eleventh transistor T11 is electrically connected to the low voltage terminal VSS;

The gate electrode of the twelfth transistor T12 is electrically connected to the light emitting data voltage terminal VF, the drain electrode of the twelfth transistor T12 is electrically connected to the cathode of M1, and the source electrode of the twelfth transistor T12 is electrically connected to the low voltage terminal VSS; the light emitting data voltage terminal VF is configured to provide light emitting data voltage HF;

The first terminal of the fourth capacitor C4 is electrically connected to the gate electrode of T11, the second terminal of the fourth capacitor C4 is electrically connected to the initial voltage terminal 10, and the initial voltage terminal 10 is configured to provide the initial voltage Vinit;

The data writing-in circuit 61 includes a seventeenth transistor T17, the compensation on-off circuit 62 includes an eighteenth transistor T18; the sixth energy storage circuit 63 includes a storage capacitor C0;

The gate electrode of the seventeenth transistor T17 is electrically connected to the first scanning line GA, the drain electrode of the seventeenth transistor T17 is electrically connected to the data line DA, and the source electrode of the seventeenth transistor T17 is electrically connected to the gate electrode of the driving transistor T0;

The gate electrode of the eighteenth transistor T18 is electrically connected to the second scanning line GB, the drain electrode of the eighteenth transistor T18 is electrically connected to the external compensation line R1, and the source electrode of the eighteenth transistor T18 is electrically connected to the source electrode of the driving transistor T0;

The drain electrode of the driving transistor T0 is electrically connected to the high voltage terminal VDD; the source electrode of the driving transistor T0 is electrically connected to the anode of M1;

The first terminal of the storage capacitor C0 is electrically connected to the gate electrode of the driving transistor T0, and the second terminal of the storage capacitor C0 is electrically connected to the high voltage terminal VDD.

In at least one embodiment shown in FIG. 23, the first node N1 is electrically connected to the gate electrode of the driving transistor T0, the second node N2 is electrically connected to the source electrode of the driving transistor T0, and the third node N3 is electrically connected to the cathode of M1.

In at least one embodiment of the pixel circuit shown in FIG. 23, T10 is an n-type transistor; T11 is an n-type transistor; T12 is a p-type transistor; T0 is a p-type transistor; T17 is a p-type transistor; T18 is an n-type transistor; T10 is an oxide thin film transistor, T11 is an oxide thin film transistor, T12 is a low temperature polysilicon thin film transistor, T0 is a low temperature polysilicon thin film transistor, T17 is a low temperature polysilicon thin film transistor, and T18 is an oxide thin film transistor, which is not limited thereto.

At least one embodiment of the pixel circuit shown in FIG. 23 of the present disclosure is a pixel circuit based on external compensation that can realize combined driving of PAM and PWM. It adopts an integrated process of LTPS (low temperature polysilicon) and oxide to form the oxide thin film transistors and low-temperature polysilicon thin film transistors on the same backplane, which can achieve higher PPI (pixel density).

When at least one embodiment of the pixel circuit shown in FIG. 23 of the present disclosure is working, the PAM dimming method is used during the high gray scales display, and the PWM dimming mode is used during the low gray scales display, which can realize uniform display under full gray scales.

In at least one embodiment of the pixel circuit shown in FIG. 23 of the present disclosure, T10 is an n-type transistor, T10 is an oxide thin film transistor, and the leakage current of the oxide thin film transistor is two orders of magnitude smaller than that of the low temperature polysilicon thin film transistor, thus, the requirement for the capacitance value of C4 is reduced, which is beneficial to achieve a higher PPI.

In actual operation, T10 may also be a p-type transistor.

In at least one embodiment of the pixel circuit shown in FIG. 23 of the present disclosure, since the drain electrode of T12 is electrically connected to the cathode of M1, the source electrode of T12 is electrically connected to the low voltage terminal VSS, and HF is a common signal for all pixel circuits, so T12 can be multiplexed among multiple pixel circuits, while using LTPS and Oxide integration to form NTFT (n-type thin film transistor) and PTFT (p-type thin film transistor) processes on the same backplane, which can achieve high PPI.

Figure 24:
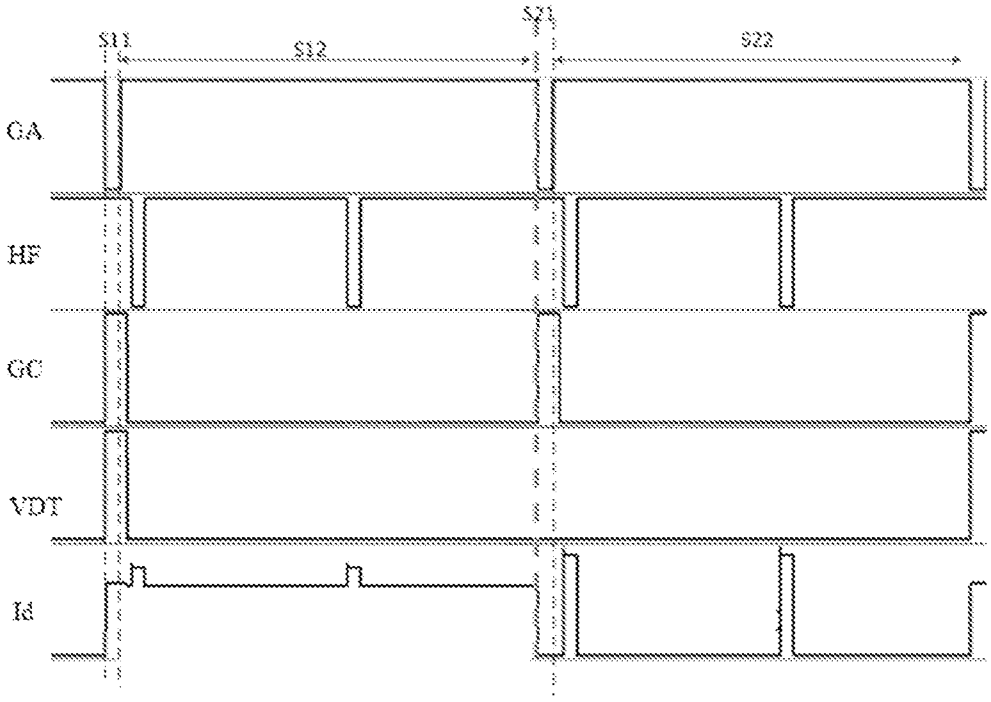
FIG. 24 is a working timing diagram of the pixel circuit shown in FIG. 23 according to at least one embodiment of the present disclosure.

As shown in FIG. 24, when at least one embodiment of the pixel circuit shown in FIG. 23 is working, the first display period may include the first writing-in phase S11 and the first light emitting phase S12 set successively, and the second display period may include the second writing-in phase S21 and the second light emitting phase S22 set successively;

In the first writing-in phase S11, GA provides a low-voltage signal, GB provides a high-voltage signal, GC provides a high-voltage signal, T10 is turned on, VDT provides a high-voltage signal to the gate electrode of T11, T11 is turned on; T17 is turned on, and the data line DA writes the data voltage Vdata into the gate electrode of T0, T18 is turned on, and reads the potential of N2, which is used for external IC (integrated circuit) to compensate the threshold voltage Vth of T0;

In the first light emitting phase S12, C4 maintains the potential of the gate electrode of T11, T11 is turned on, and T0 drives M1 to emit light for PAM dimming;

In the second writing-in phase S21, GA provides a low-voltage signal, GB provides a high-voltage signal, GC provides a high-voltage signal, VDT provides a low-voltage signal to the gate electrode of T11, T11 is turned off; T17 is turned on, and the data line DA writes the data voltage Vdata into the gate electrode of T0, T18 is turned on, and the potential of N2 is read, which is used for compensation of the threshold voltage Vth of T0 by an external IC;

In the second light emitting phase S22, C4 maintains the potential of the gate electrode of T11, T11 is turned off, and HF is a high-frequency PWM signal; when the potential of HF is a high voltage, T12 is turned off; when the potential of HF is a low voltage, T12 is turned on; to perform PWM dimming; the on pulse widths of HF are different, and the corresponding display gray scales are also different.

In FIG. 24, Id is a driving current.

In at least one embodiment of the pixel circuit shown in FIG. 23 of the present disclosure, the type of each transistor is not limited to the types listed above, and each transistor can be an n-type transistor or a p-type transistor.

Figure 25:
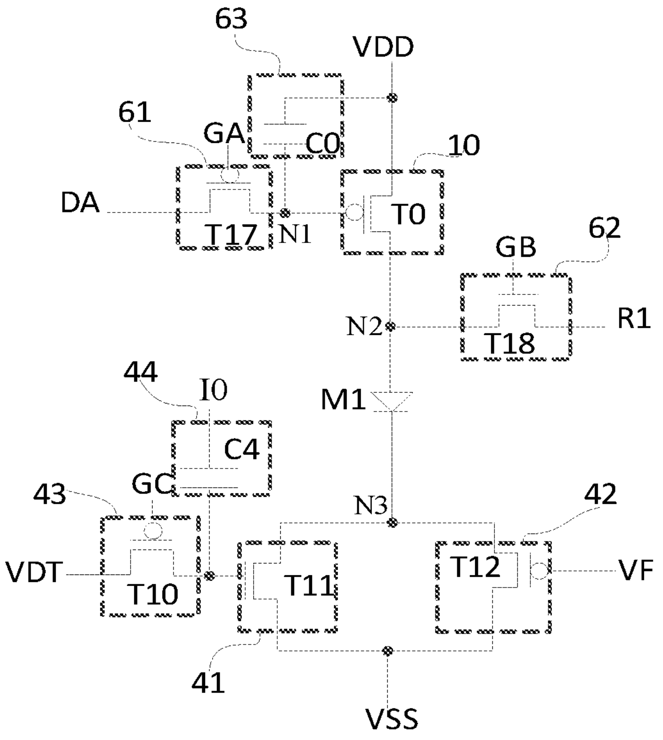
FIG. 25 is a circuit diagram of a pixel circuit according to at least one embodiment of the present disclosure.

The difference between at least one embodiment of the pixel circuit shown in FIG. 25 of the present disclosure and at least one embodiment of the pixel circuit shown in FIG. 23 of the present disclosure is that T10 is a p-type transistor, and T10 is a low temperature polysilicon thin film transistor.

Figure 26:
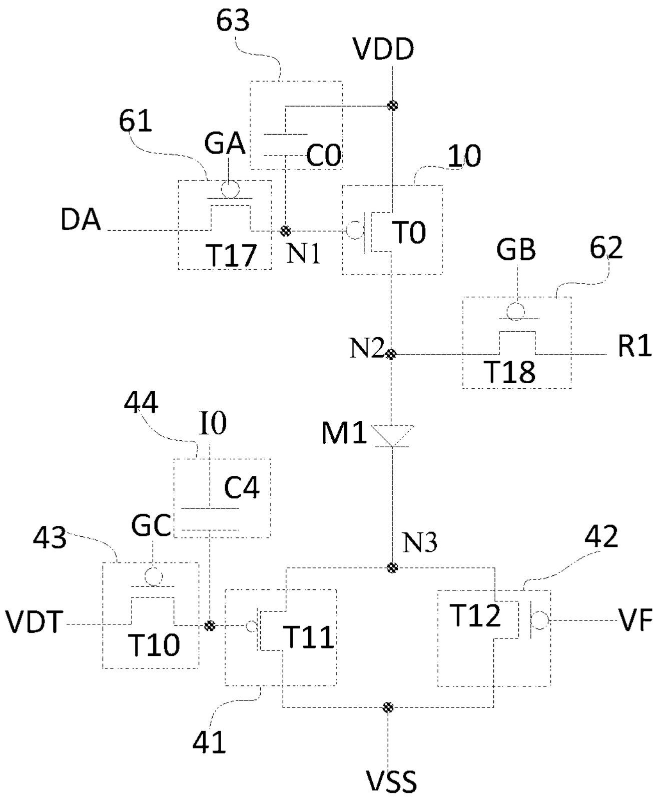
FIG. 26 is a circuit diagram of a pixel circuit according to at least one embodiment of the present disclosure.

The difference between at least one embodiment of the pixel circuit shown in FIG. 26 of the present disclosure and at least one embodiment of the pixel circuit shown in FIG. 23 of the present disclosure is that; T11 is a p-type transistor, T18 is a p-type transistor, The difference between at least one embodiment of the pixel circuit shown in FIG. 27 of the present disclosure and at least one embodiment of the pixel circuit shown in FIG. 23 of the present disclosure is that all transistors are n-type transistors, and all transistors are oxide thin film transistors. The second terminal of C0 is electrically connected to the source electrode of T0.

At least one embodiment of the pixel circuit shown in FIG. 23, FIG. 25, FIG. 26, and FIG. 27 of the present disclosure has a simple structure, uses less transistor, can reduce the layout area, and further increase PPI while ensuring low grayscale display.

Figure 27:
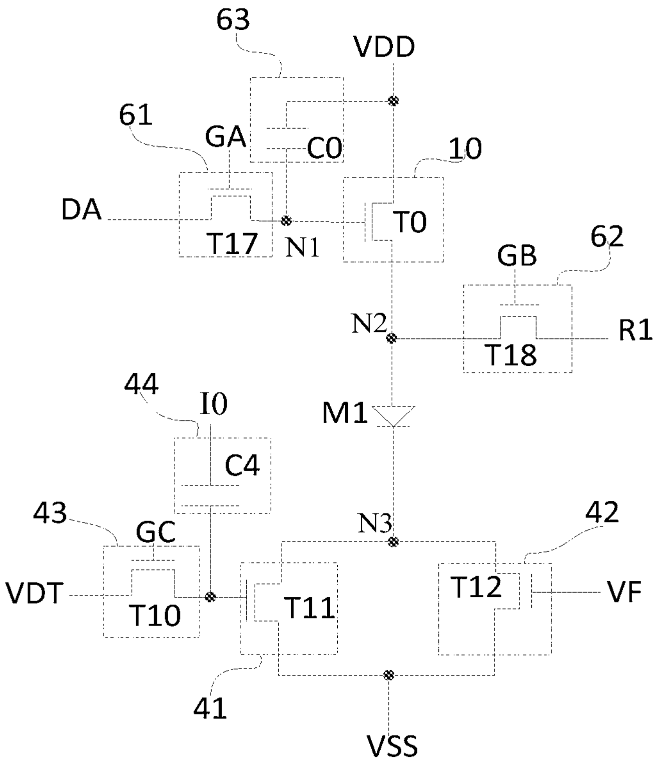
FIG. 27 is a circuit diagram of a pixel circuit according to at least one embodiment of the present disclosure.

At least one embodiment of the pixel circuit shown in FIG. 27 of the present disclosure is in operation, and in high gray scale display, in the writing-in phase, VDT writes a high voltage signal to the gate electrode of T11, and in the light emitting phase, T11 is turned on; in the low gray scale display, in the writing-in phase, VDT writes a low voltage signal to the gate electrode of T11, in the light emitting phase, T11 is turned off, and T12 is turned on or off under the control of HF to achieve low gray scale display; by reasonably selecting the sizes of T11 and T12, the number of transistors used can be reduced on the basis of keeping the driving current stable.

Figure 28:
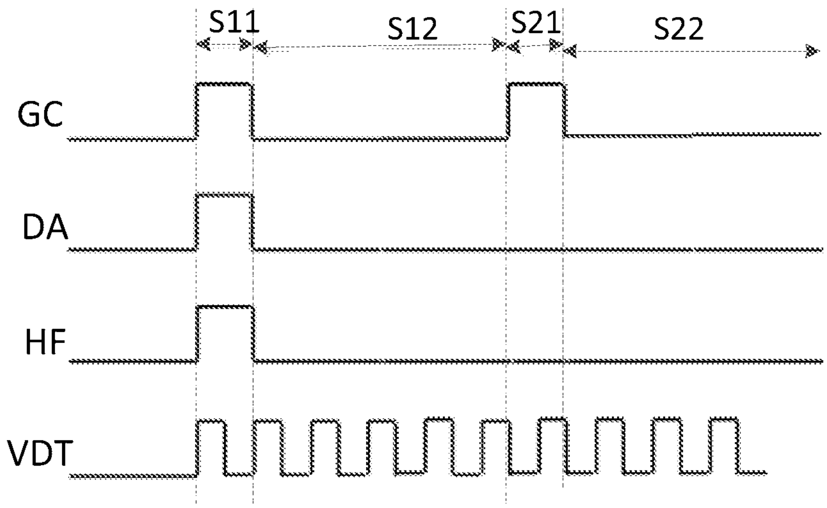
FIG. 28 is a working timing diagram of the pixel circuit shown in FIG. 27 according to at least one embodiment of the present disclosure.

As shown in FIG. 28, when at least one embodiment of the pixel circuit shown in FIG. 27 of the present disclosure is in operation, the first display period includes the first writing-in phase S11 and the first light emitting phase S12 set successively, and the second display period includes the second writing-in phase S21 and the second light emitting phase S22 set successively;

In the first writing-in phase S11, GA provides a low-voltage signal, GB provides a high-voltage signal, GC provides a high-voltage signal, T10 is turned on, VDT provides a high-voltage signal to the gate electrode of T11, T11 is turned on; T17 is turned on, and the data line DA writes the data voltage Vdata into the gate electrode of T0, T18 is turned on, and reads the potential of N2, which is used for external IC to compensate the threshold voltage Vth of T0;

In the first light emitting phase S12, C4 maintains the potential of the gate electrode of T11, T11 is turned on, and T0 drives M1 to emit light for PAM dimming;

In the second writing-in phase S21, GA provides a low-voltage signal, GB provides a high-voltage signal, GC provides a high-voltage signal, VDT provides a low-voltage signal to the gate electrode of T11, T11 is turned off; T17 is turned on, and the data line DA writes the data voltage Vdata into the gate electrode of T0, T18 is turned on, and the potential of N2 is read, which is used for compensation of the threshold voltage Vth of T0 by an external IC;

In the second light emitting phase S22, C4 maintains the potential of the gate electrode of T11, T11 is turned off, and HF is a high-frequency PWM signal; when the potential of HF is the low voltage, T12 is turned off; when the potential of HF is the high voltage, T12 is turned on; to perform PWM dimming; the on pulse widths of HF are different, and the corresponding display gray scales are also different.

Figure 29:
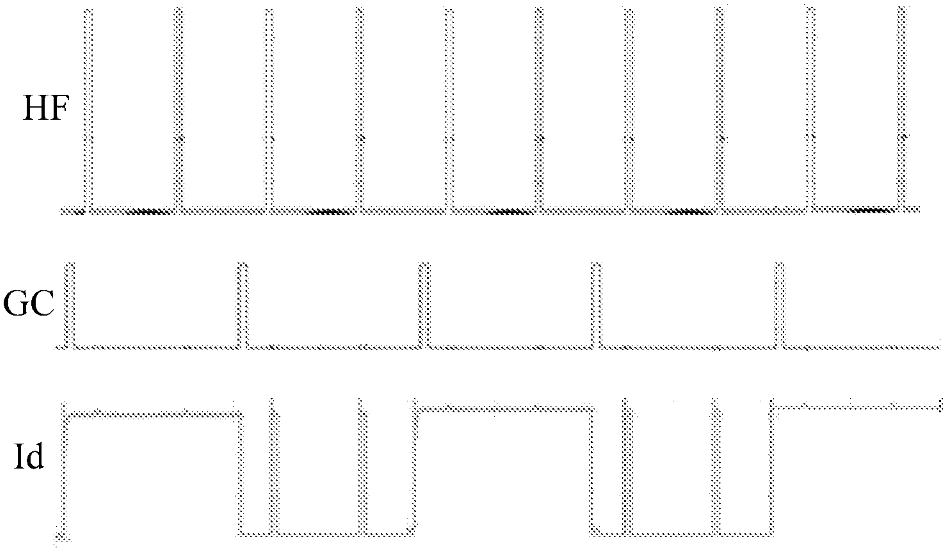
FIG. 29 is a working timing diagram of a simulation of the pixel circuit shown in FIG. 27 according to at least one embodiment of the present disclosure.

FIG. 29 is a working timing diagram of a simulation of at least one embodiment of the pixel circuit shown in FIG. 27 of the present disclosure. In FIG. 29, what is labeled Id is the driving current.

Figure 30:
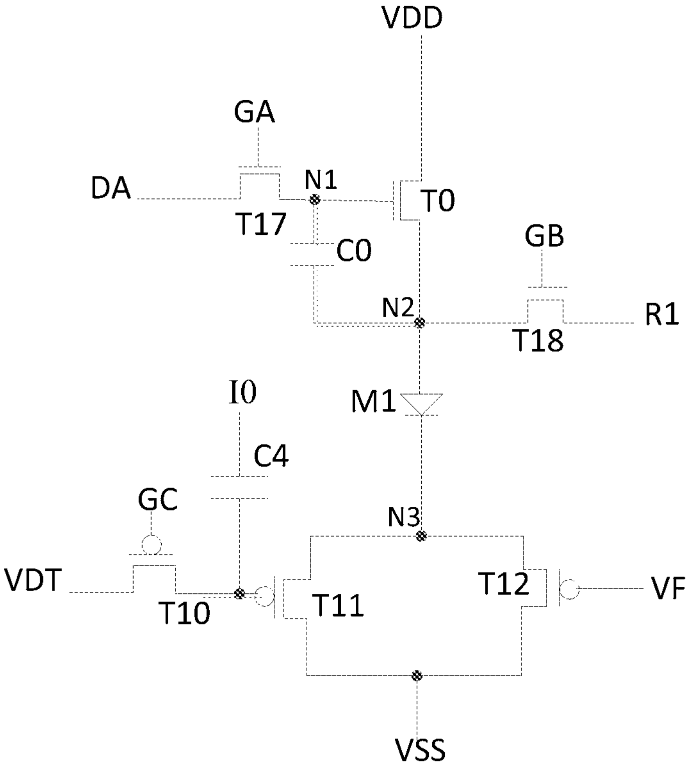
FIG. 30 is a circuit diagram of a pixel circuit according to at least one embodiment of the present disclosure.

The difference between at least one embodiment of the pixel circuit shown in FIG. 30 of the present disclosure and at least one embodiment of the pixel circuit shown in FIG. 27 of the present disclosure is as follows:

T10, T11 and T12 are p-type transistors;

The second terminal of C0 is electrically connected to the source electrode of T0.

Figure 31:
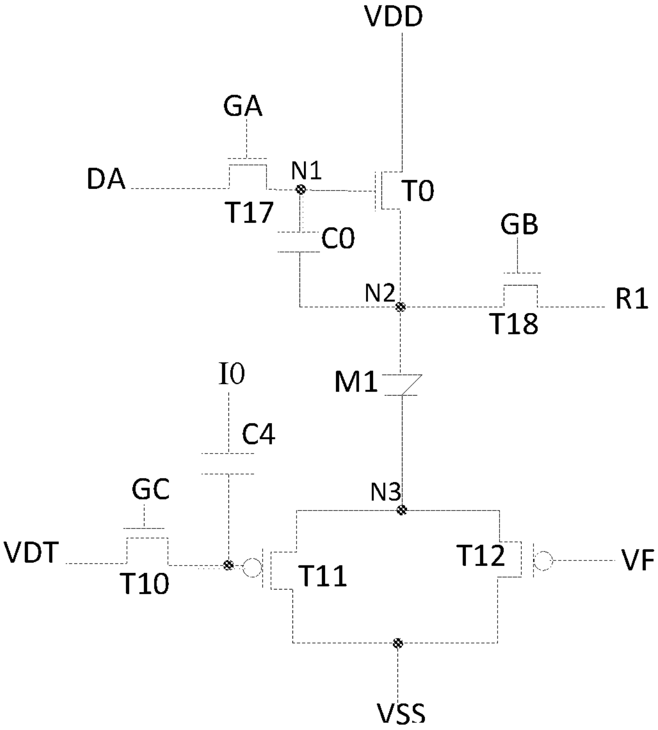
FIG. 31 is a circuit diagram of a pixel circuit according to at least one embodiment of the present disclosure.

The difference between at least one embodiment of the pixel circuit shown in FIG. 31 of the present disclosure and at least one embodiment of the pixel circuit shown in FIG. 30 of the present disclosure is as follows: T10 is an n-type transistor.

Figure 32:
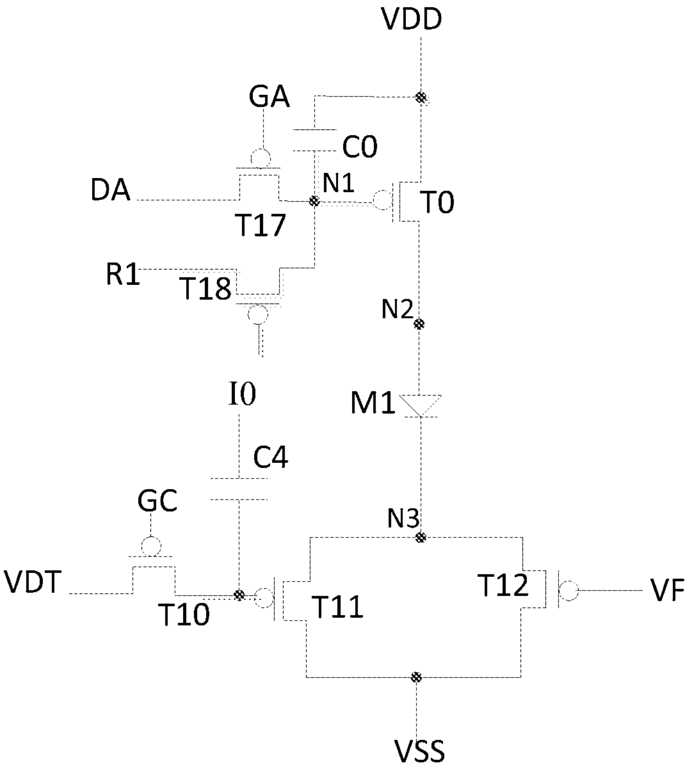
FIG. 32 is a circuit diagram of a pixel circuit according to at least one embodiment of the present disclosure.

The difference between at least one embodiment of the pixel circuit shown in FIG. 32 of the present disclosure and at least one embodiment of the pixel circuit shown in FIG. 30 of the present disclosure is as follows: T0, T17 and T18 are p-type transistors;

The second terminal of C0 is electrically connected to VDD;

The source electrode of T18 is electrically connected to the gate electrode of T0.

Figure 33:
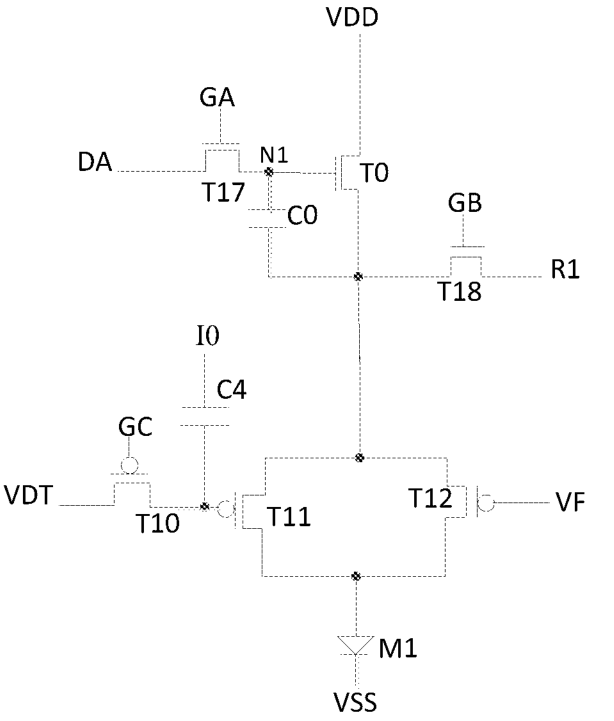
FIG. 33 is a circuit diagram of a pixel circuit according to at least one embodiment of the present disclosure.

The difference between at least one embodiment of the pixel circuit shown in FIG. 33 of the present disclosure and at least one embodiment of the pixel circuit shown in FIG. 30 of the present disclosure is as follows: M1 is arranged between T9 and the low voltage terminal VSS.

Figure 34:
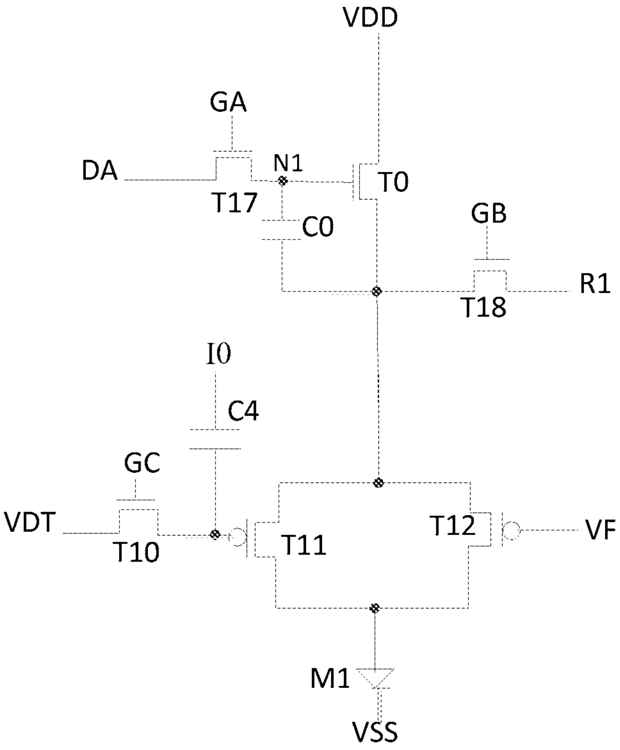
FIG. 34 is a circuit diagram of a pixel circuit according to at least one embodiment of the present disclosure.

The difference between at least one embodiment of the pixel circuit shown in FIG. 34 of the present disclosure and at least one embodiment of the pixel circuit shown in FIG. 31 of the present disclosure is as follows: M1 is arranged between T9 and the low voltage terminal VSS.

Figure 35:
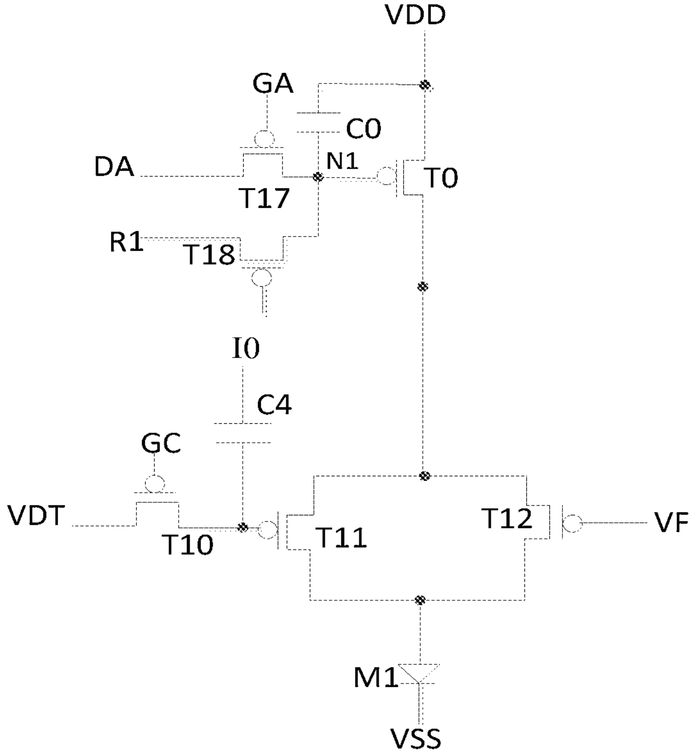
FIG. 35 is a circuit diagram of a pixel circuit according to at least one embodiment of the present disclosure.

The difference between at least one embodiment of the pixel circuit shown in FIG. 35 of the present disclosure and at least one embodiment of the pixel circuit shown in FIG. 32 of the present disclosure is as follows: M1 is arranged between T9 and the low voltage terminal VSS.

Figure 36:
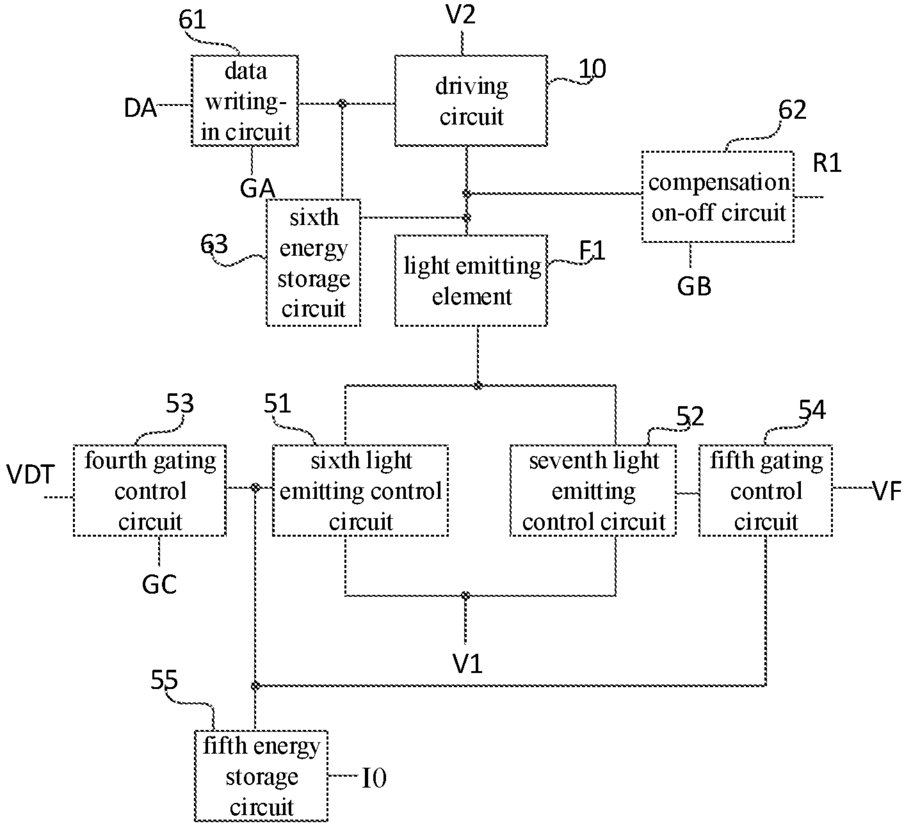
FIG. 36 is a structural diagram of a pixel circuit according to at least one embodiment of the present disclosure.

As shown in FIG. 36, on the basis of at least one embodiment of the pixel circuit shown in FIG. 7, the pixel circuit further includes a data writing-in circuit 61, the compensation on-off circuit 62 and the sixth energy storage circuits 63; the first terminal of the driving circuit 10 is electrically connected to the second voltage terminal V2; the driving circuit 10 is configured to generate a driving current under the control of the potential of its control terminal;

The data writing-in circuit 61 is electrically connected to the first scanning line GA, the data line DA and the control terminal of the driving circuit 10, and is used to write the data voltage Vdata provided by the data line DA into the control terminal of the driving circuit 10 under the control of the first scanning signal provided by the first scanning line GA;

The compensation on-off circuit 62 is electrically connected to the second scanning line GB, the external compensation line R1 and the second terminal of the driving circuit 10 respectively, and is used to control to connect the external compensation line R1 and the second terminal of the driving circuit 10 under the control of the second scanning signal provided by the second scanning line GB;

The first terminal of the sixth energy storage circuit 63 is electrically connected to the control terminal of the driving circuit 10, and the second terminal of the sixth energy storage circuit 63 is electrically connected to the second terminal of the driving circuit 10, so the sixth energy storage circuit 63 is used for storing electric energy.

Figure 37:
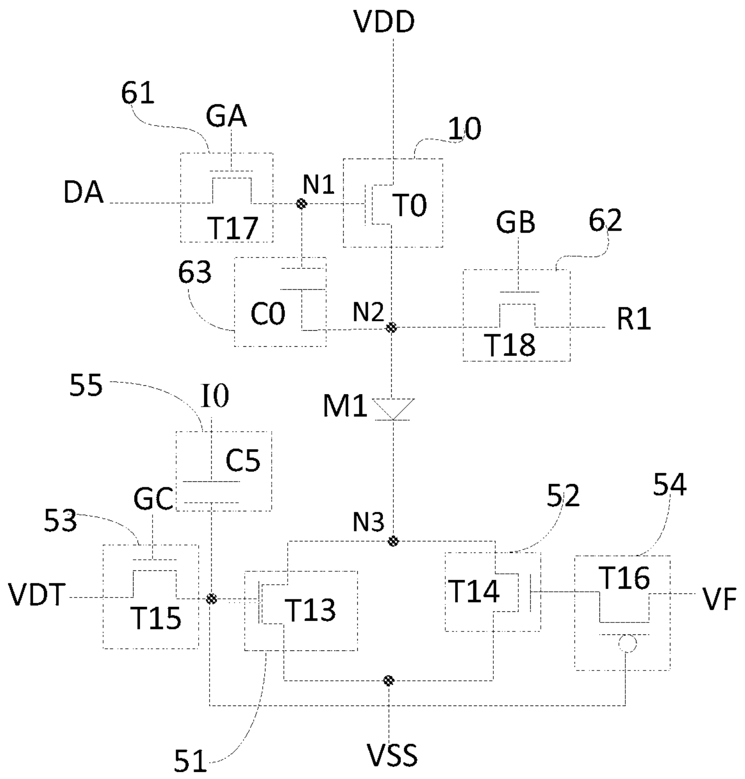
FIG. 37 is a circuit diagram of a pixel circuit according to at least one embodiment of the present disclosure.

As shown in FIG. 37, on the basis of at least one embodiment of the pixel circuit shown in FIG. 36, the light emitting element is a micro light emitting diode M1, and the fifth energy storage circuit 55 includes a fifth capacitor C5;

The sixth light emitting control circuit 51 includes a thirteenth transistor T13; the seventh light emitting control circuit 52 includes a fourteenth transistor T14; the fourth gating control circuit 53 includes a fifteenth transistor T15, and the fifth gating control circuit 54 includes a sixteenth transistor T16;

The gate electrode of the fifteenth transistor T15 is electrically connected to the first control terminal GC, the drain electrode of the fifteenth transistor T15 is electrically connected to the first light emitting control voltage terminal VDT, and the source electrode of the fifteenth transistor T15 is electrically connected to the gate electrode of the thirteenth transistor T13;

The gate electrode of the sixteenth transistor T16 is electrically connected to the gate electrode of the thirteenth transistor T13, the drain electrode of the sixteenth transistor T16 is electrically connected to the light emitting data voltage terminal VF, and the source electrode of the sixteenth transistor T16 is electrically connected to the gate electrode of the fourteenth transistor T14;

The drain electrode of the thirteenth transistor T13 is electrically connected to the cathode of the miniature light emitting diode M1, and the source electrode of the thirteenth transistor T13 is electrically connected to the low voltage terminal VSS;

The drain electrode of the fourteenth transistor T14 is electrically connected to the cathode of the miniature light emitting diode M1, and the source electrode of the fourteenth transistor T14 is electrically connected to the low voltage terminal VSS;

The first terminal of C5 is electrically connected to the gate electrode of T13, and the second terminal of C5 is electrically connected to the initial voltage terminal 10, and the initial voltage terminal 10 is configured to provide the initial voltage Vinit;

The data writing-in circuit 61 includes a seventeenth transistor T17, the compensation on-off circuit 62 includes an eighteenth transistor T18; the sixth energy storage circuit 63 includes a storage capacitor C0;

The gate electrode of the seventeenth transistor T17 is electrically connected to the first scanning line GA, the drain electrode of the seventeenth transistor T17 is electrically connected to the data line DA, and the source electrode of the seventeenth transistor T17 is electrically connected to the gate electrode of the driving transistor T0;

The gate electrode of the eighteenth transistor T18 is electrically connected to the second scanning line GB, the drain electrode of the eighteenth transistor T18 is electrically connected to the external compensation line R1, and the source electrode of the eighteenth transistor T18 is electrically connected to the source electrode of the driving transistor T0;

The drain electrode of the driving transistor T0 is electrically connected to the high voltage terminal VDD; the source electrode of the driving transistor T0 is electrically connected to the anode of M1;

The first terminal of the storage capacitor C0 is electrically connected to the gate electrode of the driving transistor T0, and the second terminal of the storage capacitor C0 is electrically connected to the source electrode of T0.

In at least one embodiment shown in FIG. 37, the first node N1 is electrically connected to the gate electrode of the driving transistor T0, the second node N2 is electrically connected to the source electrode of the driving transistor T0, and the third node N3 is electrically connected to the cathode of M1.

In at least one embodiment of the pixel circuit shown in FIG. 37, T16 is a p-type transistor, T16 is a low-temperature polysilicon thin film transistor, all transistors except T16 are n-type transistors, and all transistors except T16 are oxides thin film transistors, but not limited thereto.

At least one embodiment of the pixel circuit shown in FIG. 37 of the present disclosure is an externally compensated pixel circuit based on LTPO technology, which can realize high and low grayscale display, minimize flicker and reduce eye fatigue while displaying low grayscale.

At least one embodiment of the pixel circuit shown in FIG. 37 of the present disclosure controls T13 to be turned on through the first light emitting control voltage provided by VDT when performing medium-high grayscale display, and realizes a duty ratio display greater than 98%, thereby realizing medium-high grayscale display. In low gray scale display, T16 is turned on during the light emitting phase, HF is written into the gate electrode of T14, and HF is a high frequency PWM signal to achieve low gray scale display. Since HF is an equal-period pulse signal (for example, there are 50 pulse signals in one frame time), the display frequency is increased by 50 times to achieve 3000 Hz display and reduce visual fatigue.

At least one embodiment of the pixel circuit shown in FIG. 37 of the present disclosure uses fewer transistors and capacitors, which can effectively reduce the layout area and improve PPI.

In at least one embodiment of the pixel circuit shown in FIG. 37 of the present disclosure, T16 can be arranged on the bottom layer of stacked TFTs, and the n-type transistor is located on the upper layer. The stacked TFTs can further improve the PPI.

Figure 38:
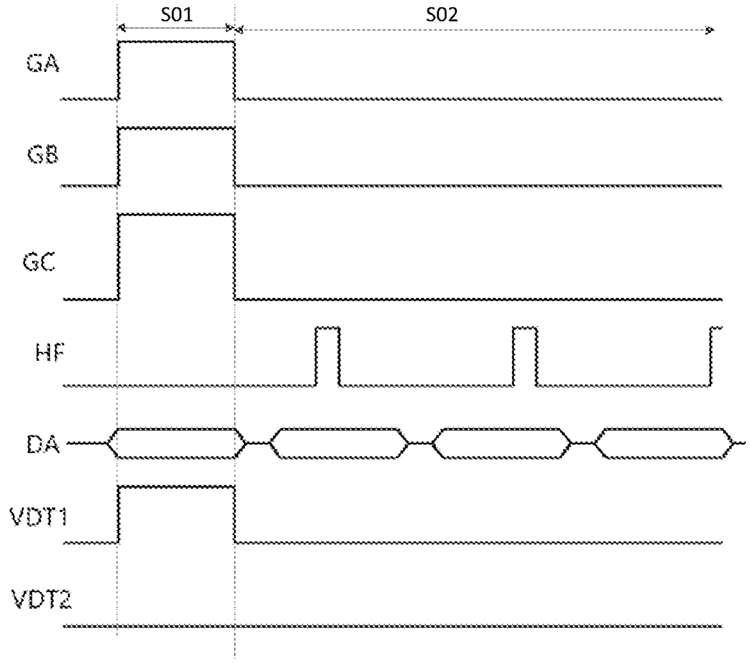
FIG. 38 is a working timing diagram of the pixel circuit shown in FIG. 37 according to at least one embodiment of the present disclosure.

As shown in FIG. 38, when at least one embodiment of the pixel circuit shown in FIG. 37 of the present disclosure is in operation, the display period may include a writing-in phase S01 and a light emitting phase S02 set successively;

In the writing-in phase S01, GA, GB and GC all provide high voltage signals, T15 is turned on, T17 is turned on, the data line DA writes the data voltage Vdata into the gate electrode of T0, T18 is turned on, and the potential of N2 is read for external IC to compensate the threshold voltage Vth of T0;

In the writing-in phase S01, when VDT provides a high-voltage signal, the gate electrode of T13 is connected to a high-voltage signal, T13 is turned on, and T16 is turned off;

In the writing-in phase S01, when VDT provides a low-voltage signal, the gate electrode of T13 is connected to the low-voltage signal, the gate electrode of T16 is connected to the low-voltage signal, T16 is turned on, and HF is connected to the gate electrode of T14;

In the light emitting phase S02, C5 maintains the potential of the gate electrode of T13;

When the high-voltage signal is connected to the gate electrode of T13 in the writing-in phase S01, in the light emitting phase S02, T13 is turned on, and T0 drives M1 to emit light;

When the low-voltage signal is connected to the gate electrode of T13 in the writing-in phase S01, in the light emitting phase S02, T16 is turned on, and HF is written into the gate electrode of T14. When the potential of HF is the low voltage, T14 is turned off; when the potential is a high voltage, T14 is turned on, and T0 drives M1 to emit light, realizing low-gray-scale PWM modulation.

In FIG. 38, the one labeled VDT1 is the first first light emitting control voltage, and the one labeled VDT2 is the second first light emitting control voltage.

Figure 39:
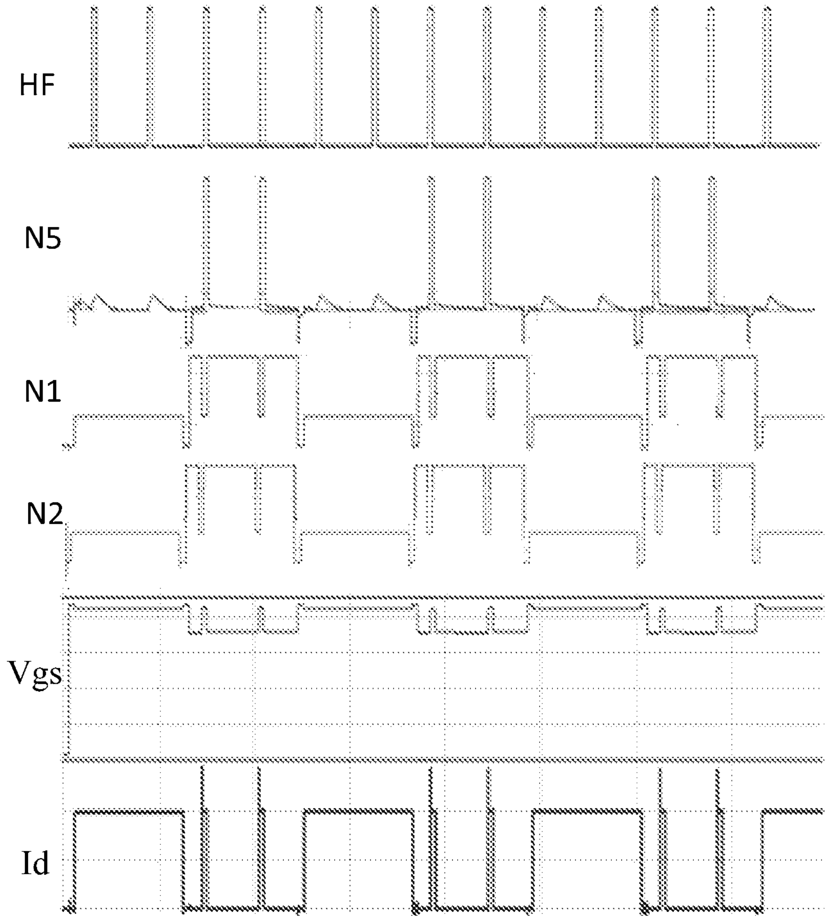
FIG. 39 is a working timing diagram of a simulation the pixel circuit shown in FIG. 37 according to at least one embodiment of the present disclosure.

FIG. 39 is a working timing diagram of a simulation of at least one embodiment of the pixel circuit shown in FIG. 37 of the present disclosure.

In FIG. 39, the gate-source voltage of T0 is labeled Vgs, and the driving current is labeled Id.

Figure 40:
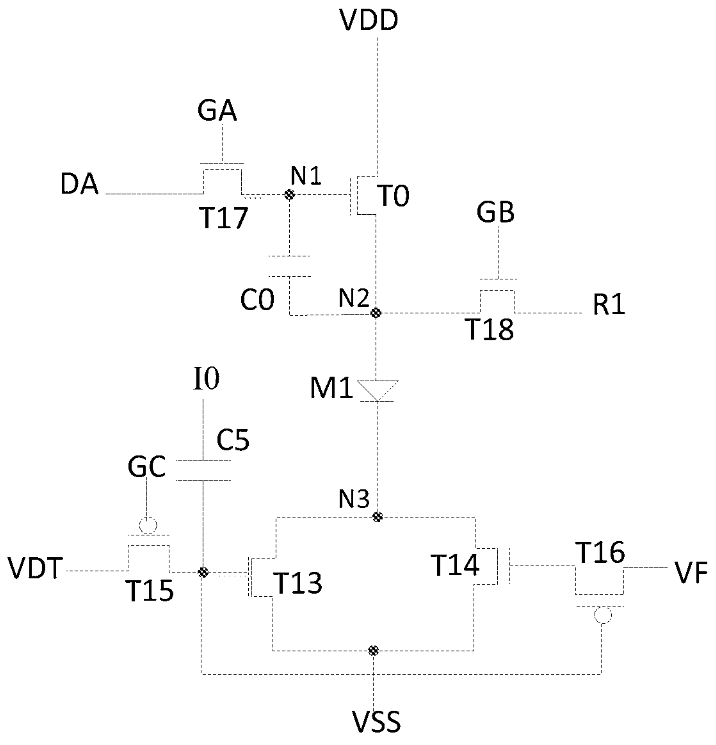
FIG. 40 is a circuit diagram of a pixel circuit according to at least one embodiment of the present disclosure.

The difference between at least one embodiment of the pixel circuit shown in FIG. 40 of the present disclosure and at least one embodiment of the pixel circuit shown in FIG. 37 of the present disclosure is that T15 is a p-type transistor.

Figure 41:
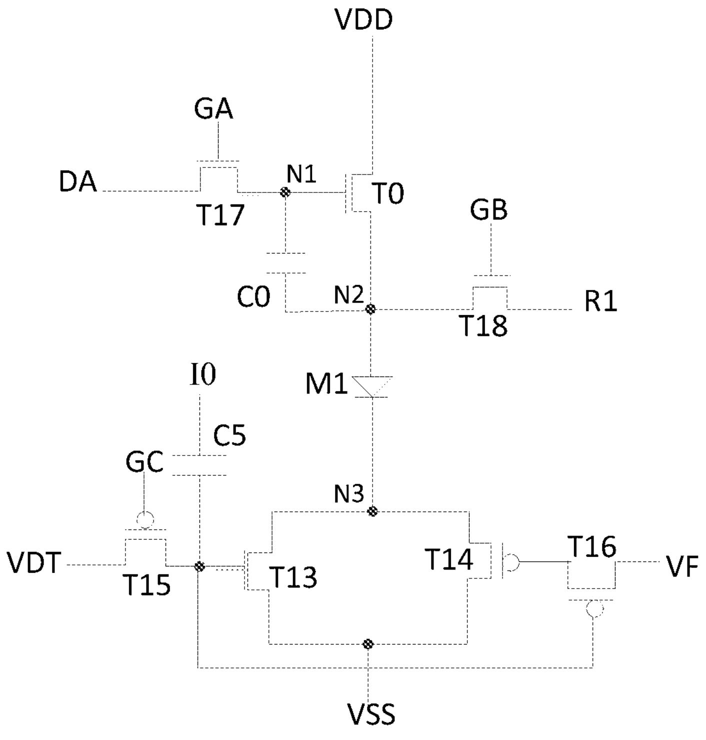
FIG. 41 is a circuit diagram of a pixel circuit according to at least one embodiment of the present disclosure.

The difference between at least one embodiment of the pixel circuit shown in FIG. 41 of the present disclosure and at least one embodiment of the pixel circuit shown in FIG. 40 of the present disclosure is that T14 is a p-type transistor.

Figure 42:
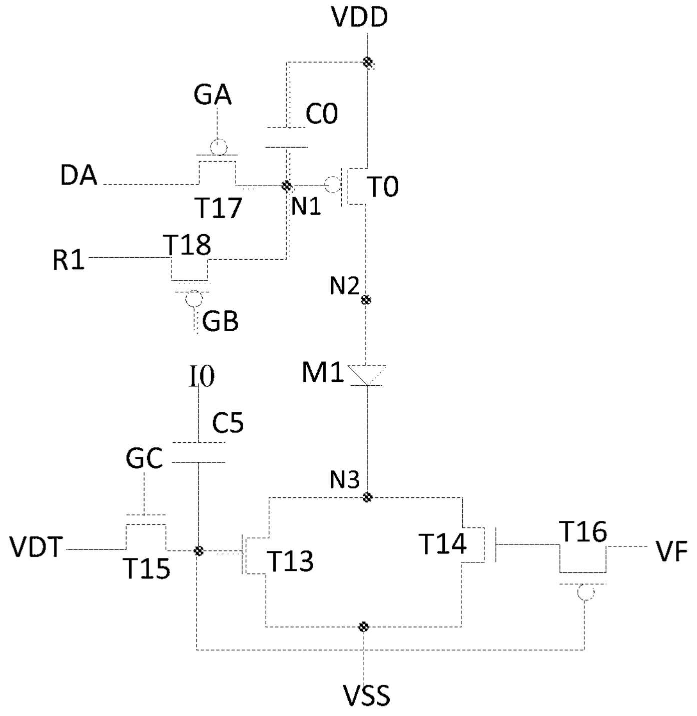
FIG. 42 is a circuit diagram of a pixel circuit according to at least one embodiment of the present disclosure.

The difference between at least one embodiment of the pixel circuit shown in FIG. 42 of the present disclosure and at least one embodiment of the pixel circuit shown in FIG. 37 of the present disclosure is that: T0, T17 and T18 are p-type transistors;

The second terminal of C0 is electrically connected to VDD;

The source electrode of T18 is electrically connected to the gate electrode of T0.

Figure 43:
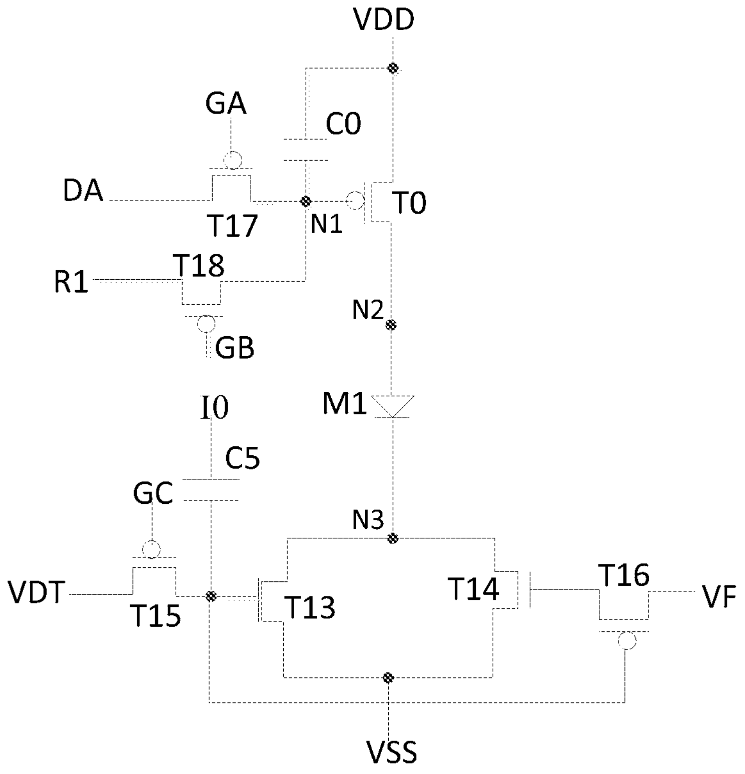
FIG. 43 is a circuit diagram of a pixel circuit according to at least one embodiment of the present disclosure.

The difference between at least one embodiment of the pixel circuit shown in FIG. 43 of the present disclosure and at least one embodiment of the pixel circuit shown in FIG. 40 of the present disclosure is that: T0, T17 and T18 are p-type transistors;

The second terminal of C0 is electrically connected to VDD;

The source electrode of T18 is electrically connected to the gate electrode of T0.

Figure 44:
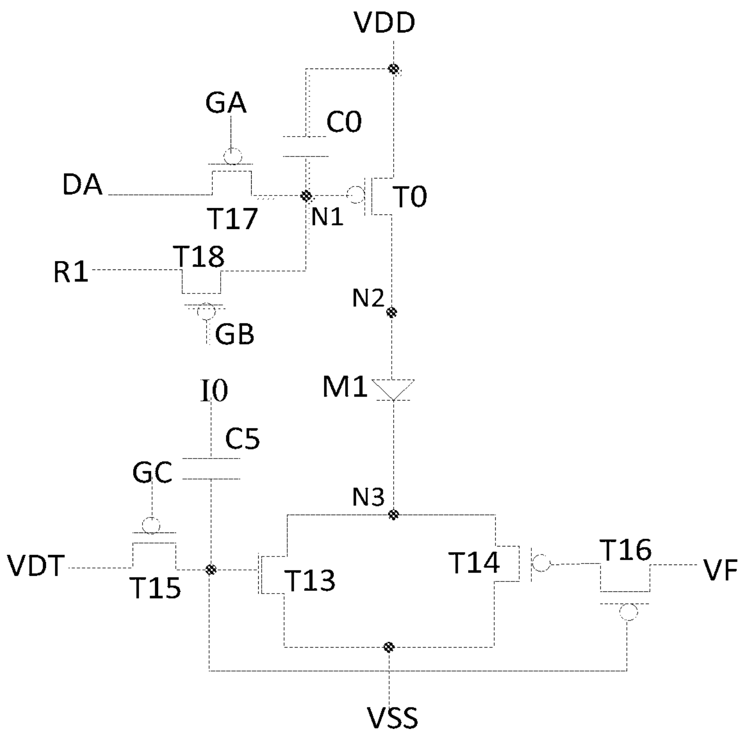
FIG. 44 is a circuit diagram of a pixel circuit according to at least one embodiment of the present disclosure.

The difference between at least one embodiment of the pixel circuit shown in FIG. 44 of the present disclosure and at least one embodiment of the pixel circuit shown in FIG. 41 of the present disclosure is that: T0, T17 and T18 are p-type transistors;

The second terminal of C0 is electrically connected to VDD;

The source electrode of T18 is electrically connected to the gate electrode of T0.

In FIG. 9, FIG. 11, FIG. 15, FIG. 17, FIG. 23, FIG. 25, FIG. 26, FIG. 27, FIG. 30, FIG. 31, FIG. 32, FIG. 37, FIG. 40, FIG. 41, FIG. 42, FIG. 43 and FIG. 44, M1 can also be replaced with its cathode directly connected to the low voltage terminal VSS.

In at least one embodiment of the present disclosure, when the type of the transistor is changed, that is, the transistor changes from an n-type transistor to a p-type transistor, or when the transistor changes from a p-type transistor to an n-type transistor, the potential of the gate electrode of the transistor is reversed in phase.

The pixel driving method according to the embodiment of the present disclosure is applied to the above-mentioned pixel circuit, and the pixel driving method includes:

Forming, by the light emitting gating control circuit, a current path between the second electrode of the light emitting element and the first voltage terminal according to the first light emitting control voltage and the light emitting data voltage under the control of the first control signal, so as to control the driving circuit to control the light emitting element to emit light.

In at least one embodiment of the present disclosure, the light emitting gating control circuit is further electrically connected to the second light emitting control voltage terminal; the light emitting gating control circuit includes a first light emitting control circuit, a second light emitting control circuit, a first gating control circuit and a second gating control circuit;

The pixel driving method includes:

Writing, by the first gating control circuit, the first light emitting control voltage into the first light emitting control terminal under the control of the first control signal;

Writing, by the second gating control circuit, the second light emitting control voltage into the second control terminal under the control of the first control signal, and writing the light emitting data voltage into the second control terminal under the control of the potential of the second control terminal;

Controlling, by the first light emitting control circuit, to connect the second electrode of the light emitting element and the first voltage terminal under the control of the potential of the first light emitting control terminal;

Controlling, by the second light emitting control circuit, to connect the second electrode of the light emitting element and the first voltage terminal under the control of the potential of the second light emitting control terminal.

In at least one embodiment of the present disclosure, the light emitting gating control circuit is further electrically connected to the light emitting control signal terminal; the light emitting gating control circuit includes a third light emitting control circuit, a writing-in control circuit and a first control circuit;

The pixel driving method includes:

Controlling, by the writing-in control circuit, to connect the first light emitting control voltage terminal and the writing-in node under the control of the first control signal;

Controlling, by the first control circuit, to write the light emitting data voltage or the light emitting control signal into the control terminal of the third light emitting control circuit under the control of the potential of the writing-in node;

Forming, by the third light emitting control circuit, a current path under the control of the potential of the control terminal of the third light emitting control circuit.

In at least one embodiment of the present disclosure, the light emitting gating control circuit includes a fourth light emitting control circuit, a fifth light emitting control circuit, and a third gating control circuit; the pixel driving method includes:

Controlling, by the third gating control circuit, the first light emitting control voltage terminal to write the first light emitting control voltage to the control terminal of the fourth light emitting control circuit under the control of the first control signal;

Forming, by the fourth light emitting control circuit, the current path under the control of the potential of the control terminal of the fourth light emitting control circuit;

Forming, by the fifth light emitting control circuit, the current path under the control of the potential of the control terminal of the fifth light emitting control circuit.

In at least one embodiment of the present disclosure, the light emitting gating control circuit includes a sixth light emitting control circuit, a seventh light emitting control circuit, a fourth gating control circuit, and a fifth gating control circuit; the pixel driving method includes:

Controlling, by the fourth gating control circuit, to connect the first light emitting control voltage terminal and the control terminal of the sixth light emitting control circuit under the control of the first control signal;

Controlling, by the fifth gating control circuit, to connect the light emitting data voltage terminal and the control terminal of the seventh light emitting control circuit under the control of the potential of the control terminal of the sixth light emitting control circuit;

Forming, by the sixth light emitting control circuit, the current path under the control of the potential of the control terminal of the sixth light emitting control circuit;

Forming, by the seventh light emitting control circuit, the current path under the control of the potential of the control terminal of the seventh light emitting control circuit.

The display device according to the embodiment of the present disclosure includes the above-mentioned pixel circuit.

The display device provided by the embodiments of the present disclosure may be any product or component with a display function, such as a wearable device, a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a driving circuit, a light emitting element and a light emitting gating control circuit; wherein the driving circuit is electrically connected to a first electrode of the light emitting element, and is configured to drive the light emitting element; the light emitting gating control circuit is electrically connected to a second electrode of the light emitting element, a first control terminal, a first light emitting control voltage terminal, and a light emitting data voltage terminal, and is configured to form a current path between the second electrode of the light emitting element and a first voltage terminal under the control of a first control signal provided by the first control terminal according to a first light emitting control voltage provided by the first light emitting control voltage terminal and a light emitting data voltage provided by the light emitting data voltage terminal, to control the driving circuit to control the light emitting element to emit light; or the driving circuit is electrically connected to the light emitting element through the light emitting gating control circuit; the light emitting gating control circuit is electrically connected to the driving circuit, the first control terminal, a first control voltage terminal and the light emitting data voltage terminal respectively, and is configured to form a current path between the driving circuit and the light emitting element under the control the first control signal according to the first light emitting control voltage and the light emitting data voltage, to control the driving circuit to control the light emitting element to emit light, wherein the light emitting gating control circuit is electrically connected to a second light emitting control voltage terminal; the light emitting gating control circuit is also configured to from the current path under the control of a second light emitting control voltage provided by the second light emitting control voltage terminal, wherein the light emitting gating control circuit includes a first light emitting control circuit, a second light emitting control circuit, a first gating control circuit and a second gating control circuit, wherein the first light emitting control circuit is electrically connected to a first light emitting control terminal, the second electrode of the light emitting element, and the first voltage terminal, and is configured to control to connect the second electrode of the light emitting element and the first voltage terminal under the control of a potential of the first light emitting control terminal, wherein the second light emitting control circuit is electrically connected to a second light emitting control terminal, the second electrode of the light emitting element, and the first voltage terminal, and is configured to control to connect the second electrode of the light emitting element and the first voltage terminal under the control of a potential of the second light emitting control terminal, wherein the first gating control circuit is electrically connected to the first control terminal, the first light emitting control voltage terminal and the first light emitting control terminal respectively, and is configured to write the first light emitting control voltage provided by the first light emitting control voltage terminal into the first light emitting control terminal under the control of the first control signal provided by the first control terminal, and wherein the second gating control circuit is electrically connected to the first control terminal, a second light emitting control voltage terminal, a second control terminal, the light emitting data voltage terminal and the second light emitting control terminal, and is configured to write a second light emitting control voltage provided by the second light emitting control voltage terminal into the second control terminal under the control of the first control signal provided by the first control terminal, and write a light emitting data voltage provided by the light emitting data voltage terminal into the second light emitting control terminal under the control of a potential of the second control terminal.

2. The pixel circuit according to claim 1, further comprising a first energy storage circuit and a second energy storage circuit;

a first terminal of the first energy storage circuit is electrically connected to the first light emitting control terminal, a second terminal of the first energy storage circuit is electrically connected to a first initial voltage terminal, and the first energy storage circuit is configured to store electrical energy;

a first terminal of the second energy storage circuit is electrically connected to the second control terminal, a second terminal of the second energy storage circuit is electrically connected to a second initial voltage terminal, and the second energy storage circuit is configured to store electrical energy.

3. The pixel circuit according to claim 1, wherein the first light emitting control circuit includes a first transistor, and the second light emitting control circuit includes a second transistor;

a control electrode of the first transistor is electrically connected to the first light emitting control terminal, a first electrode of the first transistor is electrically connected to the second electrode of the light emitting element, and a second electrode of the first transistor is electrically connected to the first voltage terminal;

a control electrode of the second transistor is electrically connected to the second light emitting control terminal, a first electrode of the second transistor is electrically connected to the second electrode of the light emitting element, and a second electrode of the second transistor is electrically connected to the first voltage terminal.

4. The pixel circuit according to claim 3, wherein the driving circuit includes a driving transistor; a width-to length ratio of the first transistor is greater than a width-to length ratio of the driving transistor, and a width-to length ratio of the second transistor is greater than the width-to length ratio of the driving transistor.

5. The pixel circuit of claim 3, wherein the first gating control circuit comprises a third transistor;

a control electrode of the third transistor is electrically connected to the first control terminal, a first electrode of the third transistor is electrically connected to the first light emitting control voltage terminal, and a second electrode of the third transistor is electrically connected to the first light emitting control terminal;

the second gating control circuit includes a fourth transistor and a fifth transistor;

a control electrode of the fourth transistor is electrically connected to the first control terminal, a first electrode of the fourth transistor is electrically connected to the second light emitting control voltage terminal, and a second electrode of the fourth transistor is electrically connected to the second control terminal;

a control electrode of the fifth transistor is electrically connected to the second control terminal, a first electrode of the fifth transistor is electrically connected to the light emitting data voltage terminal, and a second electrode of the fifth transistor is electrically connected to the second light emitting control terminal.

6. The pixel circuit according to claim 1, further comprising a data writing-in circuit and a compensation on-off circuit; a first terminal of the driving circuit is electrically connected to a second voltage terminal; the driving circuit is configured to generate a driving current under the control of a potential of a control terminal of the driving circuit;

the data writing-in circuit is electrically connected to a first scanning line, a data line and the control terminal of the driving circuit, and is configured to write a data voltage provided by the data line into the control terminal of the driving circuit under the control of a first scanning signal provided by the first scanning line;

the compensation on-off circuit is electrically connected to a second scanning line, an external compensation line and a second terminal of the driving circuit respectively, and is configured to control to connect the external compensation line and the second terminal of the driving circuit under the control of a second scanning signal provided by the second scanning line.

7. The pixel circuit according to claim 6, wherein the pixel circuit further comprises a sixth energy storage circuit;

a first terminal of the sixth energy storage circuit is electrically connected to the control terminal of the driving circuit, a second terminal of the sixth energy storage circuit is electrically connected to the second terminal of the driving circuit, and the sixth energy storage circuit is configured to store electrical energy; or, the first terminal of the sixth energy storage circuit is electrically connected to the control terminal of the driving circuit, the second terminal of the sixth energy storage circuit is electrically connected to the first terminal of the driving circuit, and the sixth energy storage circuit is configured to store electrical energy.

8. The pixel circuit according to claim 6, wherein the data writing-in circuit comprises a seventeenth transistor, the compensation on-off circuit comprises an eighteenth transistor, and the driving circuit comprises a driving transistor;

a control electrode of the seventeenth transistor is electrically connected to the first scanning line, a first electrode of the seventeenth transistor is electrically connected to the data line, and a second electrode of the seventeenth transistor is electrically connected to a gate electrode of the driving transistor;

a control electrode of the eighteenth transistor is electrically connected to the second scanning line, a first electrode of the eighteenth transistor is electrically connected to the external compensation line, and a second electrode of the eighteenth transistor is electrically connected to a second electrode of the driving transistor;

a first electrode of the driving transistor is electrically connected to the second voltage terminal; the second electrode of the driving transistor is electrically connected to the first electrode of the light emitting element.

9. The pixel circuit according to claim 7, wherein the sixth energy storage circuit comprises a storage capacitor; the driving circuit comprises a driving transistor;

a first terminal of the storage capacitor is electrically connected to the control electrode of the driving transistor, and a second terminal of the storage capacitor is electrically connected to the second electrode of the driving transistor; or, the first terminal of the storage capacitor is electrically connected to the control electrode of the driving transistor, and the second terminal of the storage capacitor is electrically connected to the first electrode of the driving transistor.

10. The pixel circuit according to claim 1, further comprising a data writing-in circuit, a compensation on-off circuit and a sixth energy storage circuit; a first terminal of the driving circuit is connected to a second voltage terminal; the driving circuit is configured to generate a driving current under the control of a potential of a control terminal of the driving circuit;

the data writing-in circuit is electrically connected to a first scanning line, a data line and the control terminal of the driving circuit, and is configured to write a data voltage provided by the data line into the control terminal of the driving circuit under the control of a first scanning signal provided by the first scanning line;

the compensation on-off circuit is electrically connected to a second scanning line, an external compensation line and the control terminal of the driving circuit, and is configured to control to connect the external compensation line and the control terminal of the driving circuit under the control of the second scanning signal provided by the second scanning line;

a first terminal of the sixth energy storage circuit is electrically connected to the control terminal of the driving circuit, and a second terminal of the sixth energy storage circuit is electrically connected to the first terminal of the driving circuit, the sixth energy storage circuit is configured to store electric energy, wherein the data writing-in circuit comprises a seventeenth transistor, the compensation on-off circuit comprises an eighteenth transistor, and the driving circuit comprises a driving transistor;

a control electrode of the seventeenth transistor is electrically connected to the first scanning line, a first electrode of the seventeenth transistor is electrically connected to the data line, and a second electrode of the seventeenth transistor is electrically connected to the gate electrode of the driving transistor;

a control electrode of the eighteenth transistor is electrically connected to the second scanning line, a first electrode of the eighteenth transistor is electrically connected to the external compensation line, and a second electrode of the eighteenth transistor is electrically connected to the control electrode of the driving transistor;

a first electrode of the driving transistor is electrically connected to the second voltage terminal; a second electrode of the driving transistor is electrically connected to the first electrode of the light emitting element.

11. A pixel driving method, applied to the pixel circuit according to claim 1, wherein the pixel driving method comprises:

forming, by the light emitting gating control circuit, the current path between the second electrode of the light emitting element and the first voltage terminal according to the first light emitting control voltage and the light emitting data voltage under the control of the first control signal, so as to control the driving circuit to control the light emitting element to emit light; or, forming, by the light emitting gating control circuit, the current path between the driving circuit and the light emitting element according to the first light emitting control voltage and the light emitting data voltage under the control of the first control signal, so as to control the driving circuit to control the light emitting element to emit light.

12. The pixel driving method according to claim 11, wherein the light emitting gating control circuit is further electrically connected to a second light emitting control voltage terminal; the light emitting gating control circuit comprises a first light emitting control circuit, a second light emitting control circuit, a first gating control circuit and a second gating control circuit;

the pixel driving method includes:

writing, by the first gating control circuit, the first light emitting control voltage into the first light emitting control terminal under the control of the first control signal;

writing, by the second gating control circuit, a second light emitting control voltage into a second control terminal under the control of the first control signal, and writing the light emitting data voltage into the second light emitting control terminal under the control of the potential of the second control terminal;

controlling, by the first light emitting control circuit, to connect the second electrode of the light emitting element and the first voltage terminal under the control of the potential of the first light emitting control terminal;

controlling, by the second light emitting control circuit, to connect the second electrode of the light emitting element and the first voltage terminal under the control of the potential of the second light emitting control terminal;

or wherein the light emitting gating control circuit is also electrically connected to the light emitting control signal terminal; the light emitting gating control circuit comprises a third light emitting control circuit, a writing-in control circuit and a first control circuit;

the pixel driving method includes:

controlling, by the writing-in control circuit, to connect the first light emitting control voltage terminal and the writing-in node under the control of the first control signal;

controlling, by the first control circuit, to write the light emitting data voltage or the light emitting control signal into the control terminal of the third light emitting control circuit under the control of a potential of the writing-in node;

forming, by the third light emitting control circuit, the current path under the control of a potential of a control terminal of the third light emitting control circuit;

or wherein the light emitting gating control circuit comprises a fourth light emitting control circuit, a fifth light emitting control circuit and a third gating control circuit; the pixel driving method comprises:

controlling, by the third gating control circuit, the first light emitting control voltage terminal to write the first light emitting control voltage to a control terminal of the fourth light emitting control circuit under the control of the first control signal;

forming, by the fourth light emitting control circuit, the current path under the control of a potential of the control terminal of the fourth light emitting control circuit;

forming, by the fifth light emitting control circuit, the current path under the control of a potential of a control terminal of the fifth light emitting control circuit;

or wherein the light emitting gating control circuit includes a sixth light emitting control circuit, a seventh light emitting control circuit, a fourth gating control circuit, and a fifth gating control circuit; the pixel driving method includes:

controlling, by the fourth gating control circuit, to connect the first light emitting control voltage terminal and a control terminal of the sixth light emitting control circuit under the control of the first control signal;

controlling, by the fifth gating control circuit, to connect the light emitting data voltage terminal and a control terminal of the seventh light emitting control circuit under the control of a potential of the control terminal of the sixth light emitting control circuit;

forming, by the sixth light emitting control circuit, the current path under the control of the potential of the control terminal of the sixth light emitting control circuit;

forming, by the seventh light emitting control circuit, the current path under the control of a potential of a control terminal of the seventh light emitting control circuit.

13. A display device comprising the pixel circuit according to claim 1.

14. A pixel circuit, comprising:

a driving circuit;

a light emitting element; and a light emitting gating control circuit, wherein the driving circuit is electrically connected to a first electrode of the light emitting element, and is configured to drive the light emitting element; the light emitting gating control circuit is electrically connected to a second electrode of the light emitting element, a first control terminal, a first light emitting control voltage terminal, and a light emitting data voltage terminal, and is configured to form a current path between the second electrode of the light emitting element and a first voltage terminal under the control of a first control signal provided by the first control terminal according to a first light emitting control voltage provided by the first light emitting control voltage terminal and a light emitting data voltage provided by the light emitting data voltage terminal, to control the driving circuit to control the light emitting element to emit light, or wherein the driving circuit is electrically connected to the light emitting element through the light emitting gating control circuit; the light emitting gating control circuit is electrically connected to the driving circuit, the first control terminal, a first control voltage terminal and the light emitting data voltage terminal respectively, and is configured to form a current path between the driving circuit and the light emitting element under the control the first control signal according to the first light emitting control voltage and the light emitting data voltage, to control the driving circuit to control the light emitting element to emit light, wherein the light emitting gating control circuit is further electrically connected to the light emitting control signal terminal, and is further configured to form the current path according to the light emitting control signal provided by the light emitting control signal terminal;

the light emitting gating control circuit includes a third light emitting control circuit, a writing-in control circuit, a first control circuit and a third energy storage circuit;

the writing-in control circuit is electrically connected to the first control terminal, the first light emitting control voltage terminal and a writing-in node respectively, and is configured to control to connect the first light emitting control voltage terminal and the writing-in node under the control of the first control signal provided by the first control terminal;

the first control circuit is electrically connected to a control terminal of the third light emitting control circuit, the writing-in node, the light emitting data voltage terminal, and the light emitting control signal terminal, is configured to control to write the light emitting data voltage or the light emitting control signal provided by the light emitting control signal terminal into the control terminal of the third light emitting control circuit under the control of a potential of the writing-in node;

the third light emitting control circuit is electrically connected to the second electrode of the light emitting element and the first voltage terminal, and the third light emitting control circuit is configured to form the current path under the control of the potential of the control terminal of the third light emitting control circuit;

a first terminal of the third energy storage circuit is electrically connected to the writing-in node, a second terminal of the third energy storage circuit is electrically connected to an initial voltage terminal, and the third energy storage circuit is configured to store electric energy.

15. The pixel circuit according to claim 14, wherein the writing-in control circuit includes a sixth transistor, the first control circuit includes a seventh transistor and an eighth transistor, and the third light emitting control circuit includes a ninth transistor;

a control electrode of the sixth transistor is electrically connected to the first control terminal, a first electrode of the sixth transistor is electrically connected to the first light emitting control voltage terminal, and a second electrode of the sixth transistor is electrically connected to the writing-in node;

a control electrode of the seventh transistor is electrically connected to the writing-in node, a first electrode of the seventh transistor is electrically connected to the light emitting data voltage terminal, and a second electrode of the seventh transistor is electrically connected to a control electrode of the ninth transistor;

a control electrode of the eighth transistor is electrically connected to the writing-in node, a first electrode of the eighth transistor is electrically connected to the light emitting control signal terminal, and a second electrode of the eighth transistor is electrically connected to the control electrode of the ninth transistor;

a first electrode of the ninth transistor is electrically connected to the second electrode of the light emitting element, and a second electrode of the ninth transistor is electrically connected to the first voltage terminal.

16. A pixel circuit, comprising:

a driving circuit;

a light emitting element; and a light emitting gating control circuit, wherein the driving circuit is electrically connected to a first electrode of the light emitting element, and is configured to drive the light emitting element; the light emitting gating control circuit is electrically connected to a second electrode of the light emitting element, a first control terminal, a first light emitting control voltage terminal, and a light emitting data voltage terminal, and is configured to form a current path between the second electrode of the light emitting element and a first voltage terminal under the control of a first control signal provided by the first control terminal according to a first light emitting control voltage provided by the first light emitting control voltage terminal and a light emitting data voltage provided by the light emitting data voltage terminal, to control the driving circuit to control the light emitting element to emit light, or wherein the driving circuit is electrically connected to the light emitting element through the light emitting gating control circuit; the light emitting gating control circuit is electrically connected to the driving circuit, the first control terminal, a first control voltage terminal and the light emitting data voltage terminal respectively, and is configured to form a current path between the driving circuit and the light emitting element under the control the first control signal according to the first light emitting control voltage and the light emitting data voltage, to control the driving circuit to control the light emitting element to emit light, wherein the light emitting gating control circuit includes a fourth light emitting control circuit, a fifth light emitting control circuit, a third gating control circuit and a fourth energy storage circuit;

the third gating control circuit is electrically connected to the first control terminal, the first light emitting control voltage terminal and a control terminal of the fourth light emitting control circuit respectively, and is configured to control the first light emitting control voltage terminal to write the first light emitting control voltage to a control terminal of the fourth light emitting control circuit under the control of the first control terminal provided by the first control terminal;

the fourth light emitting control circuit is also electrically connected to the second electrode of the light emitting element and the first voltage terminal, is configured to form the current path under the control of a potential of the control terminal of the fourth light emitting control circuit;

a control terminal of the fifth light emitting control circuit is electrically connected to the light emitting data voltage terminal, and the fifth light emitting control circuit is also electrically connected to the second electrode of the light emitting element and the first voltage terminal respectively, is configured to form the current path under the control of a potential of a control terminal of the fifth light emitting control circuit;

a first terminal of the fourth energy storage circuit is electrically connected to the control terminal of the fourth light emitting control circuit, a second terminal of the fourth energy storage circuit is electrically connected to an initial voltage terminal, and the fourth energy storage circuit is configured to store electrical energy, or wherein the light emitting gating control circuit includes a sixth light emitting control circuit, a seventh light emitting control circuit, a fourth gating control circuit, a fifth gating control circuit, and a fifth energy storage circuit, wherein the fourth gating control circuit is electrically connected to the first control terminal, the first light emitting control voltage terminal and a control terminal of the sixth light emitting control circuit, and is configured to control to connect the first light emitting control voltage terminal and the control terminal of the sixth light emitting control circuit under the control of the first control signal, wherein the fifth gating control circuit is electrically connected to the control terminal of the sixth light emitting control circuit, the light emitting data voltage terminal, and a control terminal of the seventh light emitting control circuit, is configured to control to connect the light emitting data voltage terminal and the control terminal of the seventh light emitting control circuit under the control of a potential of a control terminal of the sixth light emitting control circuit, wherein the sixth light emitting control circuit is electrically connected to the second electrode of the light emitting element and the first voltage terminal, and is configured to form the current path under the control of the potential of the control terminal of the sixth light emitting control circuit, wherein the seventh light emitting control circuit is electrically connected to the second electrode of the light emitting element and the first voltage terminal respectively, and is configured to form the current path under the control of the potential of the control terminal of the seventh light emitting control circuit, and wherein a first terminal of the fifth energy storage circuit is electrically connected to the control terminal of the sixth light emitting control circuit, a second terminal of the fifth energy storage circuit is electrically connected to an initial voltage terminal, and the fifth energy storage circuit is configured to store electrical energy.

17. The pixel circuit according to claim 16, wherein when the light emitting gating control circuit includes the fourth light emitting control circuit, the fifth light emitting control circuit, the third gating control circuit and the fourth energy storage circuit, the third gating control circuit includes a tenth transistor, the fourth light emitting control circuit includes an eleventh transistor, the fifth light emitting control circuit includes a twelfth transistor;

a control electrode of the tenth transistor is electrically connected to the first control terminal, a first electrode of the tenth transistor is electrically connected to the first light emitting control voltage terminal, and a second electrode of the tenth transistor is electrically connected to a control electrode of the eleventh transistor;

a first electrode of the eleventh transistor is electrically connected to the second electrode of the light emitting element, and a second electrode of the eleventh transistor is electrically connected to the first voltage terminal;

a control electrode of the twelfth transistor is electrically connected to the light emitting data voltage terminal, a first electrode of the twelfth transistor is electrically connected to the second electrode of the light emitting element, and a second electrode of the twelfth transistor is electrically connected to the first voltage terminal.

18. The pixel circuit according to claim 16, wherein when the light emitting gating control circuit includes the sixth light emitting control circuit, the seventh light emitting control circuit, the fourth gating control circuit, the fifth gating control circuit, and the fifth energy storage circuit, the sixth light emitting control circuit comprises a thirteenth transistor; the seventh light emitting control circuit comprises a fourteenth transistor; the fourth gating control circuit comprises a fifteenth transistor, the fifth gating control circuit includes a sixteenth transistor;

a control electrode of the fifteenth transistor is electrically connected to the first control terminal, a first electrode of the fifteenth transistor is electrically connected to the first light emitting control voltage terminal, and a second electrode of the fifteenth transistor is electrically connected to a control electrode of the thirteenth transistor;

a control electrode of the sixteenth transistor is electrically connected to the control electrode of the thirteenth transistor, a first electrode of the sixteenth transistor is electrically connected to the light emitting data voltage terminal, and a second electrode of the sixteenth transistor is electrically connected to a control electrode of the fourteenth transistor;

a first electrode of the thirteenth transistor is electrically connected to the second electrode of the light emitting element, and a second electrode of the thirteenth transistor is electrically connected to the first voltage terminal;

a first electrode of the fourteenth transistor is electrically connected to the second electrode of the light emitting element, and a second electrode of the fourteenth transistor is electrically connected to the first voltage terminal.

* * * * *